(12) United States Patent
Lubeck et al.

(10) Patent No.: US 11,568,472 B2
(45) Date of Patent: *Jan. 31, 2023

(54) APPARATUS FOR FACILITATING A SALES TRANSACTION VIA AN INTERACTIVE DISPLAY PLATFORM

(71) Applicant: The Nielsen Company (US), LLC, New York, NY (US)

(72) Inventors: Lauren Lubeck, New York, NY (US); Vivek Sudarsan, New York, NY (US); Ron Fisher, New York, NY (US)

(73) Assignee: Nielsen Consumer LLC, Chicago, IL (US)

( * ) Notice: Subject to any disclaimer, the term of this patent is extended or adjusted under 35 U.S.C. 154(b) by 97 days.

This patent is subject to a terminal disclaimer.

(21) Appl. No.: 17/090,573

(22) Filed: Nov. 5, 2020

(65) Prior Publication Data
US 2021/0090155 A1    Mar. 25, 2021

Related U.S. Application Data

(63) Continuation of application No. 16/244,858, filed on Jan. 10, 2019, now Pat. No. 10,867,342, which is a
(Continued)

(51) Int. Cl.
*G06Q 30/00* (2012.01)
*G06Q 30/06* (2012.01)
(Continued)

(52) U.S. Cl.
CPC ....... *G06Q 30/0635* (2013.01); *G06F 3/0482* (2013.01); *G06F 3/04842* (2013.01);
(Continued)

(58) Field of Classification Search
CPC ...... G06Q 30/0601–0645; G06Q 30/08; G06F 3/0482; G06F 3/04842
(Continued)

(56) References Cited

U.S. PATENT DOCUMENTS 6,155,840 A     12/2000   Sallette
6,295,551 B1 *   9/2001   Roberts ..................... H04L 9/40
                                                              709/205
(Continued)

FOREIGN PATENT DOCUMENTS

WO          0175755        10/2001

OTHER PUBLICATIONS

Kahn, Jordan, "Slingshot app lets you share your iOS screen with others on any platform," May 1, 2014, 9To5Mac, accessed at [https://9to5mac.com/2014/05/01/slingshot-app-lets-you-share-your-ios-screen-with-others-on-any-platform/] (Year: 2014).*

(Continued)

*Primary Examiner* — Jeffrey A. Smith
*Assistant Examiner* — Lindsey B Smith
(74) *Attorney, Agent, or Firm* — Hanley, Flight & Zimmerman, LLC

(57) ABSTRACT

Methods and apparatus are disclosed for facilitating, via an interactive display platform, a sales transaction conducted in real time between a consultant associated with a consultant device and a customer associated with a customer device. Independent user interaction control capabilities are assigned to the consultant device and the customer device for controlling the sharing of information, the identification of selections pertaining to the shared information and the population of a virtual shopping cart based on the selections, and/or for interacting with the shared information, selections and populated virtual shopping cart. The disclosed methods and apparatus can facilitate a sales transaction involving any type of product and/or service, including the sale of a report containing product data.

25 Claims, 38 Drawing Sheets

Related U.S. Application Data continuation of application No. 14/801,291, filed on Jul. 16, 2015, now Pat. No. 10,223,734.

(60) Provisional application No. 62/148,592, filed on Apr. 16, 2015.

(51) Int. Cl.
 *G06F 3/0482* (2013.01)
 *G06F 3/04842* (2022.01)

(52) U.S. Cl.
 CPC ......... *G06Q 30/06* (2013.01); *G06Q 30/0601* (2013.01); *G06Q 30/0613* (2013.01); *G06Q 30/0641* (2013.01)

(58) Field of Classification Search
 USPC .............................................. 705/26.1–27.2
 See application file for complete search history.

(56) References Cited

U.S. PATENT DOCUMENTS

| | | | |
|---|---|---|---|
| 6,748,417 | B1 | 6/2004 | Helland |
| 8,246,454 | B2 | 8/2012 | Zalewski |
| 8,600,035 | B2 | 12/2013 | Jay et al. |
| 8,630,851 | B1 * | 1/2014 | Hertschuh .......... G06Q 30/0641 704/235 |
| 8,769,016 | B2 | 7/2014 | Jakobson |
| 8,849,791 | B1 | 9/2014 | Hertschuh et al. |
| 8,879,717 | B2 | 11/2014 | Jay et al. |
| 8,977,554 | B1 | 3/2015 | Hertschuh et al. |
| 10,026,108 | B2 * | 7/2018 | Jackson .................. H04L 67/75 |
| 10,223,734 | B2 | 3/2019 | Lubeck et al. |
| 10,867,342 | B2 | 12/2020 | Lubeck et al. |
| 2001/0044751 | A1 | 11/2001 | Pugliese, III et al. |
| 2002/0120519 | A1 | 8/2002 | Martin et al. |
| 2005/0234805 | A1 | 10/2005 | Robertson et al. |
| 2009/0172565 | A1 | 7/2009 | Jackson et al. |
| 2011/0029339 | A1 | 2/2011 | Callahan |
| 2013/0151367 | A1 | 6/2013 | Lazar |
| 2014/0316946 | A1 | 10/2014 | Sanders et al. |
| 2015/0294386 | A1 * | 10/2015 | Hertschuh .......... G06Q 30/0623 705/26.43 |

OTHER PUBLICATIONS

Pierce, David, "Google updates Google+ hangouts with a new look and screen sharing," Jan. 12, 2012, The Verge, accessed at [https://www.theverge.com/2012/1/12/2700586/google-plus-hangouts-screen-sharing] (Year: 2012).*

Harjula et al., "Plug-and-Play Application Platform: Towards Mobile Peer-to-Peer," Proceedings of the 3rd International conference on Mobil and ubiquitous multimedia, Oct. 27, 2004, 7 pages.

Unblue, "Web Customer Service for every business", <https://www.unblu.com/en/products/business-line/>, retrieved on Jan. 8, 2015, 5 pages.

Cuevas, "Collaborative Online Shopping: The Next Wave in E-Commerce", E-Commerce Times, <http://www.ecommercetimes.com/story/78142.html>, dated, May 28, 2013, 4 pages.

United States Patent and Trademark Office, "Non-Final Office Action," issued in connection with U.S. Appl. No. 14/801,291, dated May 31, 2018, 15 pages.

United States Patent and Trademark Office, "Notice of Allowance and Fee(s) Due," issued in connection with U.S. Appl. No. 14/801,291, dated Nov. 2, 2018, 12 pages.

Clover, "iOS 8 Introduces Peer-to-Peer AirPlay Playback, Easy iOS to Mac Screen Capture," dated Jun. 3, 2014, retrieved on Jun. 21, 2020 from [https://www.macrumors.com/2014/06/03/ios-8-peer-to-pree-airplay], 8 pages.

United States Patent and Trademark Office, "Non-Final Office Action," issued in connection with U.S. Appl. No. 16/244,858, dated Jun. 26, 2020, 9 pages.

United States Patent and Trademark Office, "Notice of Allowance and Fee(s) Due," issued in connection with U.S. Appl. No. 16/244,858, dated Aug. 19, 2020, 13 pages.

* cited by examiner

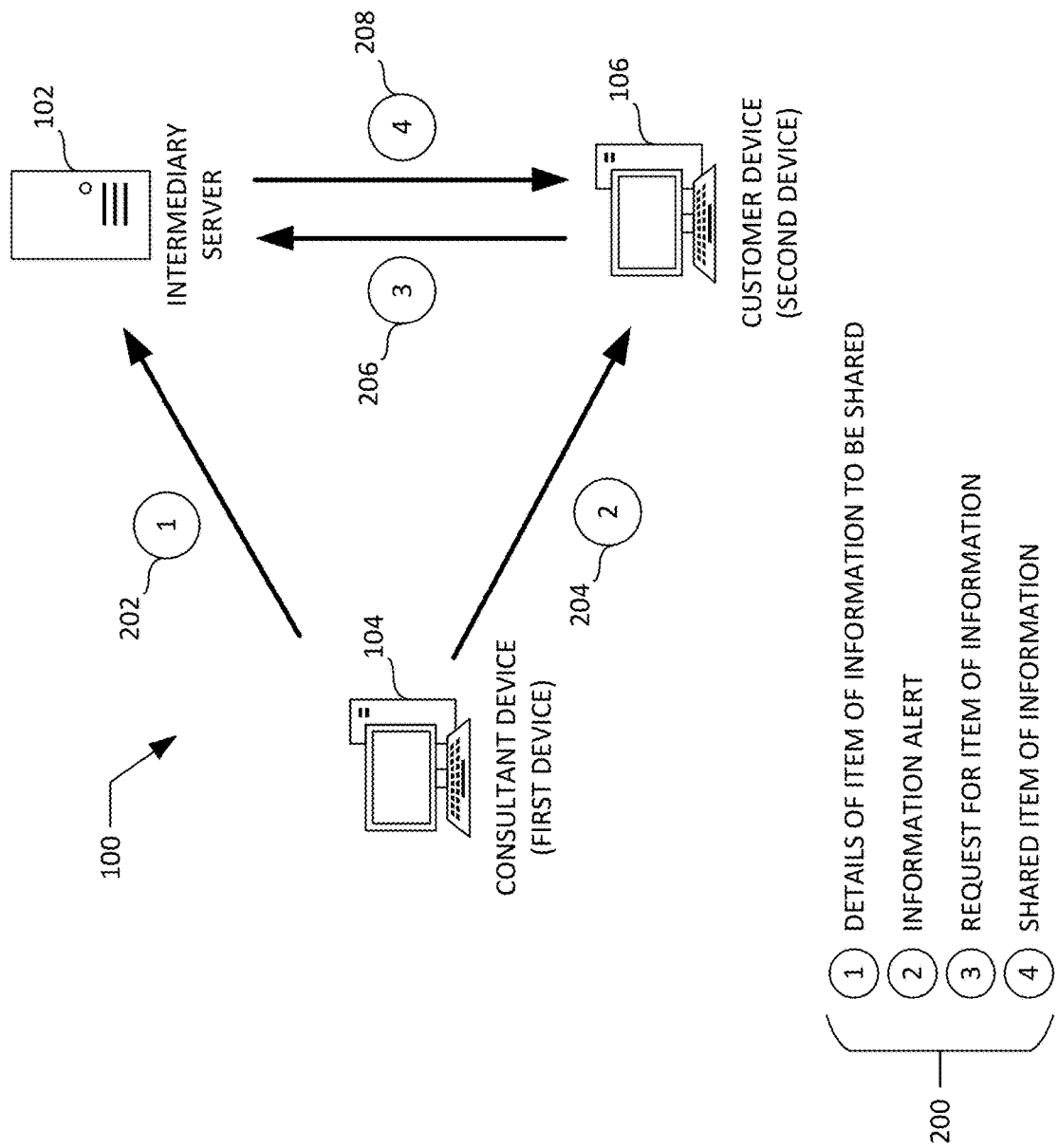

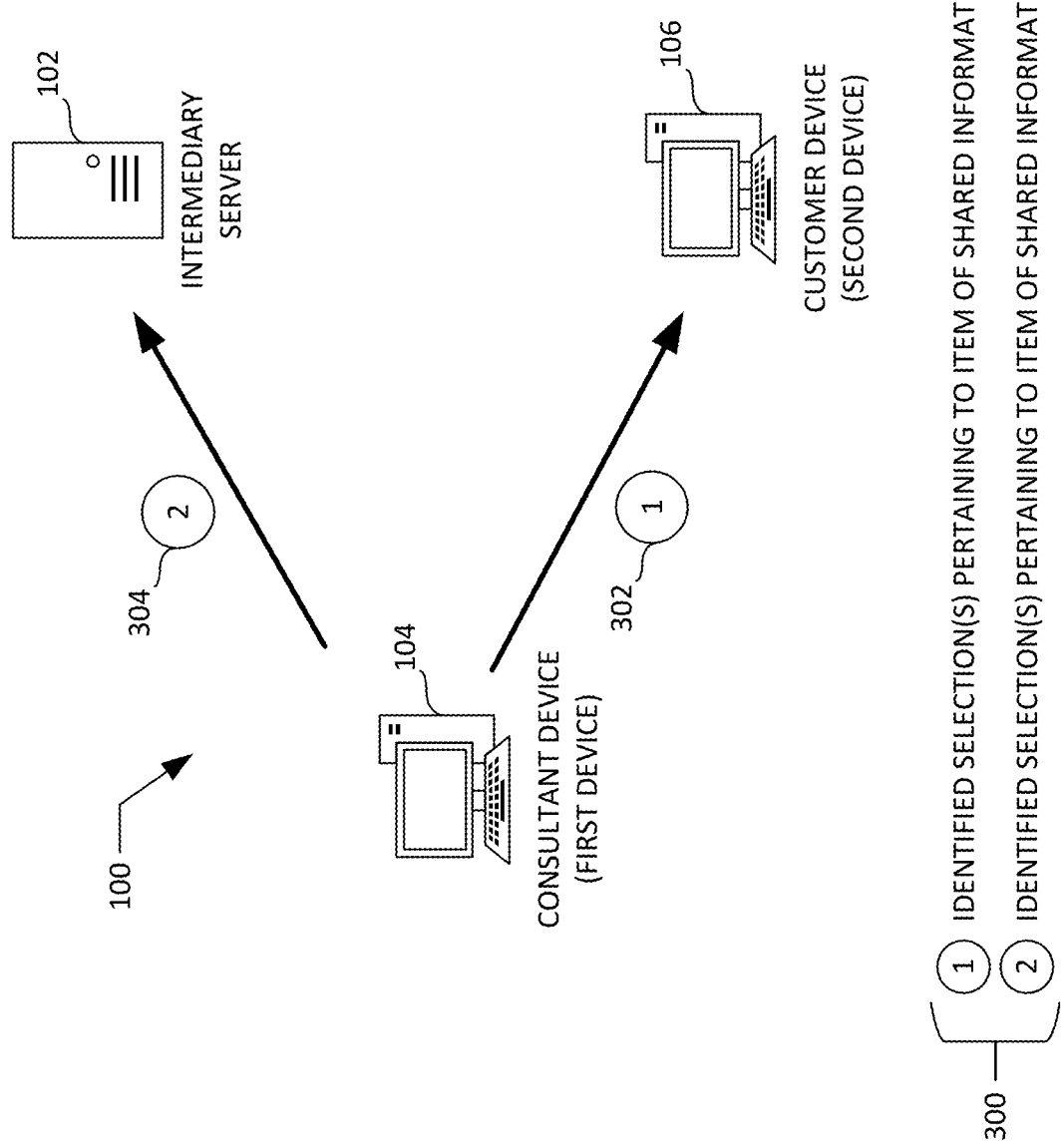

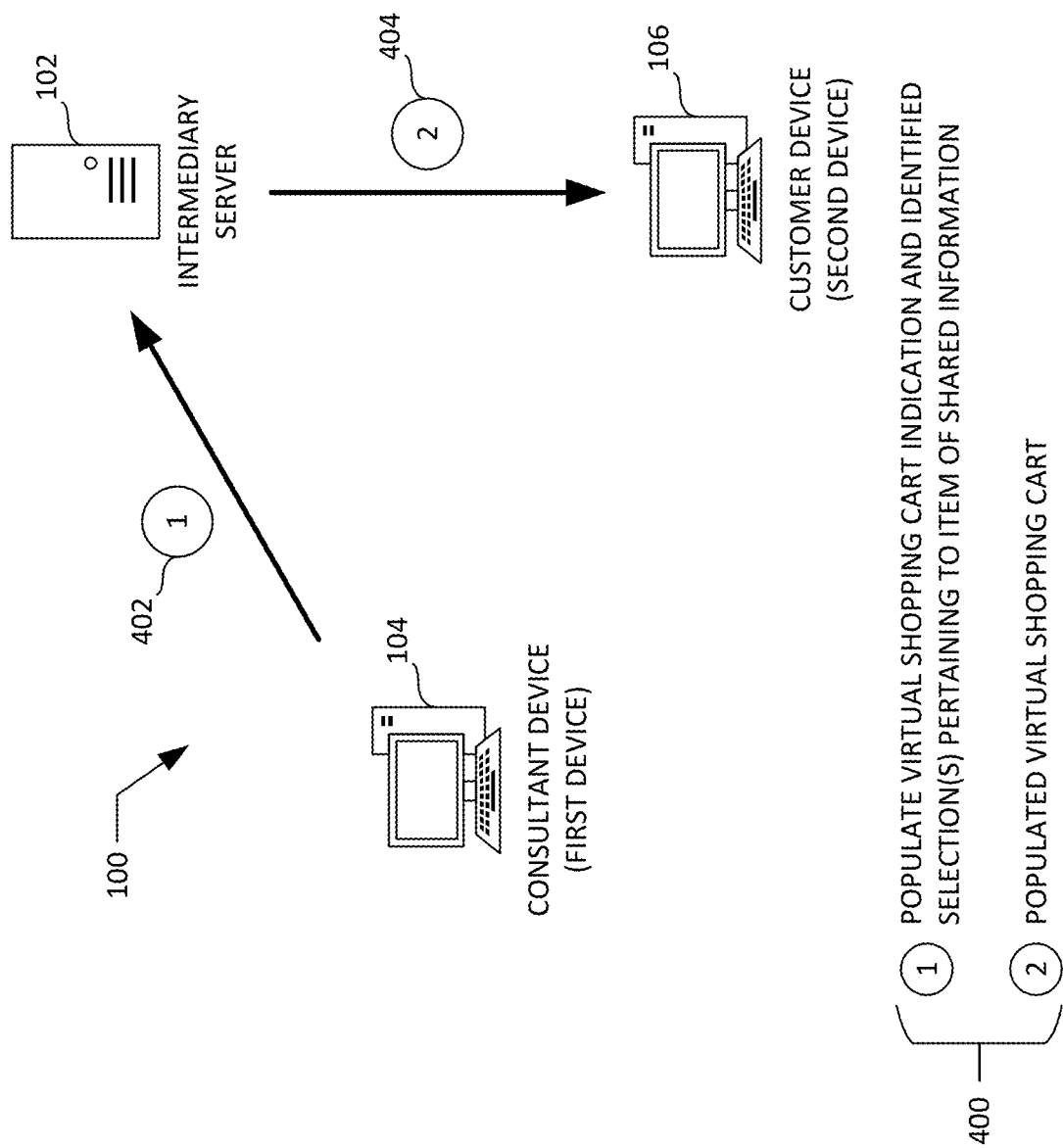

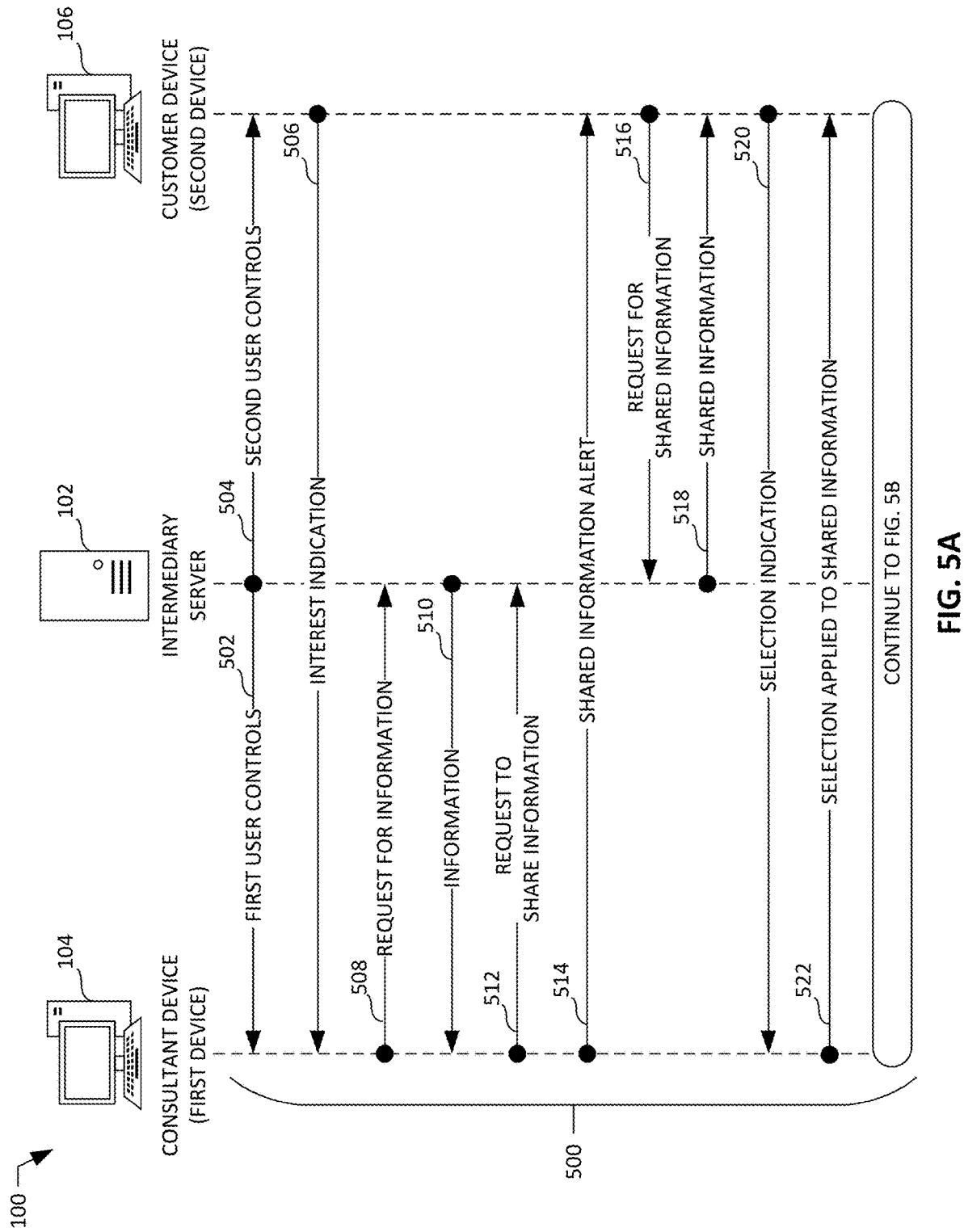

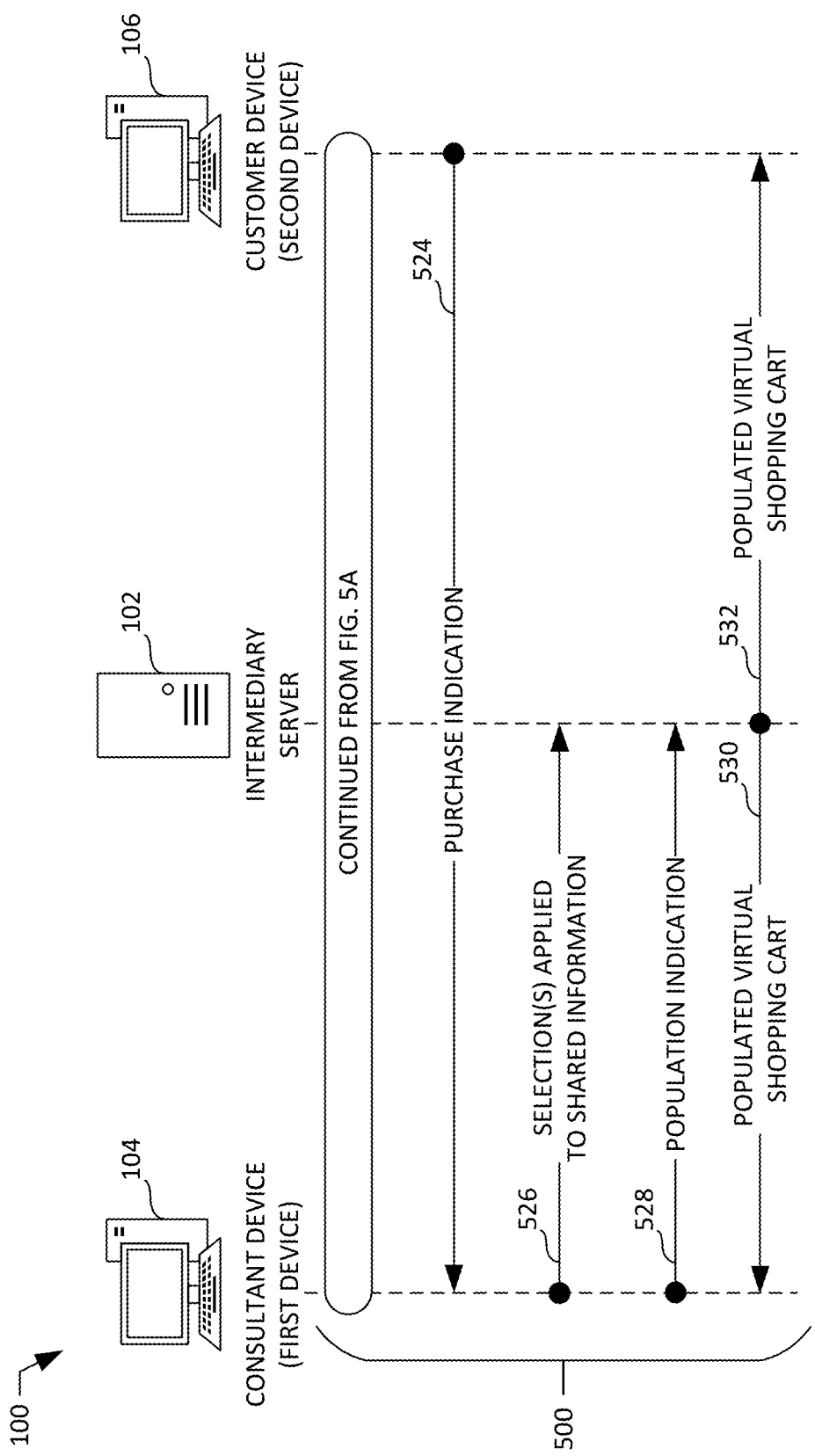

FIG. 13

ALL BEER PRODUCT LISTINGS

| CATEGORY | BRAND | PRODUCT | TYPE | SIZE | PRICE |
|---|---|---|---|---|---|
| BEER | BUDWEISER | BUD LIGHT | IPA | 16OZ | $16.99 |
| BEER | BUDWEISER | BUD LIGHT | IPA | 12OZ | $12.99 |
| BEER | BUDWEISER | BUD LIGHT | LAGER | 16OZ | $14.99 |
| BEER | BUDWEISER | BUD LIGHT | LAGER | 12OZ | $10.99 |
| BEER | BUDWEISER | BUDWEISER SELECT | LAGER | 16OZ | $14.99 |
| BEER | BUDWEISER | BUDWEISER SELECT | LAGER | 12OZ | $10.99 |
| BEER | MILLER | MILLER LIGHT | IPA | 16 OZ | $13.99 |
| BEER | MILLER | MILLER LIGHT | IPA | 12OZ | $11.99 |
| BEER | MILLER | MILLER HIGH LIFE | LAGER | 16OZ | $14.99 |
| BEER | MILLER | MILLER HIGH LIFE | LAGER | 12OZ | $12.99 |
| BEER | MILLER | BLUE MOON | BROWN ALE | 16OZ | $16.99 |
| BEER | MILLER | BLUE MOON | BROWN ALE | 12OZ | $14.99 |
| BEER | MILLER | COORS LIGHT | LAGER | 16OZ | $10.99 |
| BEER | MILLER | COORS LIGHT | LAGER | 12OZ | $8.99 |
| BEER | HEINEKEN | HEINEKEN | LAGER | 16OZ | $13.99 |
| BEER | HEINEKEN | HEINEKEN | LAGER | 8OZ | $11.99 |
| BEER | HEINEKEN | NEW CASTLE | BROWN ALE | 16OZ | $13.99 |
| BEER | HEINEKEN | NEW CASTLE | BROWN ALE | 12OZ | $11.99 |
| BEER | HEINEKEN | HEINEKEN LIGHT | IPA | 12OZ | $12.99 |

YOUR FILES
SEARCH
SKELETONS ▼
- ALCOHOLIC BEVERAGES
- ALL BEER PRODUCTS
- ANIMAL FOOD
- BABY FOODS
- CANNED VEGETABLES
- CEREALS
- CHEESE
- CONDIMENTS/SAUCES
- CRACKERS
- DETERGENTS
- DISPOSABLE DIAPERS
- FRESH PRODUCE
- FROZEN PIZZA
- HOUSEHOLD CLEANERS
- ICE CREAMS
- JAMS/JELLIES
- JUICES/DRINKS
- MEAL STARTERS
- MILK
- NUTS
- PACKAGED CAKE MIX

FIG. 14

| CATEGORY ▼ | BRAND ▼ | PRODUCT ▼ | TYPE ▼ | SIZE ▼ | CONTAINER ▼ |
|---|---|---|---|---|---|
| BEER | BUDWEISER | BUD LIGHT | IPA | 16 OZ | CAN |
| BEER | BUDWEISER | BUD LIGHT | IPA | 12 OZ | CAN |
| BEER | BUDWEISER | BUD LIGHT | LAGER | 16 OZ | BOTTLE |
| BEER | BUDWEISER | BUD LIGHT | LAGER | 12 OZ | BOTTLE |
| BEER | BUDWEISER | BUDWEISER SELECT | LAGER | 16 OZ | BOTTLE |
| BEER | BUDWEISER | BUDWEISER SELECT | LAGER | 12 OZ | BOTTLE |
| BEER | HEINEKEN | HEINEKEN | LAGER | 8 OZ | BOTTLE |
| BEER | HEINEKEN | HEINEKEN | IPA | 12 OZ | BOTTLE |
| BEER | HEINEKEN | HEINEKEN LIGHT | BROWN ALE | 16 OZ | BOTTLE |
| BEER | HEINEKEN | NEW CASTLE | BROWN ALE | 12 OZ | BOTTLE |
| BEER | MILLER | NEW CASTLE | BROWN ALE | 16 OZ | BOTTLE |
| BEER | MILLER | BLUE MOON | LAGER | 12 OZ | BOTTLE |
| BEER | MILLER | BLUE MOON | LAGER | 16 OZ | CAN |
| BEER | MILLER | COORS LIGHT | LAGER | 12 OZ | CAN |
| BEER | MILLER | COORS LIGHT | LAGER | 16 OZ | BOTTLE |
| BEER | MILLER | MILLER HIGH LIFE | LAGER | 12 OZ | BOTTLE |
| BEER | MILLER | MILLER HIGH LIFE | IPA | 16 OZ | CAN |
| BEER | MILLER | MILLER LIGHT | IPA | 12 OZ | CAN |
| BEER | MILLER | MILLER LIGHT | | | |

ALL BEER PRODUCT LISTINGS

1400

SEND    SHARE

YOUR FILES
SEARCH
SKELETONS ▼
ALCOHOLIC BEVERAGES
ALL BEER PRODUCTS
ANIMAL FOOD
BABY FOODS
CANNED VEGETABLES
CEREALS
CHEESE
CONDIMENTS/SAUCES
CRACKERS
DETERGENTS
DISPOSABLE DIAPERS
FRESH PRODUCE
FROZEN PIZZA
HOUSEHOLD CLEANERS
ICE CREAMS
JAMS/JELLIES
JUICES/DRINKS
MEAL STARTERS
MILK
NUTS
PACKAGES CAKE MIX

| CATEGORY | BRAND | PRODUCT | TYPE | SIZE | PRICE |
|---|---|---|---|---|---|
| BEER | BUDWEISER | BUD LIGHT | IPA | 16OZ | $16.99 |
| BEER | BUDWEISER | BUD LIGHT | IPA | 12OZ | $12.99 |
| BEER | BUDWEISER | BUD LIGHT | LAGER | 16OZ | $14.99 |
| BEER | BUDWEISER | BUD LIGHT | LAGER | 12OZ | $10.99 |
| BEER | BUDWEISER | BUDWEISER SELECT | LAGER | 16OZ | $14.99 |
| BEER | BUDWEISER | BUDWEISER SELECT | LAGER | 12OZ | $10.99 |
| BEER | MILLER | MILLER LIGHT | IPA | 16 OZ | $13.99 |
| BEER | MILLER | MILLER LIGHT | IPA | 12OZ | $11.99 |
| BEER | MILLER | MILLER HIGH LIFE | LAGER | 16OZ | $14.99 |
| BEER | MILLER | MILLER HIGH LIFE | LAGER | 12OZ | $12.99 |
| BEER | MILLER | BLUE MOON | BROWN ALE | 16OZ | $16.99 |
| BEER | MILLER | BLUE MOON | BROWN ALE | 12OZ | $14.99 |
| BEER | MILLER | COORS LIGHT | LAGER | 16OZ | $10.99 |
| BEER | MILLER | COORS LIGHT | LAGER | 12OZ | $8.99 |
| BEER | HEINEKEN | HEINEKEN | LAGER | 12OZ | $13.99 |
| BEER | HEINEKEN | HEINEKEN | LAGER | 8OZ | $11.99 |
| BEER | HEINEKEN | NEW CASTLE | BROWN ALE | 16OZ | $13.99 |
| BEER | HEINEKEN | NEW CASTLE | BROWN ALE | 12OZ | $11.99 |
| BEER | HEINEKEN | HEINEKEN LIGHT | IPA | 12OZ | $12.99 |

FIG. 15

REPORT BUILDER

ALL BEER PRODUCT LISTINGS

| CATEGORY | BRAND | PRODUCT | TYPE | SIZE | PRICE |
|---|---|---|---|---|---|
| BEER | BUDWEISER | BUD LIGHT | IPA | 16OZ | $16.99 |
| BEER | BUDWEISER | BUD LIGHT | IPA | 12OZ | $12.99 |
| BEER | BUDWEISER | BUD LIGHT | LAGER | 16OZ | $14.99 |
| BEER | BUDWEISER | BUD LIGHT | LAGER | 12OZ | $10.99 |
| BEER | BUDWEISER | BUDWEISER SELECT | LAGER | 16OZ | $14.99 |
| BEER | BUDWEISER | BUDWEISER SELECT | LAGER | 12OZ | $10.99 |
| BEER | MILLER | MILLER LIGHT | IPA | 16 OZ | $13.99 |
| BEER | MILLER | MILLER LIGHT | IPA | 12OZ | $11.99 |
| BEER | MILLER | MILLER HIGH LIFE | LAGER | 16OZ | $14.99 |
| BEER | MILLER | MILLER HIGH LIFE | LAGER | 12OZ | $12.99 |
| BEER | MILLER | BLUE MOON | BROWN ALE | 16OZ | $16.99 |
| BEER | MILLER | BLUE MOON | BROWN ALE | 12OZ | $14.99 |
| BEER | MILLER | COORS LIGHT | LAGER | 16OZ | $10.99 |
| BEER | MILLER | COORS LIGHT | LAGER | 12OZ | $9.99 |
| BEER | HEINEKEN | HEINEKEN | LAGER | 8OZ | $13.99 |
| BEER | HEINEKEN | HEINEKEN | LAGER | 16OZ | $11.99 |
| BEER | HEINEKEN | NEW CASTLE | BROWN ALE | 16OZ | $13.99 |
| BEER | HEINEKEN | NEW CASTLE | BROWN ALE | 12OZ | $11.99 |
| BEER | HEINEKEN | HEINEKEN LIGHT | IPA | 12OZ | $12.99 |

CATEGORY / LOCATION / FACTS / CHANNELS / DATE RANGE

SEND    SHARE

| CATEGORY | BRAND | PRODUCT | TYPE | SIZE | PRICE |
|---|---|---|---|---|---|
| BEER | BUDWEISER | BUD LIGHT | IPA | 16OZ | $16.99 |
| BEER | BUDWEISER | BUD LIGHT | IPA | 12OZ | $12.99 |
| BEER | BUDWEISER | BUD LIGHT | LAGER | 16OZ | $14.99 |
| BEER | BUDWEISER | BUD LIGHT | LAGER | 12OZ | $10.99 |
| BEER | BUDWEISER | BUDWEISER SELECT | LAGER | 16OZ | $14.99 |
| BEER | BUDWEISER | BUDWEISER SELECT | LAGER | 12OZ | $10.99 |
| BEER | MILLER | MILLER LIGHT | IPA | 16 OZ | $13.99 |
| BEER | MILLER | MILLER LIGHT | IPA | 12OZ | $11.99 |
| BEER | MILLER | MILLER HIGH LIFE | LAGER | 16OZ | $14.99 |
| BEER | MILLER | MILLER HIGH LIFE | LAGER | 12OZ | $12.99 |
| BEER | MILLER | BLUE MOON | BROWN ALE | 16OZ | $16.99 |
| BEER | MILLER | BLUE MOON | BROWN ALE | 12OZ | $14.99 |
| BEER | MILLER | COORS LIGHT | LAGER | 16OZ | $10.99 |
| BEER | MILLER | COORS LIGHT | LAGER | 12OZ | $8.99 |
| BEER | HEINEKEN | HEINEKEN | LAGER | 12OZ | $13.99 |
| BEER | HEINEKEN | HEINEKEN | LAGER | 8OZ | $11.99 |
| BEER | HEINEKEN | NEW CASTLE | BROWN ALE | 16OZ | $13.99 |
| BEER | HEINEKEN | NEW CASTLE | BROWN ALE | 12OZ | $11.99 |
| BEER | HEINEKEN | HEINEKEN LIGHT | IPA | 12OZ | $12.99 |

1700

REPORT BUILDER
- CATEGORY
- LOCATION
- FACTS
- CHANNELS
- DATE RANGE

| CATEGORY | BRAND | PRODUCT | TYPE | SIZE | PRICE |
|---|---|---|---|---|---|
| BEER | BUDWEISER | BUD LIGHT | IPA | 16OZ | $16.99 |
| BEER | BUDWEISER | BUD LIGHT | IPA | 12OZ | $12.99 |
| BEER | BUDWEISER | BUD LIGHT | LAGER | 16OZ | $14.99 |
| BEER | BUDWEISER | BUD LIGHT | LAGER | 12OZ | $10.99 |
| BEER | BUDWEISER | BUDWEISER SELECT | LAGER | 16OZ | $14.99 |
| BEER | BUDWEISER | BUDWEISER SELECT | LAGER | 12OZ | $10.99 |
| BEER | MILLER | MILLER LIGHT | IPA | 16 OZ | $13.99 |
| BEER | MILLER | MILLER LIGHT | IPA | 12OZ | $11.99 |
| BEER | MILLER | MILLER HIGH LIFE | LAGER | 16OZ | $14.99 |
| BEER | MILLER | MILLER HIGH LIFE | LAGER | 12OZ | $12.99 |
| BEER | MILLER | BLUE MOON | BROWN ALE | 16OZ | $16.99 |
| BEER | MILLER | BLUE MOON | BROWN ALE | 12OZ | $14.99 |
| BEER | MILLER | COORS LIGHT | LAGER | 16OZ | $10.99 |
| BEER | MILLER | COORS LIGHT | LAGER | 12OZ | $9.99 |
| BEER | HEINEKEN | HEINEKEN | LAGER | 8OZ | $13.99 |
| BEER | HEINEKEN | HEINEKEN | LAGER | 12OZ | $11.99 |
| BEER | HEINEKEN | NEW CASTLE | BROWN ALE | 16OZ | $13.99 |
| BEER | HEINEKEN | NEW CASTLE | BROWN ALE | 12OZ | $11.99 |
| BEER | HEINEKEN | HEINEKEN LIGHT | IPA | 12OZ | $12.99 |

REPORT BUILDER
- CATEGORY
- LOCATION
- • SEATTLE, WA
- FACTS
- CHANNELS
- DATE RANGE

FIG. 22

| CATEGORY | BRAND | PRODUCT | TYPE | SIZE | PRICE |
|---|---|---|---|---|---|
| BEER | BUDWEISER | BUD LIGHT | IPA | 16OZ | $16.99 |
| BEER | BUDWEISER | BUD LIGHT | IPA | 12OZ | $12.99 |
| BEER | BUDWEISER | BUD LIGHT | LAGER | 16OZ | $14.99 |
| BEER | | | | | $10.99 |
| BEER | | | | | $14.99 |
| BEER | | CHANNELS | | | $10.99 |
| BEER | | | DOLLAR STORES | | $13.99 |
| BEER | | CONVENIENCE | | | $11.99 |
| BEER | | | CLUB & MEMBER STORES | | $14.99 |
| BEER | | GROCERY STORES | | | $12.99 |
| BEER | | | FOOD & DRUG STORES | | $16.99 |
| BEER | | MASS RETAILER | | | |
| BEER | MILLER | BLUE MOON | BROWN ALE | 12OZ | $14.99 |
| BEER | MILLER | COORS LIGHT | LAGER | 16OZ | $10.99 |
| BEER | MILLER | COORS LIGHT | LAGER | 12OZ | $8.99 |
| BEER | HEINEKEN | HEINEKEN | LAGER | 12OZ | $13.99 |
| BEER | HEINEKEN | HEINEKEN | LAGER | 8OZ | $11.99 |
| BEER | HEINEKEN | NEW CASTLE | BROWN ALE | 16OZ | $13.99 |
| BEER | HEINEKEN | NEW CASTLE | BROWN ALE | 12OZ | $11.99 |
| BEER | HEINEKEN | HEINEKEN LIGHT | IPA | 12OZ | $12.99 |

REPORT BUILDER
- CATEGORY
- LOCATION
- FACTS
- CHANNELS
- DATE RANGE

| REPORT BUILDER | | SEND | ALL BEER PRODUCT LISTINGS | | | | SHARE |
|---|---|---|---|---|---|---|---|
| CATEGORY × | | CATEGORY | BRAND | PRODUCT | TYPE | SIZE | PRICE |
| • ALL BEER | | BEER | BUDWEISER | BUD LIGHT | IPA | 16OZ | $16.99 |
| LOCATION × | | BEER | BUDWEISER | BUD LIGHT | IPA | 12OZ | $12.99 |
| • SEATTLE, WA | | BEER | BUDWEISER | BUD LIGHT | LAGER | 16OZ | $14.99 |
| FACTS × | | BEER | BUDWEISER | BUD LIGHT | LAGER | 12OZ | $10.99 |
| • DOLLAR SALES | | BEER | BUDWEISER | BUDWEISER SELECT | LAGER | 16OZ | $14.99 |
| • MARKETSHARE | | BEER | BUDWEISER | BUDWEISER SELECT | LAGER | 12OZ | $10.99 |
| CHANNELS × | | BEER | MILLER | MILLER LIGHT | IPA | 16 OZ | $13.99 |
| • CONVENIENCE | | BEER | MILLER | MILLER LIGHT | IPA | 12OZ | $11.99 |
| DATE RANGE × | | BEER | MILLER | MILLER HIGH LIFE | LAGER | 16OZ | $14.99 |
| • 2 x 26 WKS (2/25/15) | | BEER | MILLER | BLUE MOON | BROWN ALE | 16OZ | $12.99 |
| | | BEER | MILLER | BLUE MOON | BROWN ALE | 12OZ | $16.99 |
| | | BEER | MILLER | COORS LIGHT | LAGER | 16OZ | $14.99 |
| | | BEER | MILLER | COORS LIGHT | LAGER | 12OZ | $10.99 |
| PRICE: $5,000 | | BEER | HEINEKEN | HEINEKEN | LAGER | 8OZ | $8.99 |
| | | BEER | HEINEKEN | HEINEKEN | LAGER | 12OZ | $13.99 |
| ADD TO CART | | BEER | HEINEKEN | NEW CASTLE | BROWN ALE | 16OZ | $11.99 |
| | | BEER | HEINEKEN | NEW CASTLE | BROWN ALE | 12OZ | $13.99 |
| | | BEER | HEINEKEN | HEINEKEN LIGHT | IPA | 12OZ | $11.99 |
| | | BEER | | | | 12OZ | $12.99 |

FIG. 29

PAYMENT

NAME ON CARD
JOHN SMITH

CARD NUMBER
1234 5678 9012 3456

EXPIRATION DATE        CSV CODE
JANUARY 2016            123

CANCEL          SUBMIT

APPARATUS FOR FACILITATING A SALES TRANSACTION VIA AN INTERACTIVE DISPLAY PLATFORM

CROSS REFERENCE TO RELATED APPLICATIONS

This patent arises from a continuation of U.S. patent application Ser. No. 16/244,858, filed Jan. 10, 2019, which is a continuation of U.S. patent application Ser. No. 14/801, 291, filed Jul. 16, 2015, which claims priority to U.S. Provisional Patent Application Ser. No. 62/148,592, filed Apr. 16, 2015. The entireties of U.S. patent application Ser. No. 16/244,858, U.S. patent application Ser. No. 14/801, 291, and U.S. Provisional Patent Application No. 61/148, 592 are incorporated by reference herein.

FIELD OF THE DISCLOSURE

This disclosure relates generally to interactive display platforms, and, more particularly, to methods and apparatus for facilitating a sales transaction via an interactive display platform.

BACKGROUND

E-commerce display platforms enable customers to shop for and/or purchase products via the Internet. Screen sharing platforms enable information to be displayed contemporaneously, concurrently and/or simultaneously on multiple computer devices having displays.

BRIEF DESCRIPTION OF THE DRAWINGS

FIG. 2 is a communication flow diagram illustrating the example interactive display system of FIG. 1 sharing information across two example user devices in communication with an intermediary server.

FIG. 3 is a communication flow diagram illustrating transmission of a selection in the example interactive display system of FIG. 1.

FIG. 4 is a communication flow diagram to populate a virtual shopping cart in the example interactive display system of FIG. 1.

FIGS. 5A and 5B are communication flow diagrams illustrating the example interactive display system of FIG. 1 facilitating a sales transaction conducted in real time between a consultant associated with an example consultant device and a customer associated with an example customer device.

FIG. 13 is another example consultant-side shared information user interface that may be used in the example interactive display system of FIG. 1 for display on an example consultant device.

FIG. 14 is another example consultant side-shared information user interface that may be used in the example interactive display system of FIG. 1 for display on an example consultant device.

FIG. 15 is another example customer-side shared information user interface that may be used in the example interactive display system of FIG. 1 for display on an example customer device.

FIG. 16 is a yet another example consultant-side shared information user interface that may be used in the example interactive display system of FIG. 1 for display on an example consultant device.

FIG. 17 is yet another example customer-side shared information user interface that may be used in the example interactive display system of FIG. 1 for display on an example customer device.

FIG. 18 is the example consultant-side shared information user interface of FIG. 16 further including available category selections that may be used in the example interactive display system of FIG. 1 for display on an example consultant device.

FIG. 22 is the example customer-side shared information user interface of FIG. 17 further including a location selection that may be used in the example interactive display system of FIG. 1 for display on an example customer device.

FIG. 26 is the example customer-side shared information user interface of FIG. 17 further including available channel selections that may be used in the example interactive display system of FIG. 1 for display on an example customer device.

FIG. 27 is the example consultant-side shared information user interface of FIG. 16 further including available date range selections that may be used in the example interactive display system of FIG. 1 for display on an example consultant device.

FIG. 28 is the example customer-side shared information user interface of FIG. 17 further including available date range selections that may be used in the example interactive display system of FIG. 1 for display on an example customer device.

FIG. 29 is the example consultant-side shared information user interface of FIG. 16 further including selections to be used to populate a virtual shopping cart that may be used in the example interactive display system of FIG. 1 for display on an example consultant device.

FIG. 31 is an example customer payment user interface that may be used in the example interactive display system of FIG. 1 for display on an example customer device.

The figures are not to scale. Wherever possible, the same reference numbers will be used throughout the drawing(s) and accompanying written description to refer to the same or like parts.

DETAILED DESCRIPTION

Figure 1:
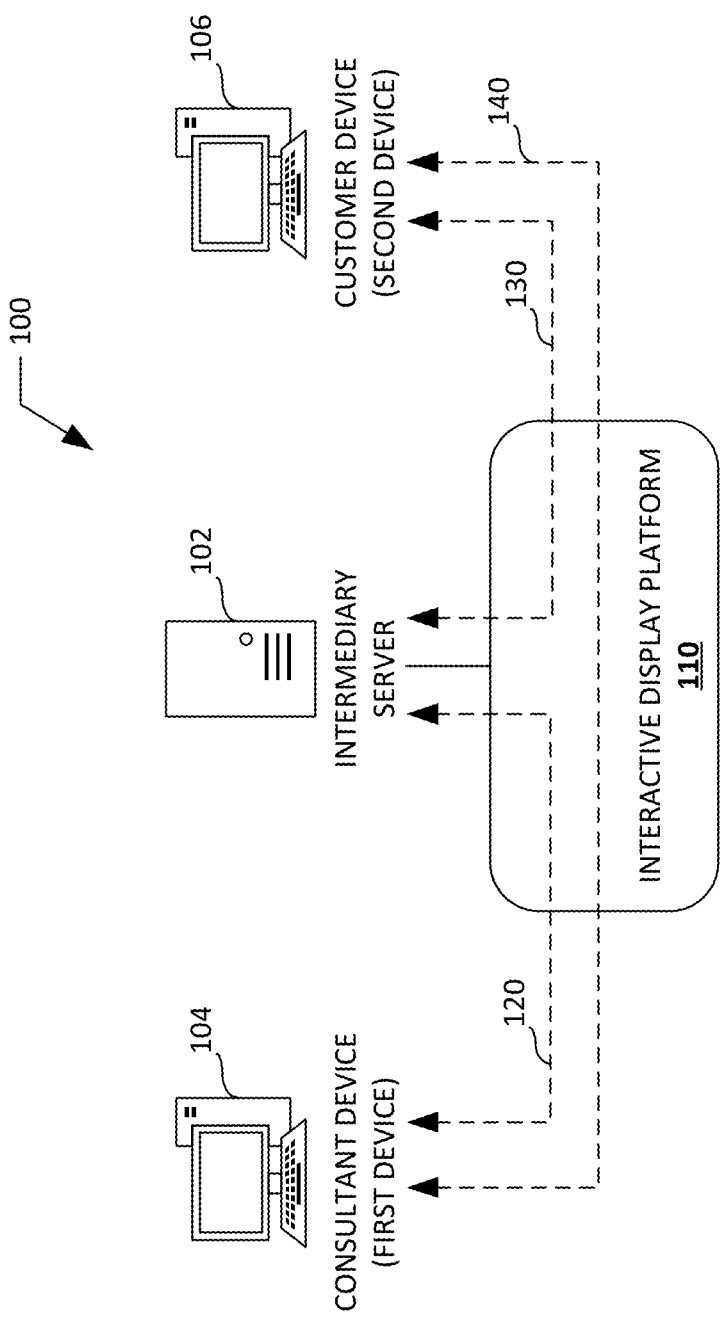
FIG. 1 is an example interactive display system constructed in accordance with the teachings of this disclosure for facilitating a sales transaction conducted in real time between a consultant associated with a consultant device and a customer associated with a customer device.

Examples disclosed herein enable providing real-time interactive shopping and/or sales sessions in e-commerce platforms so that a consultant can guide a customer through a sales transaction process by: sharing information with the customer across a network-based sales session, responding to selections indicated by the customer in relation to the shared information, and/or populating a virtual shopping cart for the customer based on any selections applied to the shared information.

Example methods, systems, and apparatus disclosed herein facilitate a sales transaction conducted in real time, via an interactive display system, between a consultant associated with a consultant device and a customer associated with a customer device. In some examples, independent user interaction control capabilities are assigned to the consultant device and the customer device for controlling the sharing of information, the identification of selections pertaining to the shared information and/or the population of a virtual shopping cart based on the selections, and/or for interacting with the shared information, selections and/or populated virtual shopping cart. In some examples, the user interaction control capabilities assigned to the consultant device are different from and/or are non-overlapping relative to the user interaction control capabilities assigned to the customer device.

In some examples, an intermediary server in communication with both the consultant device and the customer device provides shared information to present contemporaneously, concurrently and/or simultaneously on the consultant device and the customer device. In some examples, the shared information is based on an interest indication received at the consultant device from the customer device. The shared information may include data representing a plurality of products available for purchase. Disclosed example methods, systems, and apparatus facilitate a sales transaction involving any type of product and/or service. In some examples, the sales transaction involves the sale of a report containing product data. Example product data may include sales figures for numerous products and/or services in different geographic regions.

In some examples, the shared information provided via the intermediary server to present on the customer device is based on a request received at the intermediary server from the consultant device to share the shared information. In some such examples, the shared information is also provided based on a request received at the intermediary server from the customer device for the shared information. The request for the shared information is based on a shared information alert received at the customer device from the consultant device.

In some examples, in response to a selection indication received at the consultant device from the customer device, the consultant device applies a selection to the shared information and provides the applied selection to present contemporaneously, concurrently and/or simultaneously on the consultant device and the customer device. The applied selection may be based on a filter applied to the data representing the plurality of products available for purchase. In some examples, the applied selection is at least one of a category selection, a location selection, a fact selection, a channel selection, or a date range selection.

In some examples, in response to a purchase indication received at the consultant device from the customer device and a population indication received at the intermediary server from the consultant device, the intermediary server provides a populated virtual shopping cart to present contemporaneously, concurrently and/or simultaneously on the consultant device and the customer device. The population indication may be based on the purchase indication, and the purchase indication may be based on the applied selections. In some examples, the virtual shopping cart includes a representation of the shared information and any applied selections.

In some examples, the intermediary server and/or the interactive display platform provide(s) a peer-to-peer connection between the consultant device and the customer device. In some examples, the peer-to-peer connection hosts at least one of a text chat communication session, a video chat communication session, or a voice over internet protocol communication session between the consultant device and the customer device. In some examples, the consultant device receives one or more communications from the customer device via the peer-to-peer connection. In some examples, the communication(s) received by the consultant device from the customer device via the peer-to-peer connection include one or more of an interest indication, a selection indication, or a purchase indication. In some examples, the customer device receives one or more communications from the consultant device via the peer-to-peer connection. In some examples, the communication(s) received by the customer device from the consultant device via the peer-to-peer connection includes a shared information alert.

FIG. 1 is an example interactive display system 100 constructed in accordance with the teachings of this disclosure for facilitating a sales transaction conducted in real time between a consultant associated with a consultant device and a customer associated with a customer device. In the illustrated example, the interactive display system 100 includes an example intermediary server 102, an example consultant device 104 and an example customer device 106. However, fewer or additional structures may be implemented to carry out one or more portions of the functionalities implemented by the example intermediary server 102, the example consultant device 104, the example customer device 106, and/or other structures associated with one or more additional and/or alternative functions disclosed herein.

The example consultant device 104 and/or the example customer device 106 can be implemented using, for example, one or more of a server, a personal computer, a laptop computer, a tablet, a smartphone, or any other type of computing device that is capable of processing information (e.g., text, graphics and/or video information) to be displayed on a display device associated with the computing device. Examples of such display devices include CRT monitors, LCD monitors, LED monitors, plasma monitors, and televisions. The example consultant device 104 and/or the example customer device 106 may be associated with such a display device via a wired or wireless connection. As used herein, the terms "consultant device" and/or "customer device" should be understood to include a computing device along with any display device that may be associated with the computing device. For example, as illustrated in FIG. 1, the example consultant device 104 includes the illustrated desktop computer system unit (e.g., a tower) as well as the illustrated monitor.

In the illustrated example of FIG. 1, the example intermediary server 102 of the interactive display system 100 hosts an example interactive display platform 110. In the illustrated example, the interactive display platform 110 includes a web-based portal. The example consultant device 104 and the example customer device 106 are both able to communicate with the portal and, via the portal, are further able to communicate with the intermediary server 102 via the example first and second communication paths 120, 130 of FIG. 1. The example interactive display platform 110 and/or the example intermediary server 102 also provide(s) a peer-to-peer communication path 140 to establish a direct peer-to-peer connection between the example consultant device 104 and the example customer device 106. Thus, the example consultant device 104 is able to communicate directly with the example intermediary server 102 via the first communication path 120, or with the example customer device 106 via the peer-to-peer communication path 140. Similarly, the example customer device 106 is able to communicate directly with the example intermediary server 102 via the second communication path 130, or with the example consultant device 104 via the peer-to-peer communication path 140. The example peer-to-peer communication path 140 shown in FIG. 1 may alternatively be decentralized from the example intermediary server 102. That is, in some examples, the peer-to-peer communication path 140 may be established between the consultant device 104 and the customer device 106 without involvement of the intermediary server 102.

The communications by which the example interactive display system 100 of FIG. 1 facilitates a sales transaction between a consultant associated with the example consultant device 104 and a customer associated with the example customer device 106 begin by first establishing a session between the example intermediary server 102, the example consultant device 104 and the example customer device 106. To establish a session, the example customer device 106 accesses the example interactive display platform 110. The interactive display platform 110 in turn provides a customer session initiation user interface (e.g., an example user interface 600 shown in FIG. 6) for display on the example customer device 106.

Figure 6:
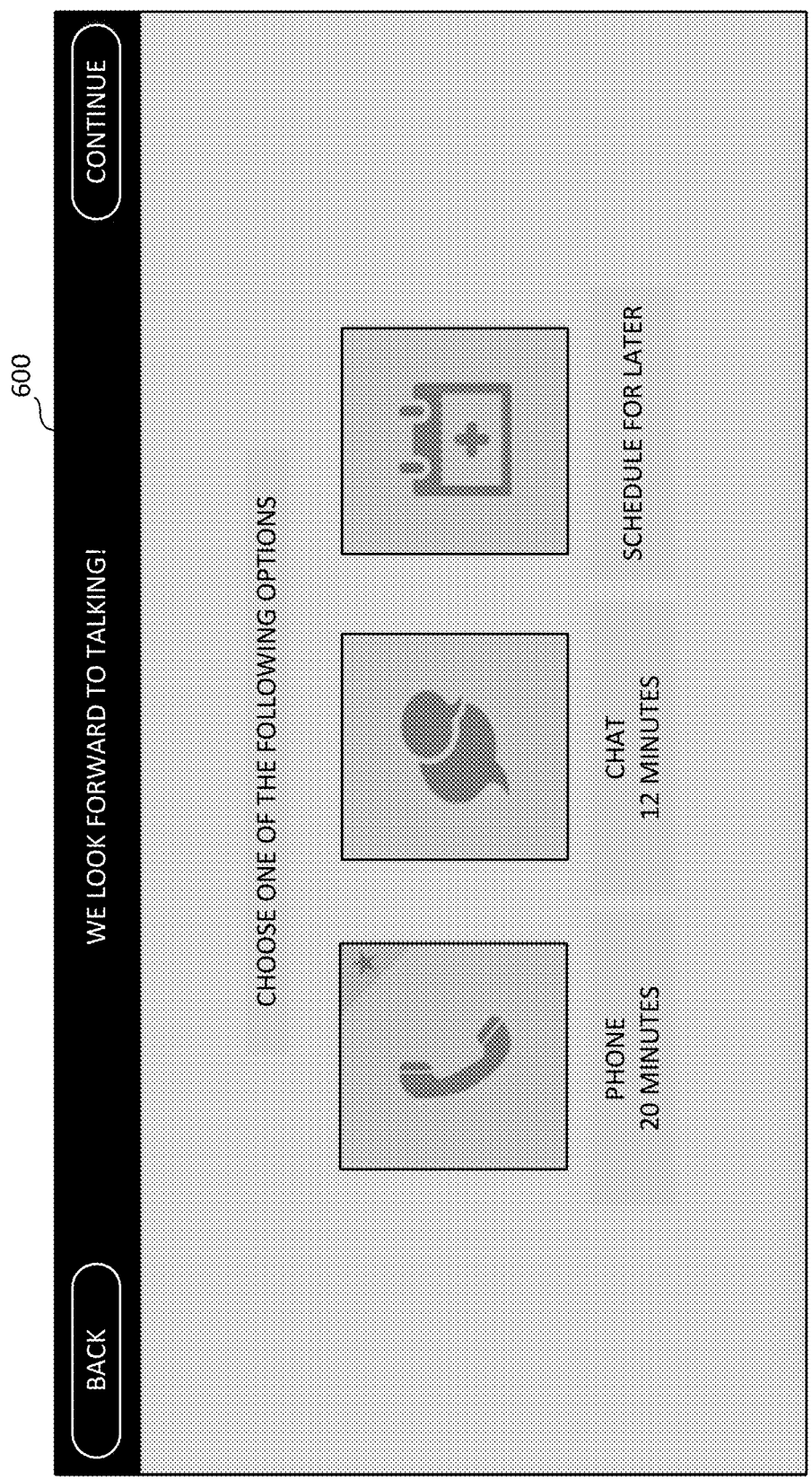
FIG. 6 is an example customer-side session request user interface that may be used in the example interactive display system of FIG. 1 for display on an example customer device to enable a customer to request and/or initiate a sales session.

FIG. 6 is an example customer-side session request user interface 600 that may be used in the example interactive display platform 110 of FIG. 1 for display on the example customer device 106. In the illustrated example, the customer device 106 is able to request a session that will permit the customer device 106 to communicate with the example consultant device 104 via phone or chat across one or more of the example communication paths 120, 130 and/or 140 of FIG. 1. Phone communications may include voice calls as well as video calls. Chat communications may include text chat as well as video chat. In the illustrated example of FIG. 6, the customer-side session request user interface 600 also provides the example customer device 106 with a wait time for each form of communication that is available for selection by the customer. For example, the illustrated customer-side session request user interface 600 indicates that communications via phone may commence in 20 minutes, and further indicates that communications via chat may commence in 12 minutes. The example customer-side session request user interface 600 also provides the customer device 106 with the ability to schedule a session for a later date and time.

Figure 7:
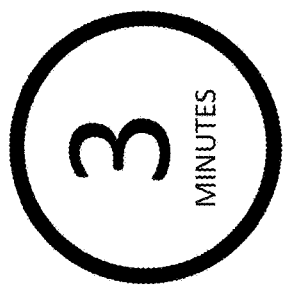
FIG. 7 is an example customer-side session waiting user interface that may be used in the example interactive display system of FIG. 1 for display on an example customer device.

When the example customer device 106 selects a session request option illustrated in FIG. 6, the example interactive display platform 110 provides a customer-side session waiting user interface for display on the example customer device 106. FIG. 7 is an example customer-side session waiting user interface 700 that may be used in the example interactive display platform 110 of FIG. 1 for display on the example customer device 106. In the illustrated example, the customer-side session waiting user interface 700 indicates to the example customer device 106 that a session will commence between the example customer device 106 and the example consultant device 104 in three minutes. The example customer-side session request user interface 700 also provides the customer device 106 with the ability to postpone the session to a later date and/or time, or to cancel the session.

Figure 8:
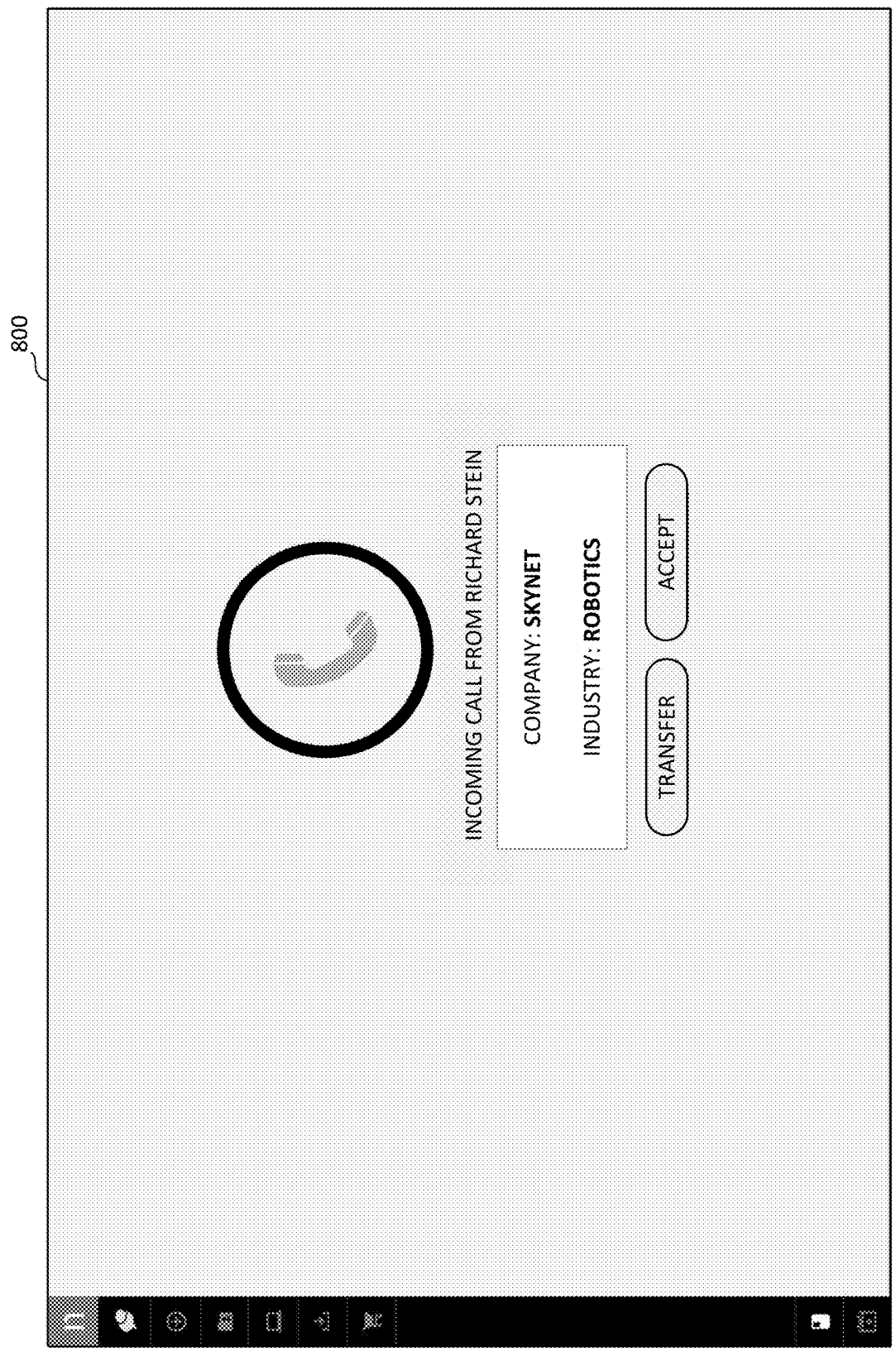
FIG. 8 is an example consultant-side session notification user interface that may be used in the example interactive display system of FIG. 1 for display on an example consultant device.

In further response to the example customer device 106 selecting a session request option illustrated in FIG. 6, the interactive display platform 110 also provides a consultant-side session notification user interface for display on the example consultant device 104. FIG. 8 is an example consultant-side session notification user interface 800 that may be used in the example interactive display platform 110 of FIG. 1 for display on the example consultant device 104. In the illustrated example, the consultant-side session notification user interface 800 indicates to the example consultant device 104 that a session is ready to commence between the example customer device 106 and the example consultant device 104. The example consultant-side session notification user interface 800 provides the consultant device 104 with the ability to accept the session or to pass the initiation of the session along to be handled by a different consultant device.

Figure 9:
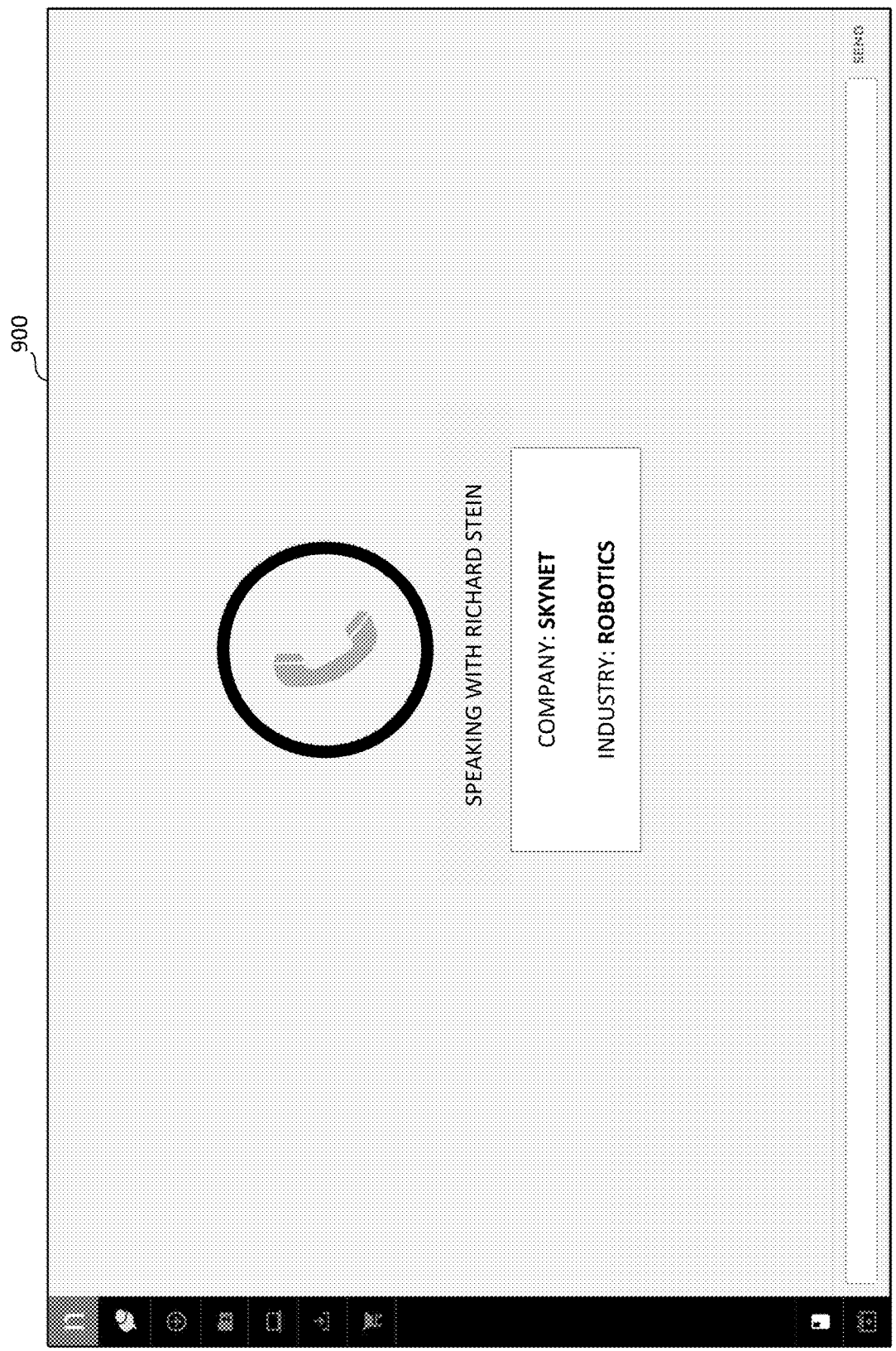
FIG. 9 is an example consultant-side session initiation user interface that may be used in the example interactive display system of FIG. 1 for display on an example consultant device.

When the example consultant device 104 selects the session acceptance option illustrated in FIG. 8, the example interactive display platform 110 provides a consultant-side session initiation user interface for display on the example consultant device 106. FIG. 9 is an example consultant-side session initiation user interface 900 that may be used in the example interactive display platform 110 of FIG. 1 for display on the example consultant device 106. In the illustrated example, the consultant-side session initiation user interface 900 indicates to the example consultant device 104 that a session has been initiated between the consultant device 104 and the example customer device 106. The example consultant-side session initiation user interface 900 may provide the consultant device 104 with information pertaining to the identity of a customer associated with the example customer device 106. For example, the consultant-side session initiation user interface 900 may identify the customer's name, a company with which the customer is affiliated, and/or an industry with which the customer's company is affiliated.

Figure 10:
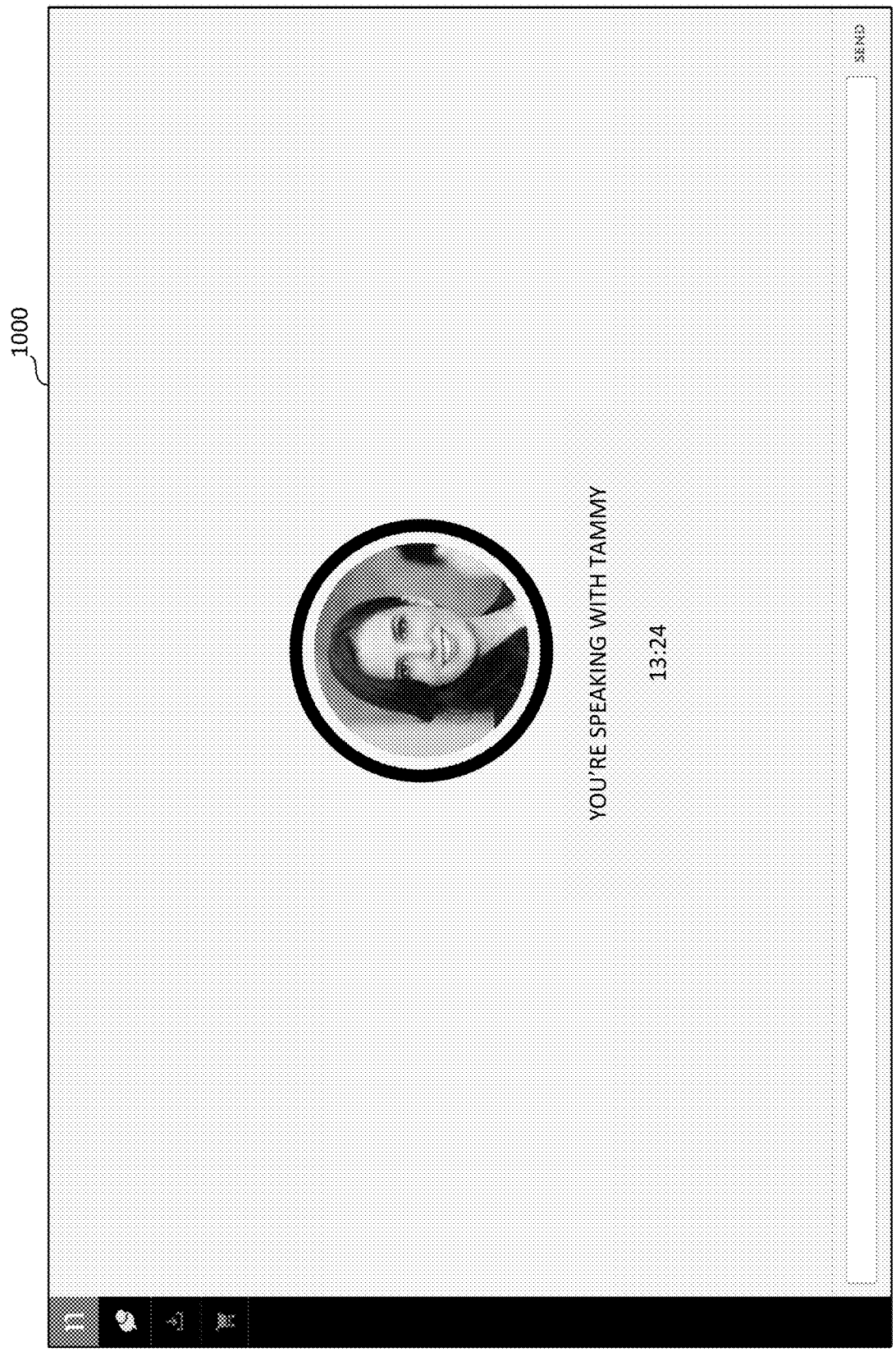
FIG. 10 is an example customer-side session initiation user interface that may be used in the example interactive display system of FIG. 1 for display on an example customer device.

When the example consultant device 104 selects the session acceptance option illustrated in FIG. 8, the interactive display platform 110 further provides a customer-side session initiation user interface for display on the example customer device 104. FIG. 10 is an example customer-side session initiation user interface 1000 that may be used in the example interactive display platform 110 of FIG. 1 for display on the example customer device 104. In the illustrated example, the customer-side session initiation user interface 1000 indicates to the example customer device 106 that a session has been initiated between the customer device 106 and the example consultant device 104. The example customer-side session initiation user interface 1000 may provide the customer device 106 with information pertaining to the identity of a consultant associated with the example consultant device 104. For example, the customer-side session initiation user interface 1000 may identify the consultant's name.

When a session has been established, the example interactive display system 100 of FIG. 1 facilitates a sales transaction between a consultant associated with the example consultant device 104 and a customer associated with the example customer device 106 by sharing information, identifying selections pertaining to the shared information, and populating a virtual shopping cart based on the selections. While the examples illustrated and described herein pertain primarily to a sales transaction involving the sale of a report containing data, the example interactive display system 100 of FIG. 1 can be used to facilitate a sales transaction involving any type of product and/or service. For example, the interactive display system 100 of FIG. 1 can facilitate the sale of physical objects, product data and/or reports, sales data and/or reports, market data and/or reports, segmentation data and/or reports, advertising data and/or reports, media ratings data and/or reports, transportation tickets, vacation packages, real estate, insurance policies, and/or other products and/or services.

In some examples, the example interactive display system 100 of FIG. 1 may additionally include a secondary consultant device associated with a secondary consultant. In some examples, the secondary consultant device is able to communicate with the portal described above and is able to communicate with the example intermediary server 102 via the portal. In some examples, the interactive display platform 110 and/or the example intermediary server 102 also provide(s) a communication path to establish a direct peer-to-peer connection between the secondary consultant device and the consultant device 104, and/or between the secondary consultant device and the customer device 106. Thus, the example secondary consultant device is able to communicate directly with the example intermediary server 102, with the example consultant device 104, and/or with the example customer device 106.

In some examples, the secondary consultant associated with the secondary consultant device may assist the consultant associated with the example consultant device 104, and/or may assist the customer associated with the example customer device 106, to facilitate a sales transaction in accordance with the teachings of this disclosure. For example, the secondary consultant may advise and/or otherwise assist the consultant and/or the customer with respect to products, data, information and/or services for which the secondary consultant may possess more knowledge relative to the consultant and/or the client. In some examples, the example consultant device 104 initiates and/or otherwise enables the involvement of the secondary consultant and/or the secondary consultant device in an existing session involving the example consultant device 104 and the example customer device 106. In some examples, independent user interaction control capabilities are assigned to the secondary consultant device for controlling the sharing of information, the identification of selections pertaining to the shared information and/or the population of a virtual shopping cart based on the selections, and/or for interacting with the shared information, selections and/or populated virtual shopping cart. In some examples, the user interaction control capabilities assigned to the secondary consultant device may include some or all of the user interaction control capabilities assigned to the example consultant device 104.

FIG. 2 is a communication flow diagram illustrating the example interactive display system 100 of FIG. 1 sharing information across the example consultant device 104 and the example customer device 106 in communication with the example intermediary server 102. The illustrated example of FIG. 2 applies to instances in which the example consultant device 104 determines to share with the example customer device 106 an item of information (e.g., a table, a file, a graphic and/or a skeleton/outline identifying products and/or services) that is stored by the example intermediary server 102. In such instances, the example consultant device 104 transmits the details (e.g., a file name) of the item of information to the intermediary server 102 via an example information communication 202. In response, the intermediary server 102 queues the identified item of information for delivery to the customer device 106 upon the customer device 106 transmitting a request for the item of information.

In the illustrated example of FIG. 2, in conjunction with transmitting the details of the item of information to the intermediary server 102, the consultant device 104 also transmits an information alert communication 204 to the customer device 106 via the peer-to-peer connection existing between those devices. The information alert communication 204 notifies the customer device 106 that an item of information is available to the customer device 106 from the intermediary server 102. In response to the information alert communication 204, the customer device 106 requests the item of information from the intermediary server 102 via an example request for item of information communication 206, and the intermediary server 102 in turn shares the item of information with the customer device 106 via an example shared item of information communication 208. Further examples of such information sharing are described in greater detail below in connection with FIGS. 5A, 11-17 and 32-33.

FIG. 3 is a communication flow diagram illustrating transmission of a selection in the example interactive display system 100 of FIG. 1. The illustrated example of FIG. 3 applies to instances in which the example consultant device 104 identifies a selection (e.g., a categorization and/or filter) pertaining to an item of information (e.g., a table, a file, a graphic and/or a skeleton/outline identifying products and/or services) that has been provided via the example intermediary server 102 to the example customer device 106. In such instances, the consultant device 104 transmits the identified selection (e.g., the categorization and/or filter) associated with the shared item of information to the customer device 106 via the peer-to-peer connection existing between those devices. For example, the consultant device 104 transmits the identified selection associated with the shared item of information to the customer device 106 via an example identified selection(s) communication 302 of FIG. 3. In response, the customer device 106 interprets the identified selection and accordingly modifies the shared item of information with which the identified selection is associated. Further examples of such selections and/or modifications are described in greater detail below in connection with FIGS. 5A, 18-28, 32 and 34.

In the illustrated example of FIG. 3, in conjunction with transmitting the identified selection associated with the shared item of information to the customer device 106, the consultant device 104 also transmits the identified selection to the intermediary server 102. For example, the consultant device 104 transmits the identified selection associated with the shared item of information to the intermediary server 102 via the example identified selection(s) communication 304 of FIG. 3. The transmission of the identified selection to the intermediary server 102 ensures that any selections identified by the consultant device 104 are recoverable by the intermediary server 102 and/or the interactive display system 100 in the event that the connection between the consultant device 104 and the customer device 102 is prematurely terminated, regardless of whether such termination is intentional or inadvertent. In some examples, the consultant device 104 may aggregate a series of identified selections pertaining to a shared item of information, and will only transmit the identified selections to the intermediary server 102 after the aggregation is complete.

FIG. 4 is a communication flow diagram to populate a virtual shopping cart in the example interactive display system 100 of FIG. 1 based on one or more selections identified by the interactive display system 100. The illustrated example of FIG. 4 applies to instances in which the example consultant device 104 has transmitted one or more identified selections pertaining to a shared item of information to the intermediary server 102 along with an indication that such selection(s) should be used to populate a virtual shopping cart associated with the customer device 106. For example, the consultant device 104 transmits one or more identified selections pertaining to a shared item of information to the intermediary server 102 along with an indication that such selection(s) should be used to populate a virtual shopping cart associated with the customer device 106 via the example populate virtual shopping cart and identified selection(s) communications 402 of FIG. 4. In such instances, after receiving the identified selection(s) from the consultant device 104, the intermediary server 102 populates the virtual shopping cart with a representation of a product (e.g., a report containing data based on the identified selections) to be purchased by the customer associated with the customer device 106. After the virtual shopping cart has been populated, the intermediary server 102 transmits the populated virtual shopping cart to the customer device 106, which is then able to access the contents of the populated virtual shopping cart. For example, the intermediary server 102 transmits the populated virtual shopping cart to the customer device 106 via an example populated virtual shopping cart communication 404 of FIG. 4. A further example of the virtual shopping cart population process is described in greater detail below in connection with FIGS. 5B, 29-32 and 35.

FIGS. 5A and 5B are communication flow diagrams illustrating the example interactive display system 100 of FIG. 1 facilitating a sales transaction conducted in real time between a consultant associated with the example consultant device 104 and a customer associated with the example customer device 106. In the illustrated example, a session has already been established between the example intermediary server 102, the example consultant device 104 and the example customer device 106. Thus, example communication paths such as paths 120, 130 and 140 of FIG. 1 described above are already established between the intermediary server 102 and the consultant device 104, between the intermediary server 102 and the customer device 106, and between the consultant device 104 and the customer device 106. Accordingly, example communications 500 illustrated in FIGS. 5A and 5B are carried out over the aforementioned communication paths running through the interactive display platform 110 on the intermediary server 102. The example communications 500 may be transmitted and received using coded instructions and/or messages that are processed by one or more of the example intermediary server 102, the example consultant device 104 and/or the example customer device 106.

In the illustrated example sales transaction of FIGS. 5A and 5B, the example intermediary server 102 begins by assigning respective user interaction control capabilities to the consultant device 104 and the customer device 106 via respective user controls communications 502, 504. In the illustrated example, the intermediary server 102 sends the first user controls communication 502 to the consultant device 104 to enable the consultant device 104 to invoke consultant-specific user interaction control capabilities over information to be shared with and/or presented to the consultant device 104 via the example interactive display platform 110. The example intermediary server 102 also sends the second user controls communication 504 to the customer device 106 to enable the customer device 106 to invoke customer-specific user interaction control capabilities over the information to be shared with and/or presented to the customer device 106 via the example interactive display platform 110. Although FIG. 5A illustrates the transmission of the example first user controls communication 502 and the example second user controls communication 504 as occurring prior to the sharing and/or presentation of information to either of the consultant device 104 or the customer device 106, the example first user controls communication 502 and/or the example second user controls communication 504 may alternatively occur subsequent to the sharing and/or presentation of information to either of those devices.

In some examples, the respective consultant-specific and customer-specific user interaction control capabilities are unique to the item of shared information. In such examples, the intermediary server 102 may assign new and/or modified consultant-specific and/or customer-specific user interaction control capabilities whenever a specific item of information is shared during the course of a session. In other examples, the respective consultant-specific and customer-specific user interaction control capabilities are not unique to the item of shared information, but are instead unique to the device to which the control capabilities are being assigned. In such examples, the intermediary server 102 need only assign the respective consultant-specific and customer-specific user interaction control capabilities on one occasion per session.

The respective consultant-specific and customer-specific user interaction control capabilities described above are independent relative to one another. For example, a customer associated with the customer device 106 may utilize the customer-specific user interaction control capabilities to scroll through shared information while, at the same time, a consultant associated with the consultant device 104 utilizes the consultant-specific user interaction control capabilities to scroll through the same shared information independent of the customer's interactions with the shared information. In some examples, the consultant-specific user interaction control capabilities provide for control capabilities over the shared information that are more expansive relative to the customer-specific user interaction control capabilities. For example, the consultant-specific user interaction control capabilities may include scrolling capabilities, sharing capabilities, selecting capabilities, populating capabilities and/or editing capabilities over the shared information, while the consultant-specific user interaction control capabilities may be limited to scrolling capabilities and/or selection indication capabilities over the shared information.

In some examples, the consultant-specific user interaction control capabilities are non-overlapping relative to the customer-specific user interaction control capabilities. For example, the consultant-specific user interaction control capabilities may include the ability to initiate the sharing of information (e.g., share a data skeleton) and the ability to apply selections to the shared information (e.g., apply a selection to the shared data skeleton in connection with building a data report), but may not include the ability to access the populated contents of a virtual shopping cart in connection with a sales transaction. In some such examples, the customer-specific user interaction control capabilities may include the ability to access the populated contents of a virtual shopping cart in connection with a sales transaction, but may not include the ability to initiate the sharing of information (e.g., share a data skeleton) or the ability to apply selections to the shared information (e.g., apply a selection to the shared data skeleton in connection with building a data report). In such an example, the consultant-specific user interaction control capabilities are non-overlapping relative to the customer-specific user interaction control capabilities.

Providing consultant-specific user interaction control capabilities that are more expansive relative to, different from, and/or non-overlapping relative to the customer-specific user interaction control capabilities may be particularly advantageous when the information to be shared via the example interactive display system 100 is proprietary and/or otherwise confidential to the consultant and/or the owner of the information. For example, the shared information may include sales data, market share data, pricing data, and/or demographic data over which the owner of the information (e.g., the consultant or the consultant's employer) maintains a confidentiality and/or security interest. In some such examples, the owner's confidentiality and/or security interest may be protected and/or maintained by assigning respective user interaction control capabilities to the example consultant device 104 and the example customer device 106 that provide only the example consultant device 104 with the ability to initiate the access and sharing of the confidential information. In addition to the confidentiality and/or security benefits described above, the implementation of consultant-specific user interaction control capabilities that are more expansive relative to, different from, and/or non-overlapping relative to the customer-specific user interaction control capabilities may also be advantageous in the sense of restricting and/or otherwise limiting the number, type(s), and/or complexity of the user interaction control capabilities made available to the customer, thereby simplifying the customer experience in connection with the sales transaction and/or the example interactive display platform 110.

In the illustrated example of FIG. 5A, following the transmission of the example first and second user controls communications 502, 504, the customer device 106 sends an interest indication communication 506 to the consultant device 104 indicating the customer's interest in a particular type of information and/or a particular type of product. For example, if the customer indicates an interest in information associated with beer, the example interest indication communication 506 that the customer device 106 sends to the consultant device 104 includes an indication reflecting the customer's interest in information associated with beer. In some examples, the interest indication communication 506 is transmitted via the peer-to-peer communication path 140 illustrated in FIG. 1. For example, the interest indication communication 506 may be a verbal communication from the customer transmitted via a call (e.g., a voice over internet protocol (VoIP) call or a video call) and/or a text communication from the customer transmitted via chat (e.g., a text chat or a video chat) as described above. The example interest indication communication 506 may alternatively be transmitted based on the customer associated with the customer device 106 utilizing the customer-specific user interaction control capabilities assigned to the customer device 106 (e.g., via the second user controls communication 504 of FIG. 5A) in relation to the shared information.

In response to the example interest indication communication 506, the consultant device 104 sends an example request for information communication 508 to the intermediary server 102 requesting access to an item of information (e.g., a table, a file, a graphic and/or a skeleton/outline identifying products and/or services) that is stored by the intermediary server 102. In some examples, the item of information includes data representing a plurality of products available for purchase. For example, the item of information may be a data table including rows of data corresponding to various products (e.g., sales data for types of alcoholic beverages) for which a customer associated with the customer device 106 may purchase a data report. The item of information may further and/or alternatively include a query builder that allows for selections and/or filters to be applied against the plurality of products available for purchase. In response to the example request for information communication 508, the example intermediary server 102 sends an information communication 510 to the consultant device 104 to enable the consultant device 104 to invoke sharing the item of information.

Subsequent to receiving the shared information, the consultant device 104 of the illustrated example sends a request to share information communication 512 to the intermediary server 102 requesting that the intermediary server 102 share the item of information with the customer device 106. In the illustrated example, in conjunction with sending the example request to share information communication 512 to the intermediary server 102, the consultant device 104 also sends a shared information alert communication 514 to the customer device 106 alerting the customer device 106 that an item of information is available from the intermediary server 102 to be shared with the customer device 106. In response to the example shared information alert communication 514, the customer device 106 sends an example request for shared information communication 516 to the intermediary server 102 requesting that the item of information be shared with the customer device 106. In response to the example request for shared information communication 516, the intermediary server 102 sends an example shared information communication 518 to the customer device 106 to enable the customer device 106 to present the requested item of information. Thus, by virtue of the example communications 508, 510, 512, 514, 516 and 518, the interactive display system 100 causes an item of shared information to be presented contemporaneously, concurrently and/or simultaneously on the consultant device 104 and the customer device 106.

In some examples, a time shift associated with the presentation and/or display of the shared information to the consultant device 104 relative to the customer device 106 may result from differences inherent to the respective available network bandwidths and/or the respective available computer performance capabilities of the consultant device 104 and the customer device 106. When such time-shifting occurs, the presentation and/or display of the shared information nevertheless overlaps in time so that the consultant associated with the consultant device 106 and the customer associated with the customer device 104 can view the shared information during substantially the same time. Thus, even when such time-shifting is present, the interactive display system 100 causes the shared information to be presented contemporaneously, concurrently and/or simultaneously on the consultant device 104 and the customer device 106.

Although not specifically illustrated in FIG. 5A, additional communications corresponding to the example communications 508, 510, 512, 514, 516 and 518 may be processed for additional items of information that the consultant device 104 requests to be shared by the intermediary server 102. In some examples, the item of information to be shared is a modified version of an item of information that the intermediary server 102 previously shared with the consultant device 104 and the customer device 106. For example, a previously-shared item of information might be a data table including rows of data corresponding to types of alcoholic beverages, while the item of information to be shared might be a data skeleton/outline including data corresponding to types of beer. In other examples, the item of information to be shared may have little if any relationship with an item of information that the intermediary server 102 previously shared with the consultant device 104 and the customer device 106. For example, a previously-shared item of information might be a data table including rows of data corresponding to types of alcoholic beverages, while the item of information to be shared might be a data skeleton/outline including data corresponding to types of coffee beverages.

In conjunction with the sharing of information described above in connection with FIGS. 2 and 5A, the example interactive display platform 110 provides a consultant-side shared information user interface for display on the example consultant device 104. The example interactive display platform 110 further provides a corresponding customer-side shared information user interface for display on the example customer device 106. Examples of such user interfaces are disclosed herein in connection with FIGS. 11-17.

Figure 11:
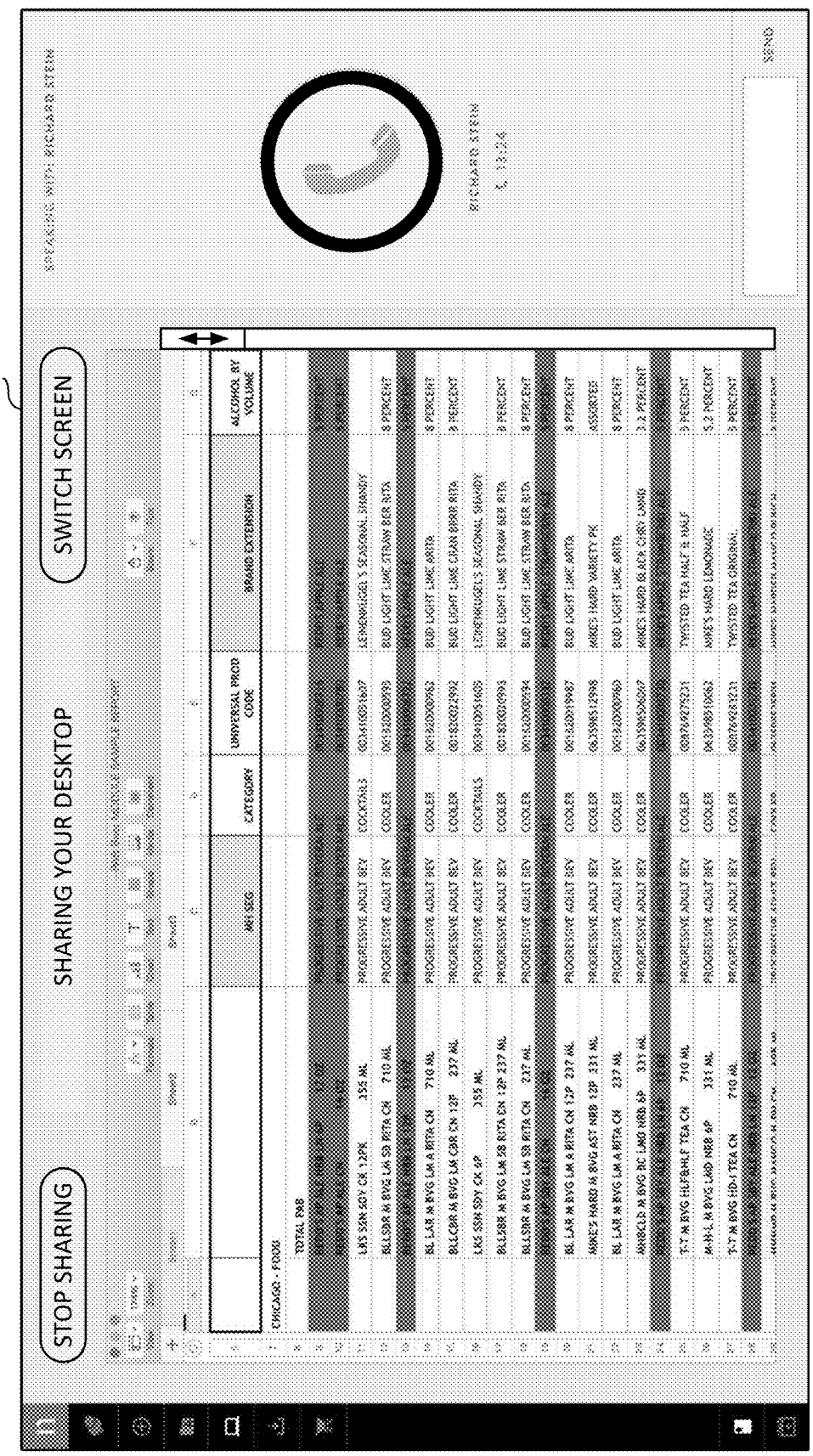
FIG. 11 is an example consultant-side shared information user interface that may be used in the example interactive display system of FIG. 1 for display on an example consultant device.

FIG. 11 is an example consultant-side shared information user interface 1100 that may be used in the example interactive display platform 110 of FIG. 1 for display on the example consultant device 104. In the illustrated example, the shared information presented via the example consultant-side shared information user interface 1100 is a data table containing rows of data corresponding to types of alcoholic beverages. In the illustrated example, the consultant-specific user interaction control capabilities assigned to the consultant device 104 (e.g., via the first user controls communication 502 of FIG. 5A) enable a consultant to scroll through the example data table of FIG. 11, control the sharing of the example data table, and/or edit the information of the example data table.

Figure 12:
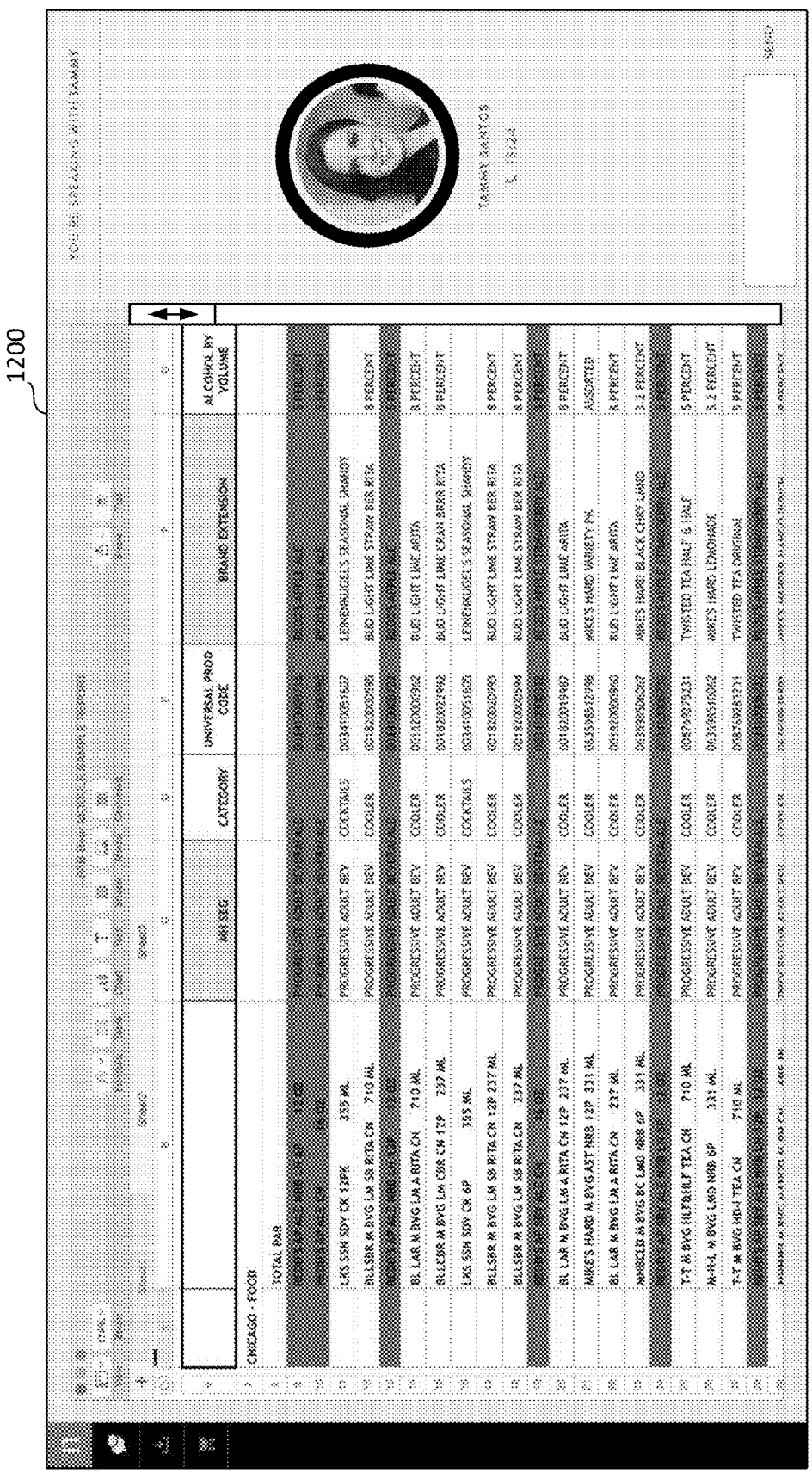
FIG. 12 is an example customer-side shared information user interface that may be used in the example interactive display system of FIG. 1 for display on an example customer device.

FIG. 12 is an example customer-side shared information user interface 1200 that may be used in the example interactive display platform 110 of FIG. 1 for display on the example customer device 106. In the illustrated example, the shared information presented via the example customer-side shared information user interface 1200 is the same data table described above in connection with FIG. 11. In the illustrated example, the customer-specific user interaction control capabilities assigned to the customer device 106 (e.g., via the second user controls communication 504 of FIG. 5A) enable a customer to scroll through the example data table of FIG. 12, but do not enable the customer to control the sharing of the example data table, or to edit the information of the example data table. In other examples, the customer-specific user interaction control capabilities assigned to the customer device 106 may result in the customer being unable to interact with (e.g., scroll through) the example data table of FIG. 12.

FIG. 13 is another example consultant-side shared information user interface 1300 that may be used in the example interactive display platform 110 of FIG. 1 for display on the example consultant device 104. In the illustrated example, the shared information presented via the example consultant-side shared information user interface 1300 is a data skeleton/outline containing data corresponding to types of beer products. In the illustrated example, the consultant-specific user interaction control capabilities assigned to the consultant device 104 (e.g., via the first user controls communication 502 of FIG. 5A) enable a consultant to scroll through the example data skeleton/outline of FIG. 13, control the sharing of the example data skeleton/outline, and/or select a different data skeleton/outline.

FIG. 14 is another example consultant-side shared information user interface 1400 that may be used in the example interactive display platform 110 of FIG. 1 for display on the example consultant device 104. In the illustrated example, the shared information presented via the example consultant-side shared information user interface 1400 is an alternate version of the data skeleton/outline of FIG. 13 containing data corresponding to types of beer products. In the illustrated example, the data within the example data skeleton/outline has been sorted in ascending alphabetical order according first to category (e.g., the "CATEGORY" column of the data skeleton), then according to brand (e.g., the "BRAND" column of the data skeleton), and then according to product (e.g., the "PRODUCT" column of the data skeleton). In the illustrated example, the consultant-specific user interaction control capabilities assigned to the consultant device 104 (e.g., via the first user controls communication 502 of FIG. 5A) enable a consultant to scroll and/or sort through the example data skeleton/outline of FIG. 14, control the sharing of the example data skeleton/outline, and/or select a different data skeleton/outline via the consultant device 104.

FIG. 15 is another example customer-side shared information user interface 1500 that may be used in the example interactive display platform 110 of FIG. 1 for display on the example customer device 106. In the illustrated example, the shared information presented via the example customer-side shared information user interface 1500 is the same data skeleton/outline described above in connection with FIG. 13. In the illustrated example, the customer-specific user interaction control capabilities assigned to the customer device 106 (e.g., via the second user controls communication 504 of FIG. 5A) enable a customer to scroll through the example data skeleton/outline of FIG. 15, but do not enable the customer to control the sharing of the example data skeleton/outline, or to select a different data skeleton/outline.

FIG. 16 is yet another example consultant-side shared information user interface 1600 that may be used in the example interactive display platform 110 of FIG. 1 for display on the example consultant device 104. In the illustrated example, the shared information presented via the example consultant-side shared information user interface 1600 is the same data skeleton/outline described above in connection with FIG. 13. However, the consultant-side shared information user interface 1600 of FIG. 16 further includes a query builder (e.g., a report builder) that allows for selections and/or filters to be applied against the plurality of products available for purchase. In the illustrated example, the consultant-specific user interaction control capabilities assigned to the consultant device 104 (e.g., via the first user controls communication 502 of FIG. 5A) enable a consultant to scroll through the example data skeleton/outline of FIG. 16, control the sharing of the example data skeleton/outline, and/or apply selections against the example data skeleton/outline.

FIG. 17 is yet another example customer-side shared information user interface 1700 that may be used in the example interactive display platform 110 of FIG. 1 for display on the example customer device 106. In the illustrated example, the shared information presented via the example customer-side shared information user interface 1700 includes the same data skeleton/outline and query builder described above in connection with FIG. 16. In the illustrated example, the customer-specific user interaction control capabilities assigned to the customer device 106 (e.g., via the second user controls communication 504 of FIG. 5A) enable a customer to scroll through the example data skeleton/outline of FIG. 17, but do not enable the customer to control the sharing of the example data skeleton/outline.

Returning to the illustrated example of FIG. 5A, in connection with the item of shared information, the example customer device 106 sends an example selection indication communication 520 to the consultant device 104 indicating the customer's interest in selecting a particular product and/or product parameter pertaining to the item of shared information. A selection indication communicated in the example selection indication communication 520 may indicate a product category, a product location, a product fact, a product channel, a range of dates over which the product is available, and/or other product parameters. For example, if the shared information is a data skeleton/outline including sales data corresponding to types of beer sold in the United States, the customer might indicate an interest in a particular brand of beer identified in the shared information. In such an example, the selection indication communication 520 that the customer device 106 sends to the consultant device 104 includes a selection indication reflecting the customer's selection of the particular brand of beer. In some examples, the selection indication communication 520 is transmitted via the peer-to-peer communication path 140 illustrated in FIG. 1. For example, the selection indication communication 520 may be a verbal communication from the customer transmitted via a call (e.g., a voice over internet protocol (VoIP) call or a video call) and/or a text communication from the customer transmitted via chat (e.g., a text chat or a video chat) as described above. The example selection indication communication 520 may alternatively be transmitted based on the customer associated with the customer device 106 utilizing the customer-specific user interaction control capabilities assigned to the customer device 106 (e.g., via the second user controls communication 504 of FIG. 5A) in relation to the shared information.

In response to the example selection indication communication 520, the consultant device 104 sends an example selection applied to shared information communication 522 to the customer device 106 invoking a modification to the shared information. In the illustrated example, the modification corresponds to a selection made by the consultant associated with the consultant device 104, which in turn corresponds to the selection indication that the consultant device 104 received from the customer device 106 via the example selection indication communication 520. For example, if the shared information is a data skeleton/outline including sales data corresponding to types of beer sold in the United States, and the selection indication communication 520 that the customer device 106 sends to the consultant device 104 indicates the customer's interest in selecting a particular brand of beer identified in the shared information, the selection applied to shared information communication 522 that the consultant device 104 sends to the customer device 106 indicates that the consultant device 104 has applied the requested selection to the shared information as presented on the consultant device 104. In the illustrated example, the selection applied to shared information communication 522 further instructs the customer device 106 to modify the shared information as presented on the customer device 106 based on the applied selection. In some examples, the selection applied to shared information communication 522 is transmitted via the peer-to-peer communication path 140 illustrated in FIG. 1. For example, the consultant device 104 may transmit the selection applied to shared information communication 522 via the example peer-to-peer communication path 140 based on the consultant associated with the consultant device 104 utilizing the consultant-specific user interaction control capabilities in relation to the shared information.

When the customer device 106 receives the example selection applied to shared information communication 522, the customer device 106 modifies the updated shared information presented on the customer device 106 to reflect a modification corresponding to the selection that was made by the consultant device 104. Thus, based on the example selection indication communication 520 and the example selection applied to shared information communication 522, the consultant device 104 causes the selection applied to the item of shared information to be presented contemporaneously, concurrently and/or simultaneously on the consultant device 104 and the customer device 106. Although not specifically illustrated in FIG. 5A, additional communications corresponding to the example selection indication 520 and/or the example selection applied to shared information communication 522 may be processed for additional selection indications that the customer device 106 requests in relation to any item of shared information.

In some examples, a time shift associated with the presentation and/or display of the applied selection(s) to the consultant device 104 relative to the customer device 106 may result from differences inherent to the respective available network bandwidths and/or the respective available computer performance capabilities of the consultant device 104 and the customer device 106. When such time-shifting occurs, the presentation and/or display of the applied selection(s) nevertheless overlaps in time so that the consultant associated with the consultant device 106 and the customer associated with the customer device 104 can view the shared information during substantially the same time. Thus, even when such time-shifting is present, the interactive display system 100 causes the applied selection(s) to be presented contemporaneously, concurrently and/or simultaneously on the consultant device 104 and the customer device 106.

In conjunction with the application of selections described above in connection with FIGS. 3 and 5A, the example interactive display platform 110 provides a consultant-side shared information and selection user interface for display on the example consultant device 104. The example interactive display platform 110 further provides a corresponding customer-side shared information and selection user interface for display on the example customer device 106. Examples of such user interfaces are disclosed herein in connection with FIGS. 18-28.

Figure 18:
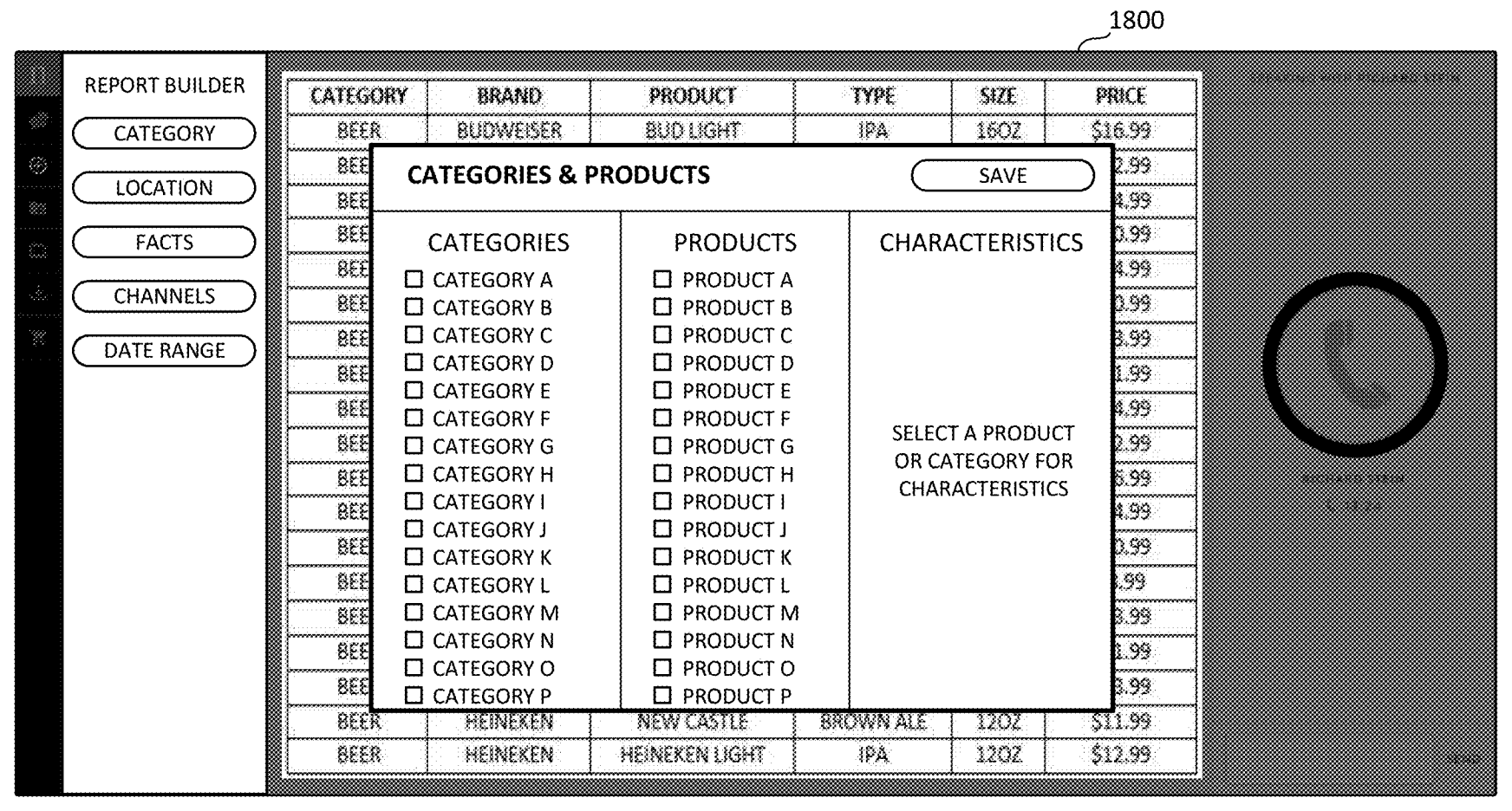

FIG. 18 is the example consultant-side shared information user interface of FIG. 16 further including available category options that may be used in the example interactive display platform 110 of FIG. 1 for display on the example consultant device 104. In the illustrated example, the shared information presented via the example consultant-side shared information and selection user interface 1800 includes a list of categories, products and/or characteristics that allows for selections and/or filters to be applied against the plurality of products available for purchase. In the illustrated example, the consultant-specific user interaction control capabilities assigned to the consultant device 104 (e.g., via the first user controls communication 502 of FIG. 5A) enable a consultant to scroll through, select and populate the available category, product and/or characteristic options of FIG. 18.

Figure 19:
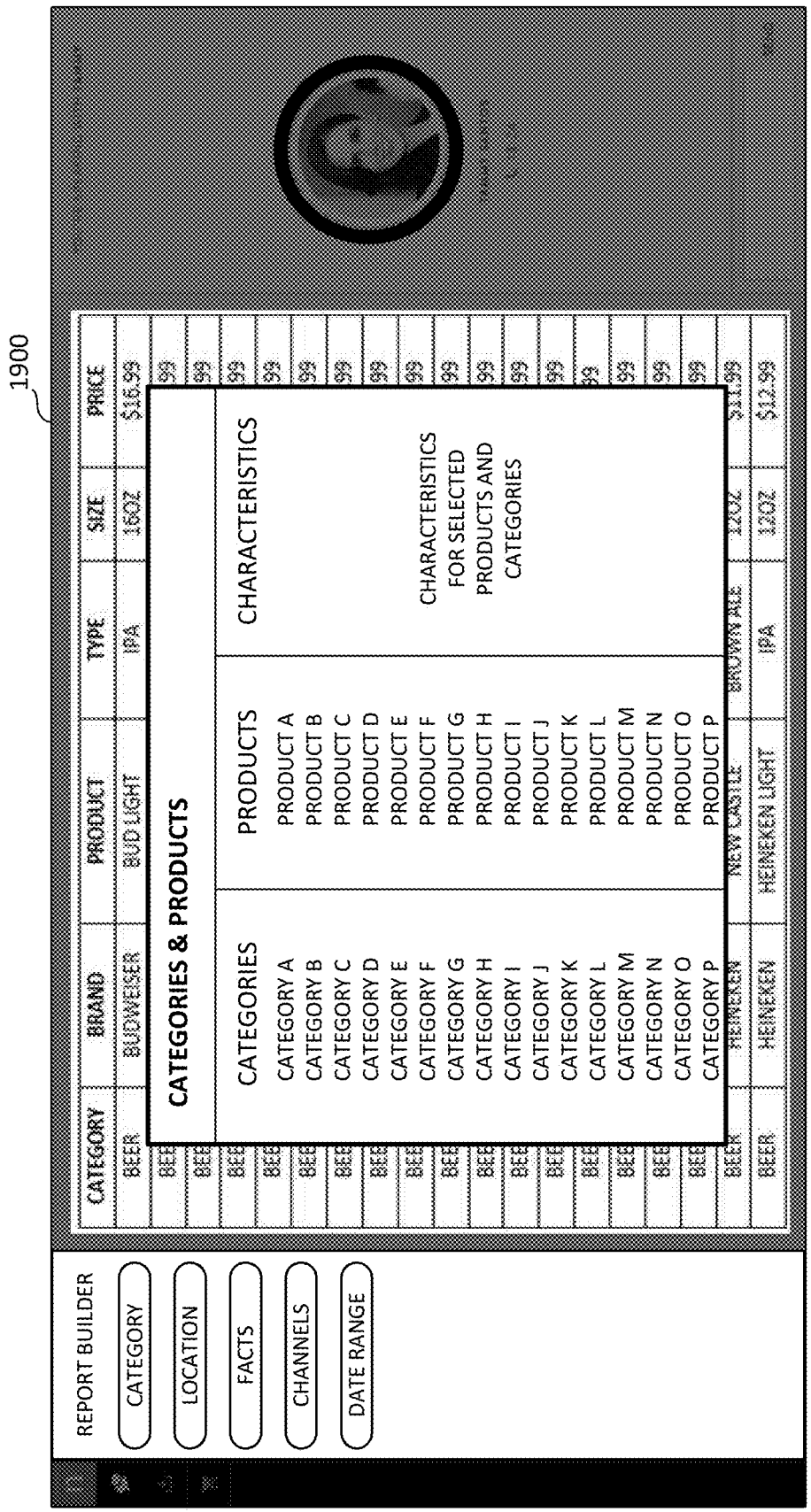
FIG. 19 is the example customer-side shared information user interface of FIG. 17 including available category selections that may be used in the example interactive display system of FIG. 1 for display on an example customer device.

FIG. 19 is the example customer-side shared information user interface of FIG. 17 further including available category options that may be used in the example interactive display platform 110 of FIG. 1 for display on the example customer device 106. In the illustrated example, the shared information presented via the example customer-side shared information and selection user interface 1900 includes the same data skeleton/outline, query builder and list of categories, products and/or characteristics described above in connection with FIG. 18. In the illustrated example, the customer-specific user interaction control capabilities assigned to the customer device 106 (e.g., via the second user controls communication 504 of FIG. 5A) enable a customer to scroll through the available category, product and/or characteristic options of FIG. 19, but do not enable the customer to control the selection and/or population of the available category, product and/or characteristic options.

Figure 20:
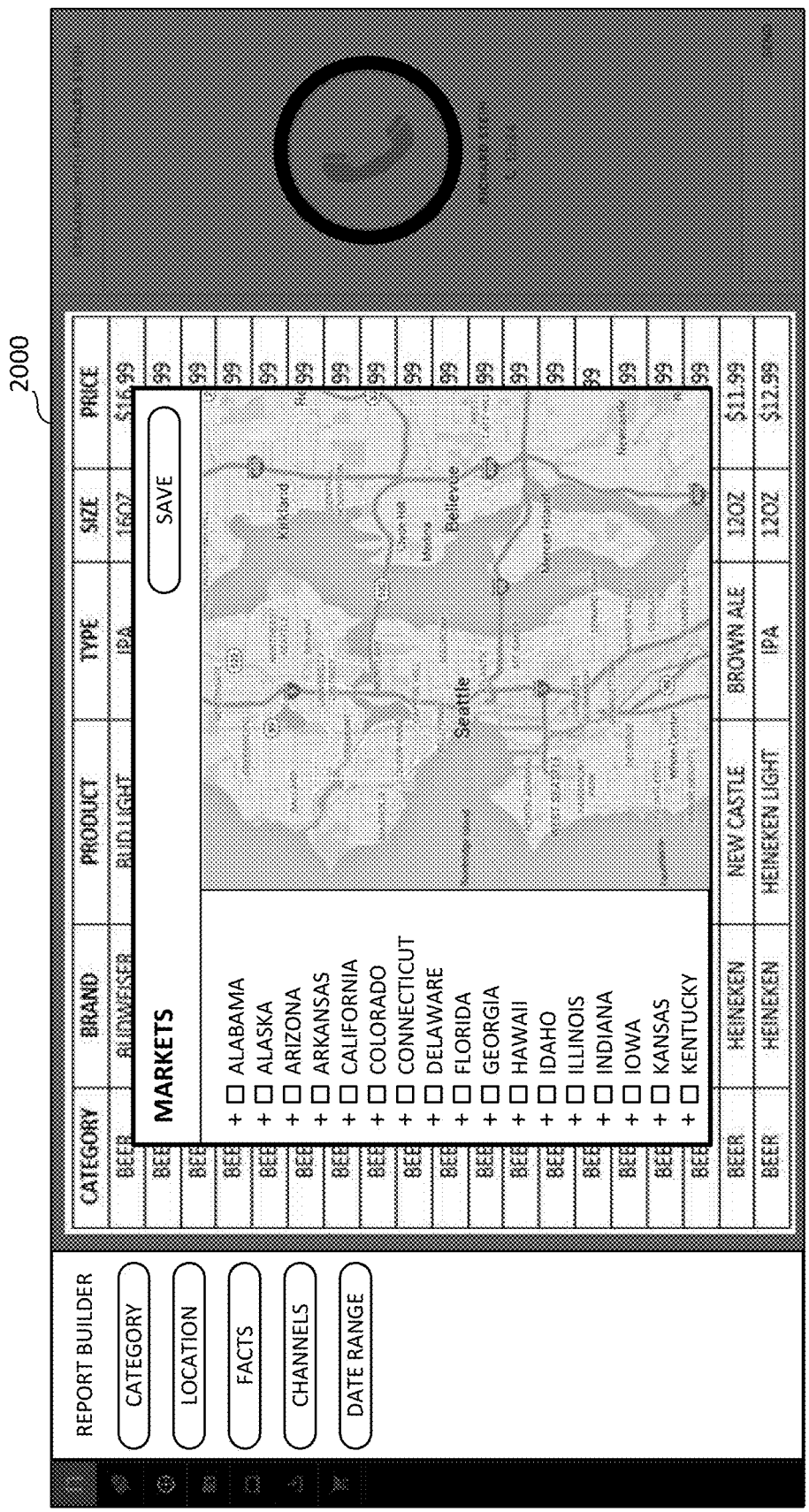
FIG. 20 is the example consultant-side shared information user interface of FIG. 16 further including available location selections that may be used in the example interactive display system of FIG. 1 for display on an example consultant device.

FIG. 20 is the example consultant-side shared information user interface of FIG. 16 further including available location options that may be used in the example interactive display platform 110 of FIG. 1 for display on the example consultant device 104. In the illustrated example, the shared information presented via the example consultant-side shared information and selection user interface 2000 includes a list of locations and a map that allows for selections and/or filters to be applied against the plurality of products available for purchase. In the illustrated example, the consultant-specific user interaction control capabilities assigned to the consultant device 104 (e.g., via the first user controls communication 502 of FIG. 5A) enable a consultant to scroll through, select and populate the available location options, and/or to interact with the map of FIG. 20.

Figure 21:
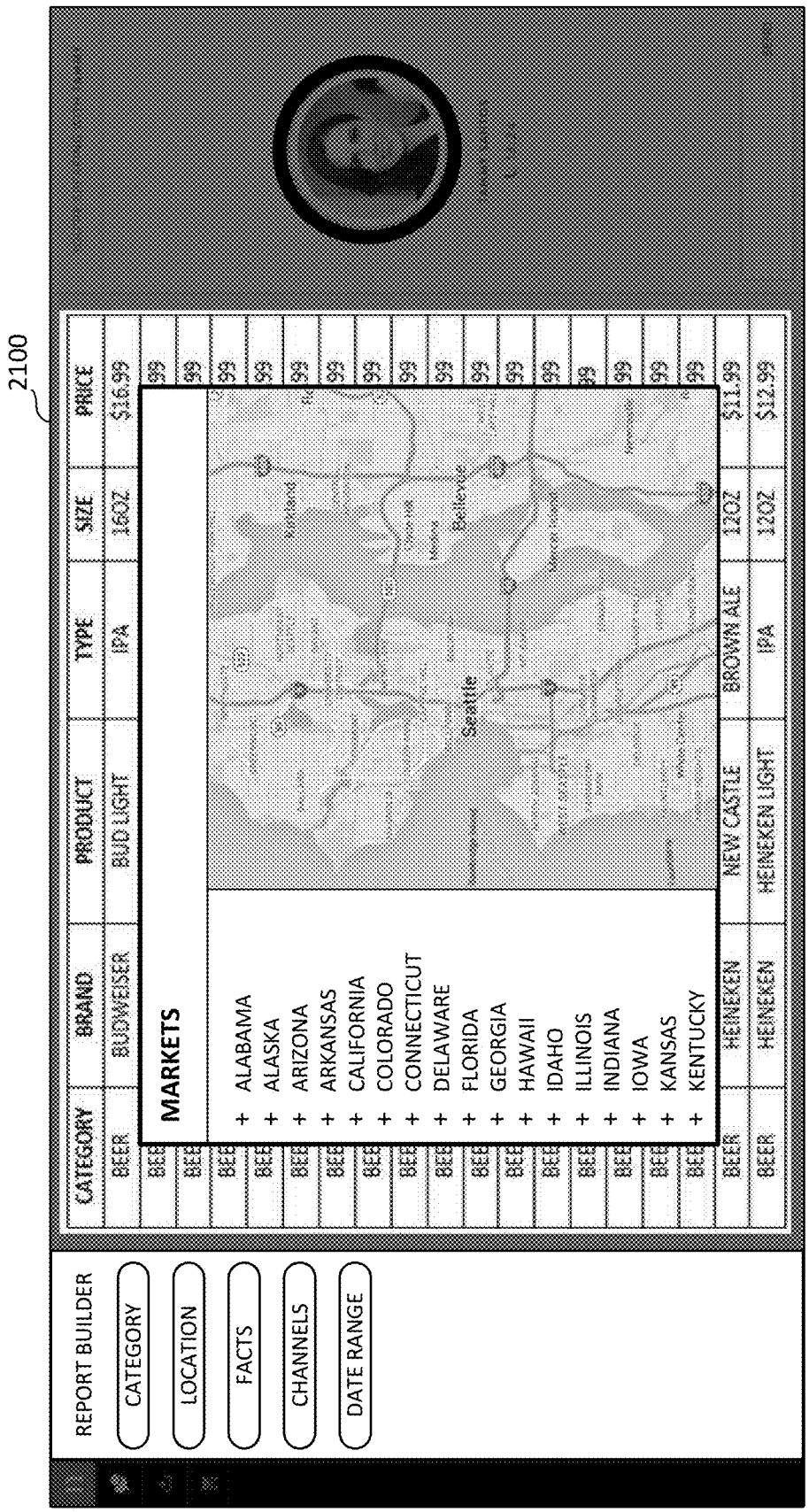
FIG. 21 is the example customer-side shared information user interface of FIG. 17 further including available location selections that may be used in the example interactive display system of FIG. 1 for display on an example customer device.

FIG. 21 is the example customer-side shared information user interface of FIG. 17 further including available location options that may be used in the example interactive display platform 110 of FIG. 1 for display on the example customer device 106. In the illustrated example, the shared information presented via the example customer-side shared information and selection user interface 2100 includes the same data skeleton/outline, query builder, list of locations, and map described above in connection with FIG. 20. In the illustrated example, the customer-specific user interaction control capabilities assigned to the customer device 106 (e.g., via the second user controls communication 504 of FIG. 5A) enable a customer to scroll through the available location options and/or to interact with the map of FIG. 21, but do not enable the customer to control the selection and/or population of the available location options.

FIG. 22 is the example customer-side shared information user interface of FIG. 17 further including a location selection that has been applied by the example interactive display platform 110 of FIG. 1 for display on the example customer device 106. In the illustrated example, the shared information presented via the example customer-side shared information user interface 2200 includes a location selection indicating that the plurality of products available for purchase have been filtered to include only those available products within the Seattle, Wash. region. In this regard, the example customer-side shared information user interface 2200 has been modified in relation to the example customer-side shared information user interface 1700 of FIG. 17.

Figure 23:
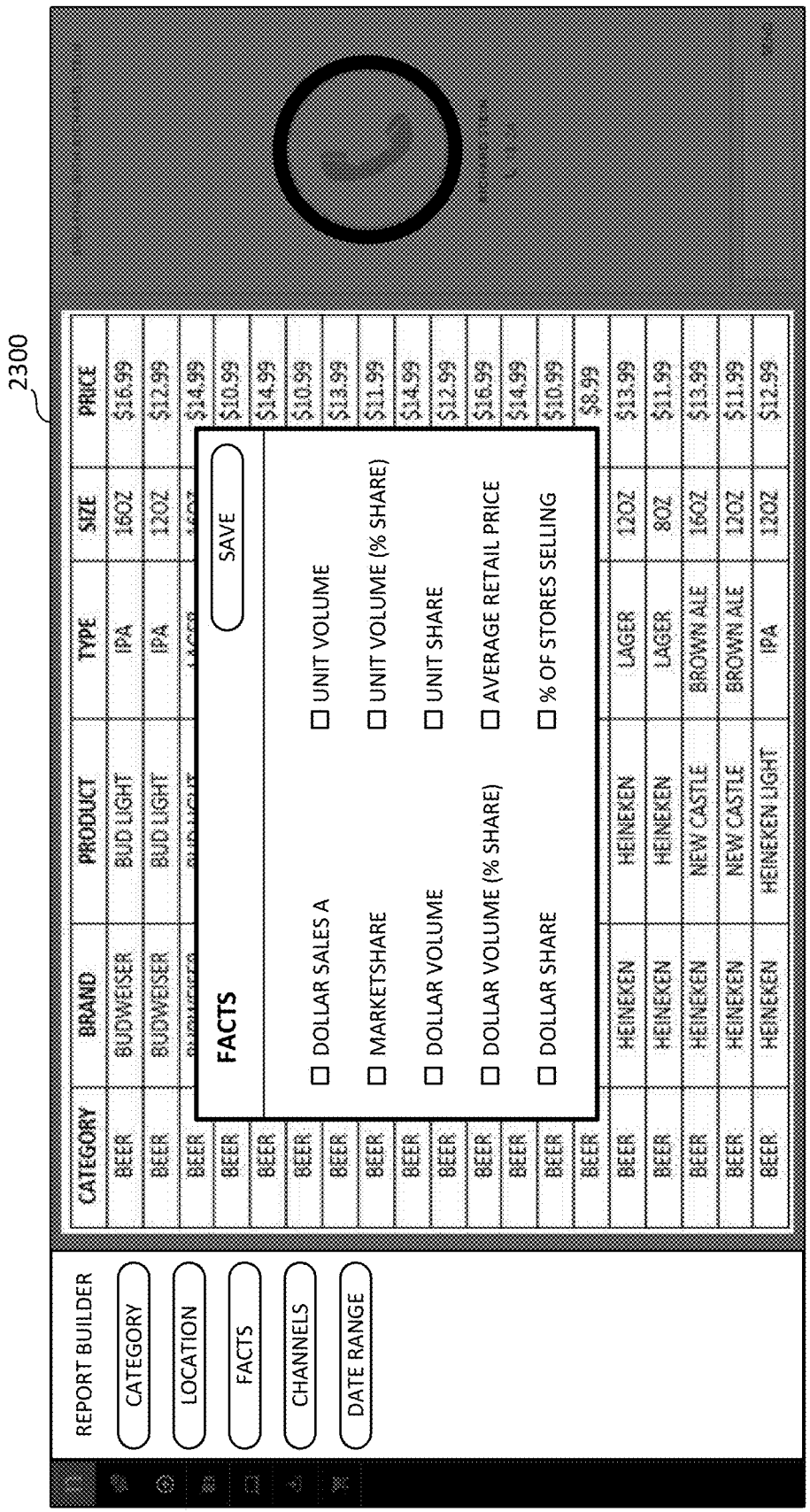
FIG. 23 is the example consultant-side shared information user interface of FIG. 16 further including available fact selections that may be used in the example interactive display system of FIG. 1 for display on an example consultant device.

FIG. 23 is the example consultant-side shared information user interface of FIG. 16 further including available fact options that may be used in the example interactive display platform 110 of FIG. 1 for display on the example consultant device 104. In the illustrated example, the shared information presented via the example consultant-side shared information and selection user interface 2300 includes a list of facts (e.g., dollar sales, unit volume, market share, etc.) that allows for selections and/or filters to be applied against the plurality of products available for purchase. In the illustrated example, the consultant-specific user interaction control capabilities assigned to the consultant device 104 (e.g., via the first user controls communication 502 of FIG. 5A) enable a consultant to scroll through, select and populate the available fact options of FIG. 23.

Figure 24:
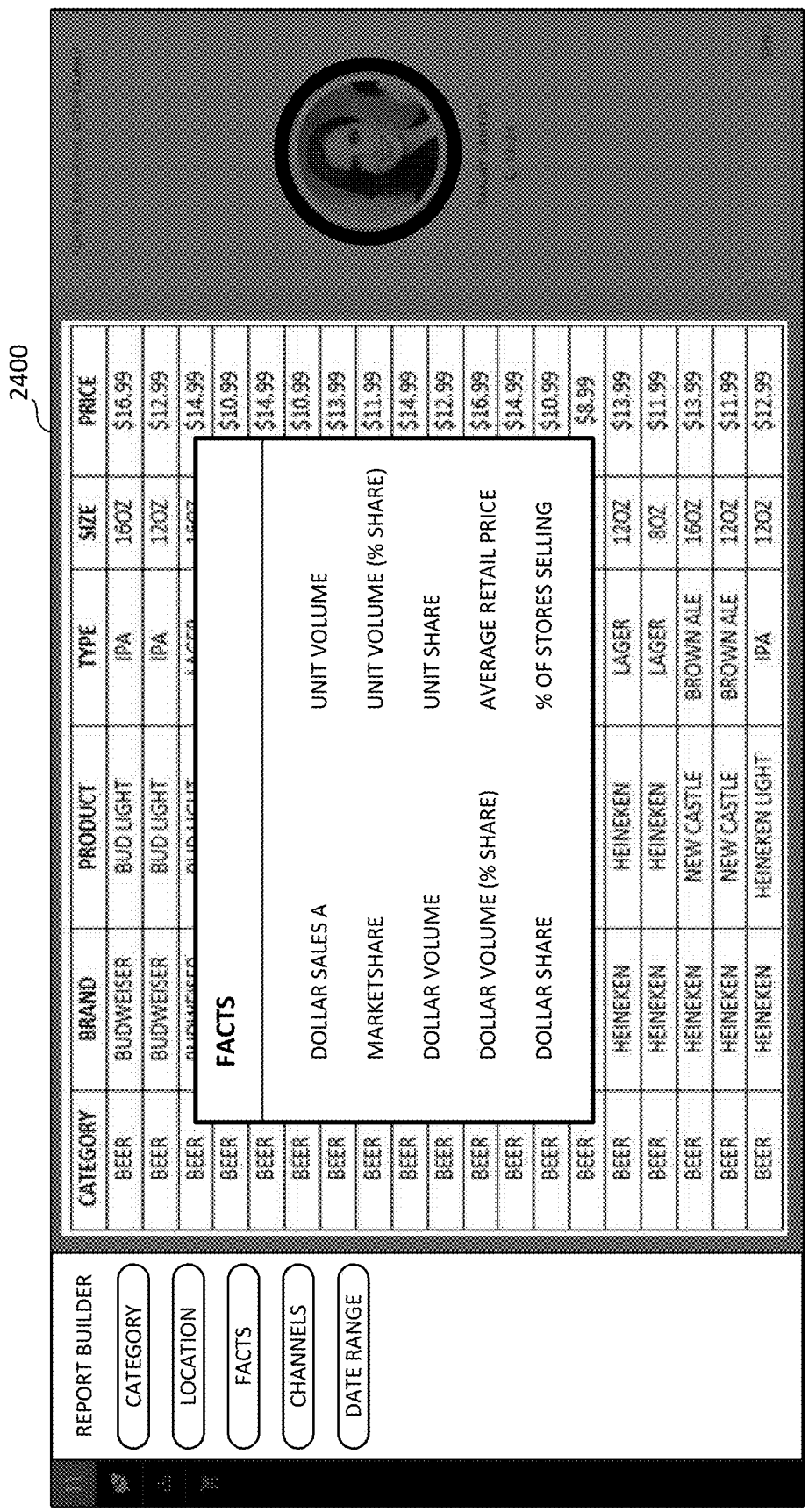
FIG. 24 is the example customer-side shared information user interface of FIG. 17 further including available fact selections that may be used in the example interactive display system of FIG. 1 for display on an example customer device.

FIG. 24 is the example customer-side shared information user interface of FIG. 17 further including available fact options that may be used in the example interactive display platform 110 of FIG. 1 for display on the example customer device 106. In the illustrated example, the shared information presented via the example customer-side shared information and selection user interface 2400 includes the same data skeleton/outline, query builder and list of facts described above in connection with FIG. 23. In the illustrated example, the customer-specific user interaction control capabilities assigned to the customer device 106 (e.g., via the second user controls communication 504 of FIG. 5A) enable a customer to scroll through the available fact options of FIG. 24, but do not enable the customer to control the selection and/or population of the available fact options.

Figure 25:
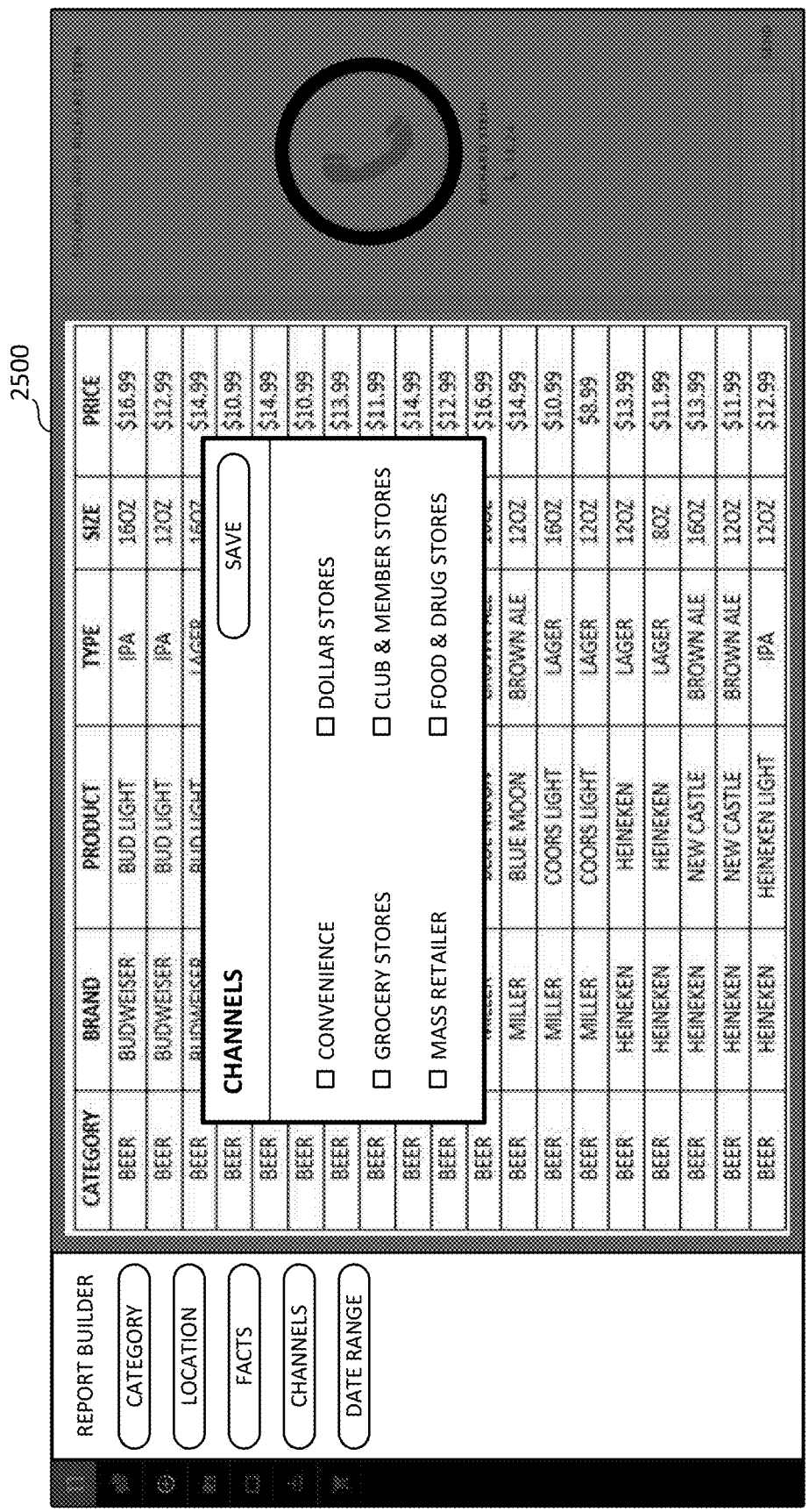
FIG. 25 is the example consultant-side shared information user interface of FIG. 16 further including available channel selections that may be used in the example interactive display system of FIG. 1 for display on an example consultant device.

FIG. 25 is the example consultant-side shared information user interface of FIG. 16 further including available channel options that may be used in the example interactive display platform 110 of FIG. 1 for display on the example consultant device 104. In the illustrated example, the shared information presented via the example consultant-side shared information and selection user interface 2500 includes a list of channels (e.g., convenience, grocery stores, mass retailer, etc.) that allows for selections and/or filters to be applied against the plurality of products available for purchase. In the illustrated example, the consultant-specific user interaction control capabilities assigned to the consultant device 104 (e.g., via the first user controls communication 502 of FIG. 5A) enable a consultant to scroll through, select and populate the available channel options of FIG. 25.

FIG. 26 is the example customer-side shared information user interface of FIG. 17 further including available channel options that may be used in the example interactive display platform 110 of FIG. 1 for display on the example customer device 106. In the illustrated example, the shared information presented via the example customer-side shared information and selection user interface 2600 includes the same data skeleton/outline, query builder and list of channels described above in connection with FIG. 25. In the illustrated example, the customer-specific user interaction control capabilities assigned to the customer device 106 (e.g., via the second user controls communication 504 of FIG. 5A) enable a customer to scroll through the available channel options of FIG. 26, but do not enable the customer to control the selection and/or population of the available channel options.

Figure 27:
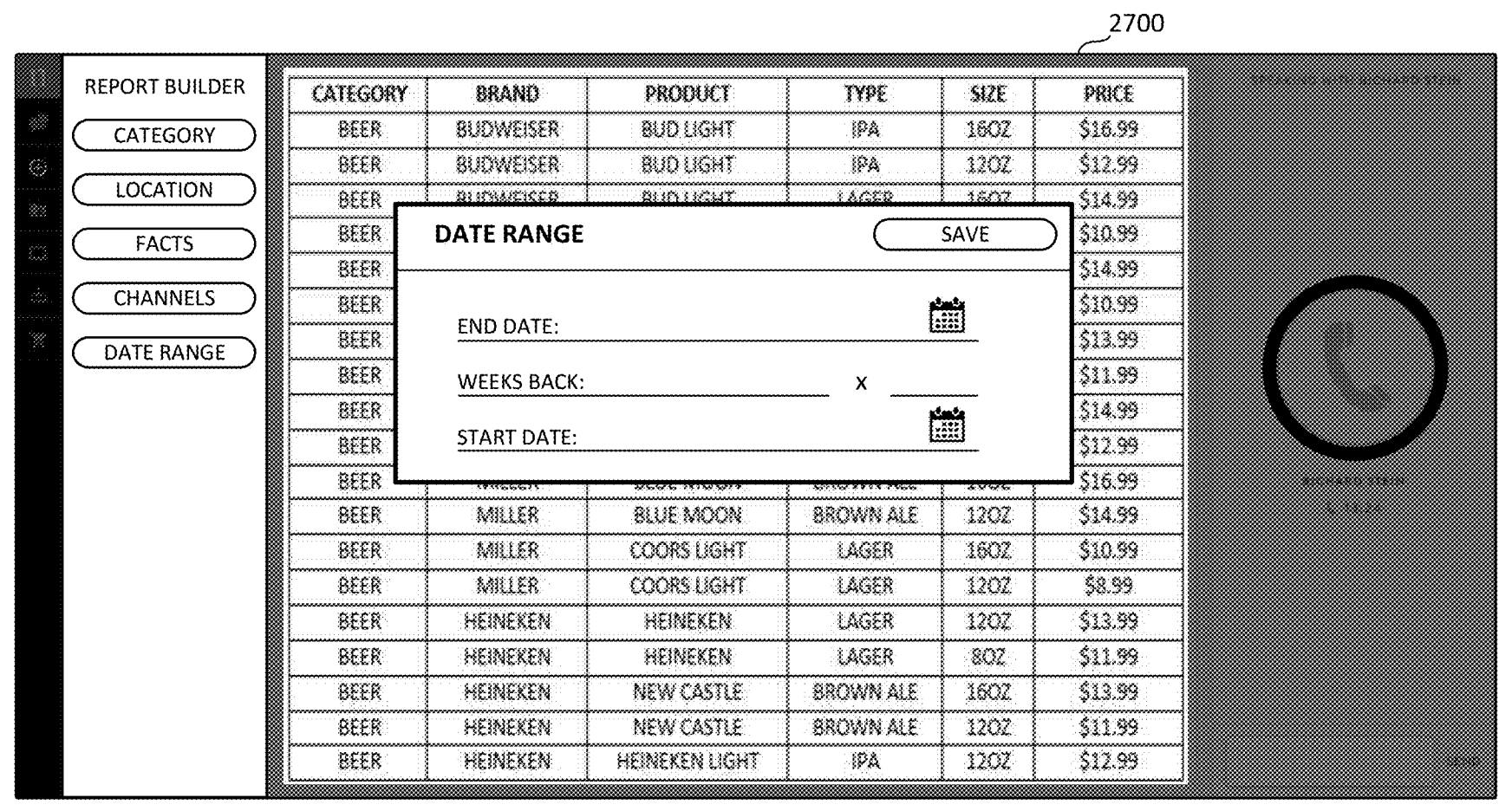

FIG. 27 is the example consultant-side shared information user interface of FIG. 16 further including available date range options that may be used in the example interactive display platform 110 of FIG. 1 for display on the example consultant device 104. In the illustrated example, the shared information presented via the example consultant-side shared information and selection user interface 2700 includes a range of dates that allows for selections and/or filters to be applied against the plurality of products available for purchase. In the illustrated example, the consultant-specific user interaction control capabilities assigned to the consultant device 104 (e.g., via the first user controls communication 502 of FIG. 5A) enable a consultant to scroll through, select and populate the available date range options of FIG. 27.

Figure 28:
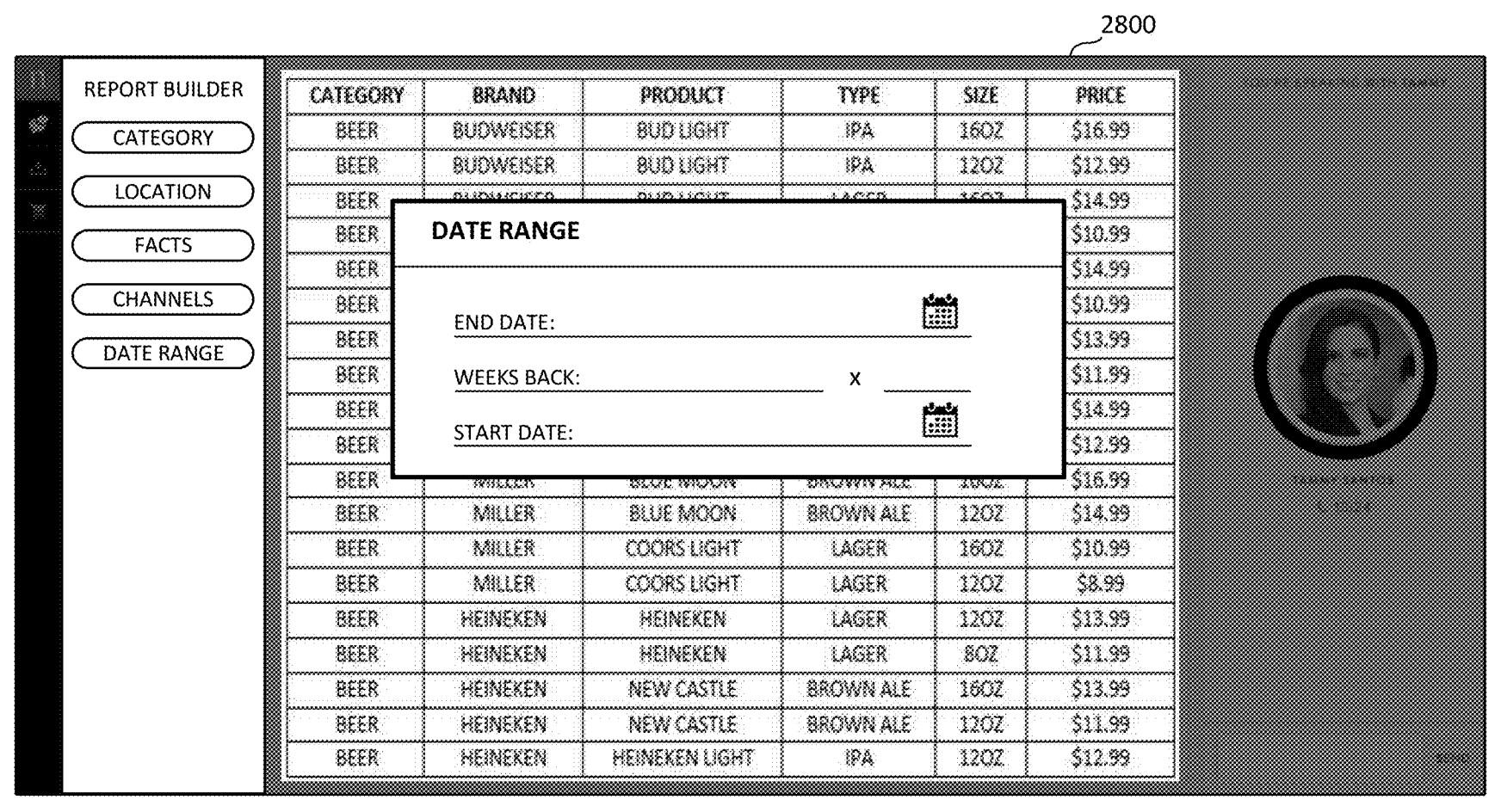

FIG. 28 is the example customer-side shared information user interface of FIG. 17 further including available date range options that may be used in the example interactive display platform 110 of FIG. 1 for display on the example customer device 106. In the illustrated example, the shared information presented via the example customer-side shared information and selection user interface 2800 includes the same data skeleton/outline, query builder and range of dates described above in connection with FIG. 27. In the illustrated example, the customer-specific user interaction control capabilities assigned to the customer device 106 (e.g., via the second user controls communication 504 of FIG. 5A) enable a customer to scroll through the available date range options of FIG. 28, but do not enable the customer to control the selection and/or population of the available date range options.

Returning to the illustrated example of FIGS. 5A and 5B, in relation to the selections applied against the shared information, the customer device 106 sends an example purchase indication communication 524 (FIG. 5B) to the consultant device 104 indicating the customer's interest in purchasing a product and/or information pertaining to a product as presented in connection with the filtered item of shared information. For example, if the customer indicates an interest in purchasing a report containing information about beer sales in the Seattle, Wash. region by dollar volume for the past fiscal year, the example purchase indication communication 524 that the customer device 106 sends to the consultant device 104 includes an indication reflecting the customer's interest in a report containing those particular selections and/or filters. In some examples, the purchase indication communication 524 is transmitted via the peer-to-peer communication path 140 illustrated in FIG. 1. For example, the purchase indication communication 524 may be a verbal communication from the customer transmitted via a call (e.g., a voice over internet protocol (VoIP) call or a video call) and/or a text communication from the customer transmitted via chat (e.g., a text chat or a video chat) as described above. The example purchase indication communication 524 may alternatively be transmitted based on the customer associated with the customer device 106 utilizing the customer-specific user interaction control capabilities assigned to the customer device 106 (e.g., via the second user controls communication 504 of FIG. 5A) in relation to the shared information.

In response to the example purchase indication communication 524, the consultant device 104 sends an example selection(s) applied to shared information communication 526 to the intermediary server 102 identifying the selections and/or filters that the consultant device 104 has applied against the item of shared information. In conjunction with sending the example selection(s) applied to shared information communication 526, the consultant device 104 also sends an example population indication communication 528 to the intermediary server 102 indicating that the selections and/or filters sent by the consultant device 104 should be used to populate a virtual shopping cart associated with the customer device 106. Although shown in FIG. 5B as being separate communications, the example selection(s) applied to shared information communication 526 and the example population indication communication 528 may alternatively be combined into a single communication. In other examples, the consultant device 104 may alternatively send the example selection(s) applied to shared information communication 526 to the intermediary server 102 in conjunction with sending the example selection applied to shared information communication 522 to the customer device 106, as described above in connection with FIG. 3.

In response to the example selection(s) applied to shared information communication 526 and the example population indication communication 528, the intermediary server 102 populates the virtual shopping cart with a representation of the product (e.g., a report containing data based on the identified selections) to be purchased by the customer associated with the customer device 106. After the virtual shopping cart has been populated, the intermediary server 102 sends an example populated virtual shopping cart communication 530 to the consultant device 104 to enable the consultant device 104 to invoke sharing the populated virtual shopping cart with the consultant device 104. The intermediary server 102 also sends an example populated virtual shopping cart communication 532 to the customer device 106 to enable the customer device 106 to invoke sharing the populated virtual shopping cart with the customer device 106. The customer device 106 is then able to access the contents of the populated virtual shopping cart and commence a check-out process. Although not specifically illustrated in FIG. 5B, additional communications corresponding to the example communications 524, 526, 528, 530 and 532 may be processed for additional purchase indications that the customer device 106 provides in relation to any item of shared information.

In some examples, a time shift associated with the presentation and/or display of the populated virtual shopping cart to the consultant device 104 relative to the customer device 106 may result from differences inherent to the respective available network bandwidths and/or the respective available computer performance capabilities of the consultant device 104 and the customer device 106. When such time-shifting occurs, the presentation and/or display of the populated virtual shopping cart nevertheless overlaps in time so that the consultant associated with the consultant device 106 and the customer associated with the customer device 104 can view the shared information during substantially the same time. Thus, even when such time-shifting is present, the interactive display system 100 causes the populated virtual shopping cart to be presented contemporaneously, concurrently and/or simultaneously on the consultant device 104 and the customer device 106.

In some examples, the consultant-specific user interaction control capabilities assigned to the consultant device 104 (e.g., via the first user controls communication 502 of FIG. 5A) enable a consultant to edit the price (e.g., establish a price and/or modify an established price) of the contents of the populated virtual shopping cart. In some examples, the consultant-specific user interaction control capabilities assigned to the consultant device 104 (e.g., via the first user controls communication 502 of FIG. 5A) enable a consultant to convert the sales transaction corresponding to the contents of the populated virtual shopping cart into a subscription transaction. In examples disclosed herein, a subscription transaction causes the contents of the populated virtual shopping cart to be delivered to the customer from time to time (e.g., periodically or aperiodically) based on a subscription schedule. In example scheduled deliveries, the contents of the populated virtual shopping cart are updated prior to each delivery to reflect changes and/or modifications in the data that may be included among the contents of the populated virtual shopping cart relative to a prior delivery. For example, changes and/or modifications in the data may include one or more of an addition, an omission and/or a difference with respect to one or more of the example product(s), type(s), size(s), container(s), pricing and/or sales information illustrated in FIGS. 13-30 that may be included among the contents of the populated virtual shopping cart.

In conjunction with the population of the virtual shopping cart described above in connection with FIGS. 4 and 5B, the example interactive display platform 110 provides a consultant-side shared information and population user interface for display on the example consultant device 104. The example interactive display platform 110 further provides a corresponding customer-side shared information and population user interface for display on the example customer device 106. Examples of such user interfaces are disclosed herein in connection with FIGS. 29-30.

FIG. 29 is the example consultant-side shared information user interface of FIG. 16 further including selections to be used to populate a virtual shopping cart that may be used in the example interactive display platform of FIG. 1 for display on the example consultant device 104. In the illustrated example, the shared information presented via the example consultant-side shared information and population user interface 2900 includes an identification of the selections applied against the plurality of products available for purchase and/or against the shared information. In the illustrated example, the consultant-specific user interaction control capabilities assigned to the consultant device 104 (e.g., via the first user controls communication 502 of FIG. 5A) enable a consultant to indicate (e.g., via the illustrated "ADD TO CART" indicator) that the identified selections should be used to populate a virtual shopping cart associated with the customer device 106.

Figure 30:
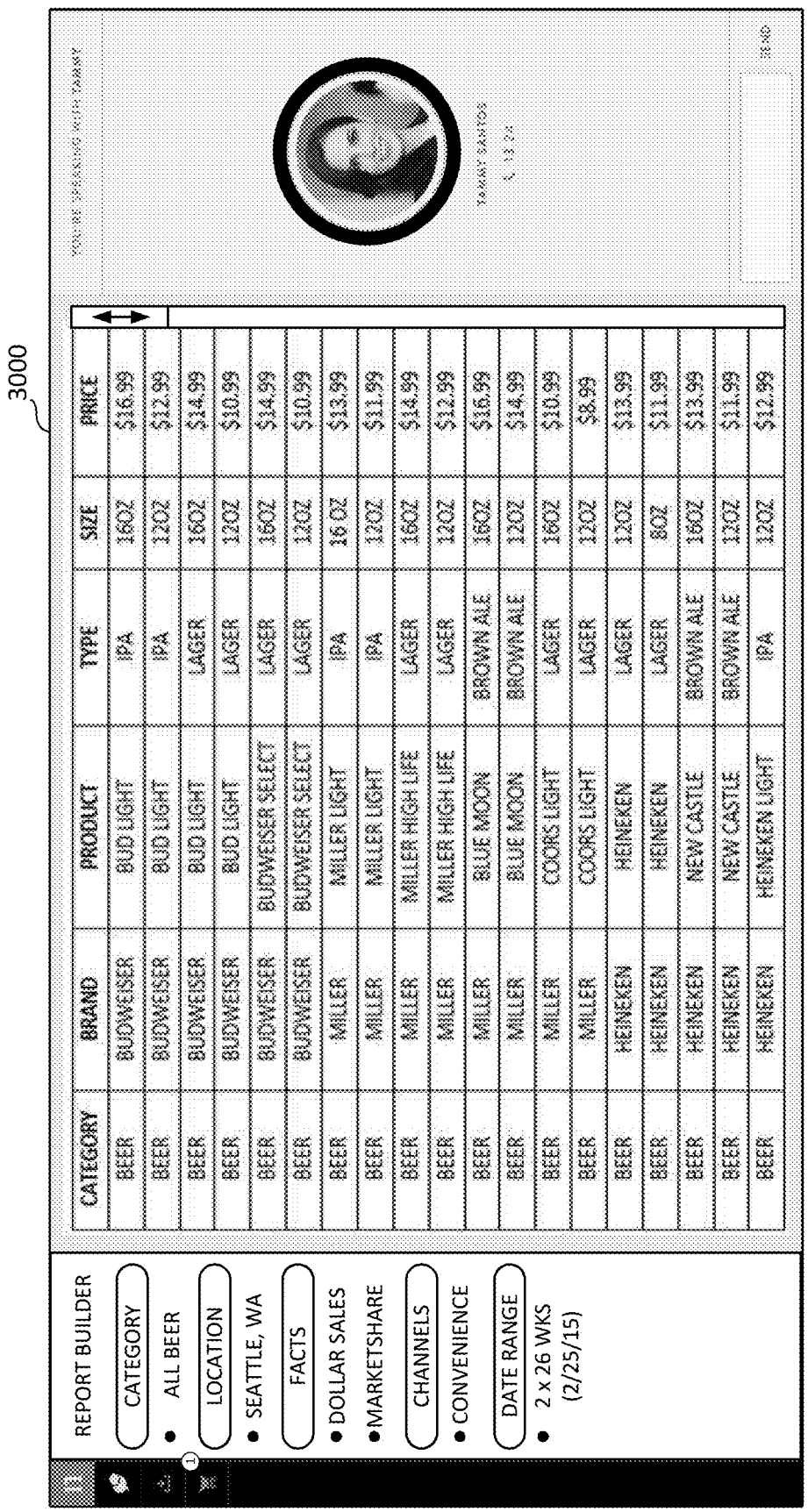
FIG. 30 is the example customer-side shared information user interface of FIG. 17 further including selections used to populate a virtual shopping cart that may be used in the example interactive display system of FIG. 1 for display on an example customer device.

FIG. 30 is the example customer-side shared information user interface of FIG. 17 further including selections used to populate a virtual shopping cart that may be used in the example interactive display platform of FIG. 1 for display on the example customer device 106. In the illustrated example, the shared information presented via the example customer-side shared information and population user interface 3000 includes the same data skeleton/outline, query builder and list of selections described above in connection with FIG. 29. The virtual shopping cart that appears via the example customer-side shared information and population user interface 3000 has been populated by the intermediary server 102, as described above. In the illustrated example, the customer-specific user interaction control capabilities assigned to the customer device 106 (e.g., via the second user controls communication 504 of FIG. 5A) enable the customer to access the contents of the populated virtual shopping cart and commence a check-out process in relation thereto.

FIG. 31 is an example customer payment user interface 3100 that may be used in the example interactive display platform 110 of FIG. 1 for display on the example customer device 106. In the illustrated example, the customer device 106 is able to provide payment information to complete a sales transaction involving the contents of the populated virtual shopping cart described above in connection with FIGS. 4, 5B and 29-30. For example, the customer payment user interface 3100 provides the customer device 106 with the ability to fill in information associated with a credit card to be charged in conjunction with the sales transaction, including the cardholder's name, the card number, the card expiration date, and the card CSV code.

While an example manner of implementing the example interactive display system 100 is illustrated in FIGS. 1-4, 5A and 5B, one or more of the elements, processes and/or devices illustrated in FIGS. 1-4, 5A and 5B may be combined, divided, re-arranged, omitted, eliminated and/or implemented in any other way. Further, the example intermediary server 102, the example consultant device 104 and/or the example customer device 106, and/or, more generally, the example interactive display system 100 of FIGS. 1-4, 5A and 5B may be implemented by hardware, software, firmware and/or any combination of hardware, software and/or firmware. Thus, for example, any of the example intermediary server 102, the example consultant device 104 and/or the example customer device 106, and/or, more generally, the example interactive display system 100 of FIGS. 1-4, 5A and 5B could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example intermediary server 102, the example consultant device 104 and/or the example customer device 106 of FIGS. 1-4, 5A and 5B is/are hereby expressly defined to include a tangible computer readable storage device or storage disk such as a memory, a digital versatile disk (DVD), a compact disk (CD), a Blu-ray disk, etc. storing the software and/or firmware. Further still, the example interactive display system 100 of FIGS. 1-4, 5A and 5B may include one or more elements, processes and/or devices in addition to, or instead of, those illustrated in FIGS. 1-4, 5A and 5B, and/or may include more than one of any or all of the illustrated elements, processes and devices.

Figure 32:
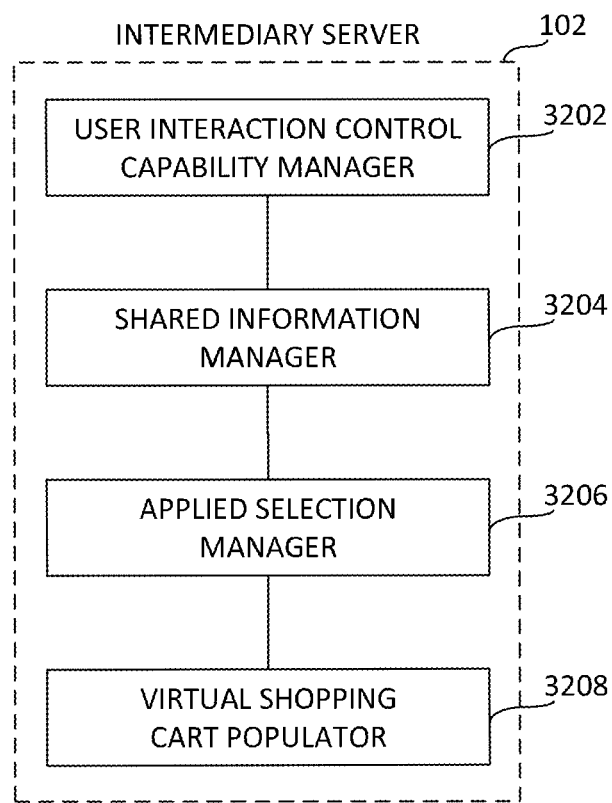
FIG. 32 is a block diagram of the example intermediary server of FIGS. 1-4, 5A and 5B.

FIG. 32 is a block diagram of the example intermediary server 102 of FIGS. 1-4, 5A and 5B constructed in accordance with the teachings of this disclosure to facilitate a sales transaction conducted in real time between a consultant associated with the example consultant device 104 and a customer associated with the example customer device 106 in the example interactive display system 102 of FIG. 1. The example intermediary server 102, including any components and/or subsystems thereof, may be implemented using either a single computing system or multiple computing systems, and may be implemented using either a centralized computer architecture or a distributed computer architecture, or a combination thereof.

In the illustrated example of FIG. 32, the intermediary server 102 includes an example user interaction control capability manager 3202, an example shared information manager 3204, an example applied selection manager 3206, and an example virtual shopping cart populator 3208. However, other example implementations of the intermediary server 102 may include fewer or additional structures to facilitate a sales transaction conducted in real time between a consultant associated with the example consultant device 104 and a customer associated with the example customer device 106 in accordance with the teachings of this disclosure.

In the illustrated example of FIG. 32, the example user interaction control capability manager 3202 of the example intermediary server 102 assigns and/or transmits a first user interaction control capability to the example consultant device 104 and a second user interaction control capability to the example customer device 106. In some examples, user interaction control capability manager 3202 provides the first user interaction control capability to the example consultant device 104 via the first user controls communication 502, and the second user interaction control capability to the example customer device 106 via the second user controls communication 504 described above in connection with FIG. 5A. In some examples, the example user interaction control capability manager 3202 assigns and/or transmits more than one user interaction control capability to one or both of the example consultant device 104 and/or the example customer device 106. For example, the user interaction control capability manager 3202 may assign and/or transmit a first set of user interaction control capabilities to the example consultant device 104 and a second set of user interaction control capabilities to the example customer device 106.

The user interaction control capabilities that the example user interaction control capability manager 3202 assigns and/or transmits respectively to the example consultant device 104 and the example customer device 106 provide the devices with corresponding capabilities to control, manage and/or interact with information to be shared with and/or presented contemporaneously, concurrently and/or simultaneously to the example consultant device 104 and the example customer device 106. In some examples, the user interaction control capability manager 3202 assigns and/or transmits the respective user interaction control capabilities prior to the sharing and/or presentation of information to either and/or both of the consultant device 104 or the customer device 106. In other examples, the user interaction control capability manager 3202 assigns and/or transmits the respective user interaction control capabilities subsequent to the sharing and/or presentation of information to either and/or both of the consultant device 104 or the customer device 106.

In some examples, the user interaction control capability manager 3202 assigns and/or transmits respective user interaction control capabilities to the example consultant device 104 and the example customer device 106 that are unique to the item of shared information. In such examples, the user interaction control capability manager 3202 may assign new and/or modified consultant-specific and/or customer-specific user interaction control capabilities whenever a different item of information is shared during the course of a session. In other examples, the respective consultant-specific and customer-specific user interaction control capabilities are not unique to the item of shared information, but are instead unique to the party to which the control capabilities are being assigned. In such examples, the user interaction control capability manager 3202 need only assign a user interaction control capability specific to the consultant device 104 and another user interaction control capability specific to the consultant device 106 once per session.

A consultant-specific control capability and a customer-specific control capability assigned and/or transmitted by the example user interaction control capability manager 3202 are independent relative to one another. For example, a customer associated with the example customer device 106 may utilize the customer-specific user interaction control capabilities to scroll through shared information while, at the same time, a consultant associated with the example consultant device 104 utilizes the consultant-specific user interaction control capabilities to scroll through the same shared information independent of the customer's interactions with the shared information. In some examples, the consultant-specific user interaction control capabilities assigned and/or transmitted by the example user interaction control capability manager 3202 provide for control capabilities over the shared information that are more expansive relative to the customer-specific user interaction control capabilities assigned and/or transmitted by the user interaction control capability manager 3202. For example, the consultant-specific user interaction control capabilities may include scrolling capabilities, sharing capabilities, selecting capabilities, populating capabilities and/or editing capabilities over the shared information, while the consultant-specific user interaction control capabilities may be limited to scrolling capabilities and/or selection indication capabilities over the shared information.

In some examples, the consultant-specific user interaction control capabilities assigned and/or transmitted by the example user interaction control capability manager 3202 are non-overlapping relative to the customer-specific user interaction control capabilities assigned and/or transmitted by the user interaction control capability manager 3202. For example, the consultant-specific user interaction control capabilities may include the ability to initiate the sharing of information (e.g., share a data skeleton) and the ability to apply selections to the shared information (e.g., apply a selection to the shared data skeleton in connection with building a data report), but may not include the ability to access the populated contents of a virtual shopping cart in connection with a sales transaction. In this same example, the customer-specific user interaction control capabilities may include the ability to access the populated contents of a virtual shopping cart in connection with a sales transaction, but may not include the ability to initiate the sharing of information (e.g., share a data skeleton) or the ability to apply selections to the shared information (e.g., apply a selection to the shared data skeleton in connection with building a data report). In such an example, the consultant-specific user interaction control capabilities are non-overlapping relative to the customer-specific user interaction control capabilities.

In the illustrated example of FIG. 32, the example shared information manager 3204 of the example intermediary server 102 provides shared information to present contemporaneously, concurrently and/or simultaneously on the example consultant device 104 and the example customer device 106. For example, the shared information manager 3204 may receive a request for information (e.g., the example request for information communication 508 of FIG. 5A) from the example consultant device 104 based on an interest indication communicated from the example customer device 106 to the example consultant device 104 (e.g., the example interest indication communication 506 of FIG. 5A). In response to the request for information, the example shared information manager 3204 provides and/or transmits the requested information (e.g., the example information communication 510 of FIG. 5A) to present on the example consultant device 104.

Subsequent to providing the requested information to the example consultant device 104, the example shared information manager 3204 may receive a request to share the information (e.g., the example request to share information communication 512 of FIG. 5A) with the example customer device 106 from the example consultant device 104. In response to and/or in conjunction with the request to share the information, the example shared information manager 3204 may also receive a request for access to the shared information (e.g., the example request for shared information communication 516 of FIG. 5A) from the example customer device 106 based on a shared information alert communicated from the example consultant device 104 to the example customer device 106 (e.g., the example shared information alert communication 514 of FIG. 5A). In response to the request for access to the shared information, the example shared information manager 3204 provides and/or transmits the shared information to present on the example customer device 106. Thus, the example shared information manager 3204 causes an item of shared information to be presented contemporaneously, concurrently and/or simultaneously on the example consultant device 104 and the example customer device 106.

In the illustrated example of FIG. 32, the example applied selection manager 3206 of the example intermediary server 102 obtains, receives and/or stores selections applied to the shared information presented contemporaneously, concurrently and/or simultaneously on the example consultant device 104 and the example customer device 106. For example, the applied selection manager 3206 may receive a communication (e.g., the example selection(s) applied to shared information communication 526 of FIG. 5B) from the example consultant device 106 identifying one or more applied selections communicated from the example consultant device 106 to the example customer device 104 in relation to the shared information (e.g., the example selection applied to shared information communication 522 of FIG. 5A) based on a selection indication communicated from the example customer device 106 to the example consultant device 104 (e.g., the example selection indication communication 520 of FIG. 5A).

The applied selections received by the example applied selection manager 3206 may be indicative of the customer's interest in a particular product and/or product parameter pertaining to the item of shared information. An applied selection may indicate a product category, a product location, a product fact, a product channel, a range of dates over which the product is available, and/or other product parameters. For example, if the shared information is a data skeleton/outline including sales data corresponding to types of beer sold in the United States, the customer might indicate an interest in a particular brand of beer identified in the shared information. The example applied selection manager 3206 obtains, maintains and/or stores the identified applied selection(s), which the applied selection manager 3206 subsequently makes available to the example virtual shopping cart populator 3208, as described below.

In the illustrated example of FIG. 32, the example virtual shopping cart populator 3208 of the example intermediary server 102 provides a populated virtual shopping cart to present contemporaneously, concurrently and/or simultaneously on the example consultant device 104 and the example customer device 106. For example, the virtual shopping cart populator 3208 may receive a population indication (e.g., the example population indication communication 528 of FIG. 5B) from the example consultant device 104 based on a purchase indication communicated from the example customer device 106 to the example consultant device 104 (e.g., the example purchase indication communication 524 of FIG. 5B). In response to the population indication, the example virtual shopping cart populator 3208 populates a virtual shopping cart based on the selections received by the example applied selection manager 3206 as applied to the shared information. Thus, the populated virtual shopping cart is a representation of the product (e.g., a report containing data based on the identified selections) to be purchased by the customer associated with the example customer device 106. The example virtual shopping cart populator 3208 subsequently provides and/or transmits the populated virtual shopping cart to present contemporaneously, concurrently and/or simultaneously on the example consultant device 104 and the example customer device 106 (e.g., using the example populated virtual shopping cart communications 530, 532 of FIG. 5B).

While an example manner of implementing the example intermediary server 102 of FIGS. 1-4, 5A, and 5B is illustrated in FIG. 32, one or more of the elements, processes and/or devices illustrated in FIG. 32 may be combined, divided, re-arranged, omitted, eliminated and/or implemented in any other way. Further, the example user interaction control capability manager 3202, the example shared information manager 3204, the example applied selection manager 3206, the example virtual shopping cart populator 3208 and/or, more generally, the example intermediary server 102 of FIG. 32 may be implemented by hardware, software, firmware and/or any combination of hardware, software and/or firmware. Thus, for example, any of the example user interaction control capability manager 3202, the example shared information manager 3204, the example applied selection manager 3206, the example virtual shopping cart populator 3208 and/or, more generally, the example intermediary server 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user interaction control capability manager 3202, the example shared information manager 3204, the example applied selection manager 3206, the example virtual shopping cart populator 3208 and/or, more generally, the example intermediary server 102 is/are hereby expressly defined to include a tangible computer readable storage device or storage disk such as a memory, a digital versatile disk (DVD), a compact disk (CD), a Blu-ray disk, etc. storing the software and/or firmware. Further still, the example intermediary server 102 of FIG. 32 may include one or more elements, processes and/or devices in addition to, or instead of, those illustrated in FIG. 32, and/or may include more than one of any or all of the illustrated elements, processes and devices.

Communication flow diagrams representative of example machine readable instructions for implementing the example interactive display system 100 of FIGS. 1-4, 5A and 5B are shown in FIGS. 2-4, 5A and 5B. Flowcharts representative of example machine readable instructions for implementing the example intermediary server 102 of FIGS. 1-4, 5A, 5B and 32 are shown in FIGS. 33-36. In these examples, the machine readable instructions comprise one or more program(s) for execution by a processor such as the processor 3712 shown in the example processor platform 3700 discussed below in connection with FIG. 37. The program(s) may be embodied in software stored on a tangible computer readable storage medium such as a CD-ROM, a floppy disk, a hard drive, a digital versatile disk (DVD), a Blu-ray disk, or a memory associated with the processor 3712, but the entire program(s) and/or parts thereof could alternatively be executed by a device other than the processor 3712 and/or embodied in firmware or dedicated hardware. Further, although the example program(s) is/are described with reference to the communication flow diagrams illustrated in FIGS. 2, 3, 4, 5A and 5B and/or the flowcharts illustrated in FIGS. 33-36, many other methods of implementing the example interactive display system 100 and/or the example intermediary server 102 may alternatively be used. For example, the order of execution of the communications and/or blocks may be changed, and/or some of the communications and/or blocks described may be changed, eliminated, or combined.

As mentioned above, the example processes of FIGS. 2-4, 5A, 5B and 33-36 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 2-4, 5A, 5B and 33-36 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 33:
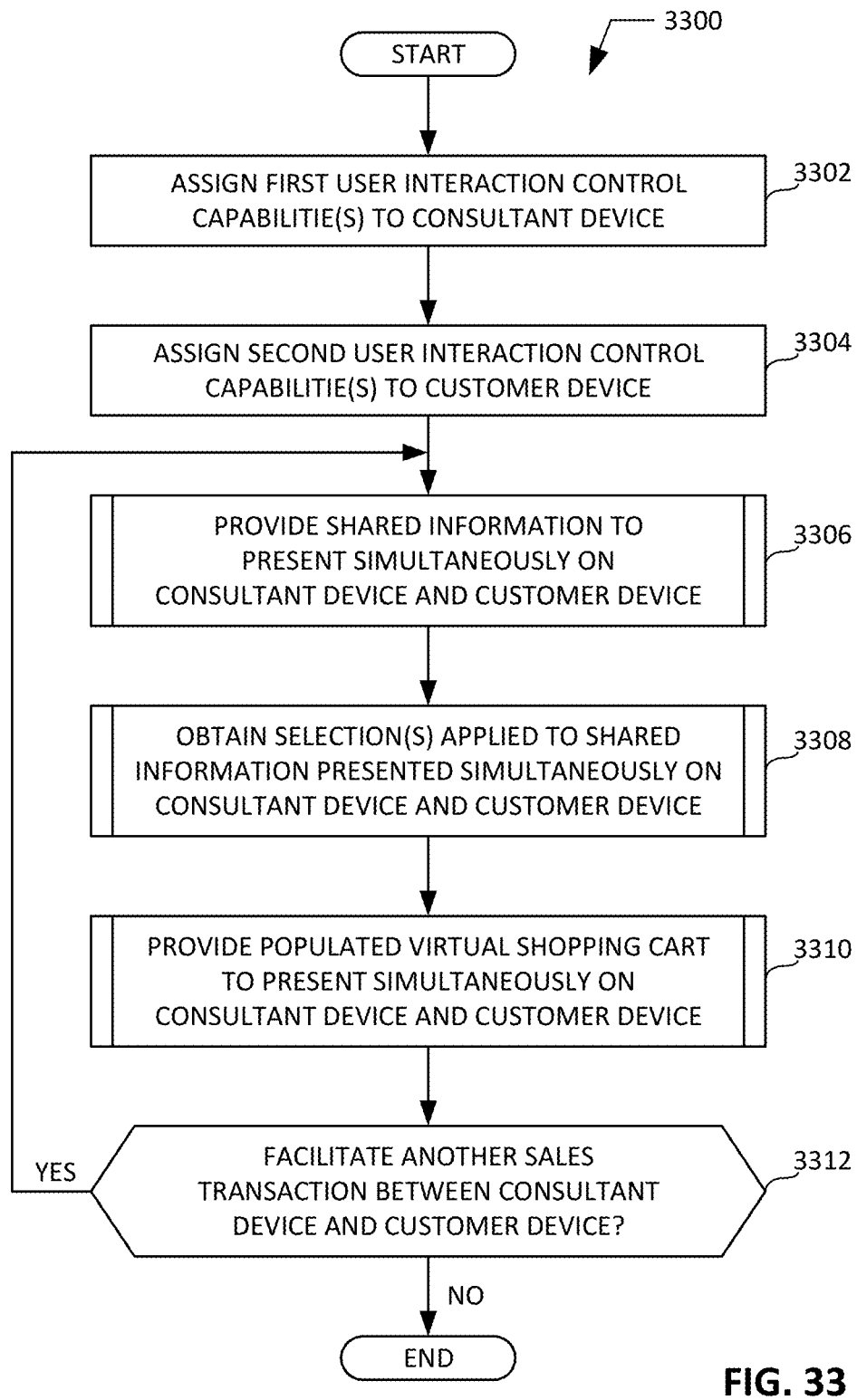
FIG. 33 is a flowchart representative of example machine-readable instructions that may be executed to implement the example intermediary server of FIGS. 1-4, 5A, 5B and 32 to facilitate a sales transaction conducted in real time between a consultant associated with the example consultant device and a customer associated with the example customer device in the example interactive display system of FIG. 1.

FIG. 33 is a flowchart representative of example machine-readable instructions 3300 that may be executed by the example intermediary server 102 of FIGS. 1-4, 5A, 5B and 32 to facilitate a sales transaction conducted in real time between a consultant associated with the example consultant device 104 and a customer associated with the example customer device 106 in the example interactive display system 100 of FIGS. 1-4, 5A and 5B. The example program 3300 of FIG. 33 begins when the example user interaction control capability manager 3202 of FIG. 32 assigns one or more first user interaction control capabilities to the example consultant device 104 (block 3302). For example, the user interaction control capability manager 3202 assigns and/or transmits the first user interaction control capabilitie(s) to the consultant device 104 via the first user controls communication 502 described above in connection with FIG. 5A. The example user interaction control capability manager 3202 assigns one or more second user interaction control capabilities to the example customer device 106 (block 3304). For example, the user interaction control capability manager 3202 assigns and/or transmits the second user interaction control capabilitie(s) to the customer device 106 via the second user controls communication 504 described above in connection with FIG. 5A.

The example shared information manager 3204 of FIG. 32 provides and/or transmits shared information to present contemporaneously, concurrently and/or simultaneously on the example consultant device 104 and the example customer device 106 (block 3306). An example process that may be used to implement block 3306 is described in greater detail below in connection with FIG. 34.

The example applied selection manager 3206 of FIG. 32 obtains, accesses, receives and/or stores one or more selection(s) applied to the shared information presented contemporaneously, concurrently and/or simultaneously on the example consultant device 104 and the example customer device 106 (block 3308). For example, when a consultant selects some of the shared information via the consultant device 104 and/or when a customer selects some of the shared information via the customer device 106, the example applied selection manager 3206 obtains an indication of the selected portion or items of the shared information. An example process that may be used to implement block 3308 is described in greater detail below in connection with FIG. 35.

The example virtual shopping cart populator 3208 of FIG. 32 provides and/or transmits a populated virtual shopping cart to present contemporaneously, concurrently and/or simultaneously on the example consultant device 104 and the example customer device 106 (block 3310). An example process that may be used to implement block 3310 is described in greater detail below in connection with FIG. 36.

The example intermediary server 102 of FIGS. 1-4, 5A, 5B and 32 determines whether to facilitate another sales transaction between the example consultant device 104 and the example customer device 106 (block 3312). If the intermediary server 102 determines to facilitate another sales transaction, control of the example process of FIG. 33 returns to block 3306 described above. If the intermediary server 102 instead determines not to facilitate another sales transaction, the example process of FIG. 33 ends.

Figure 34:
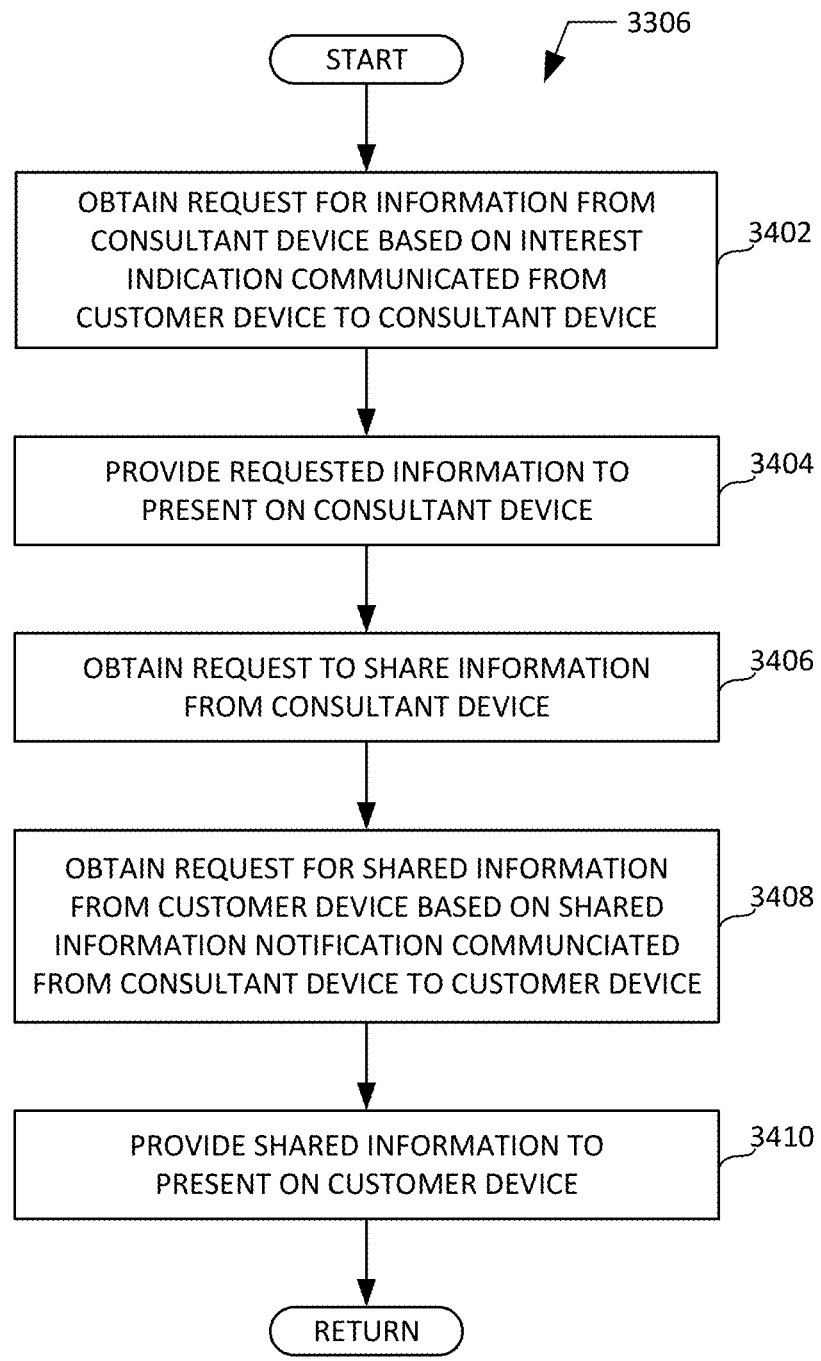
FIG. 34 is a flowchart representative of example machine-readable instructions that may be executed to implement the example intermediary server of FIGS. 1-4, 5A, 5B and 32 to share information between the example consultant device and the example customer device in the example interactive display system of FIG. 1.

FIG. 34 is a flowchart representative of example machine-readable instructions 3306 that may be executed by the example shared information manager 3204 of FIG. 32 to provide shared information to present contemporaneously, concurrently and/or simultaneously on the example consultant device 104 and the example customer device 106 in the example interactive display system 100 of FIGS. 1-4, 5A and 5B. Example operations of blocks 3402, 3404, 3406, 3408, and 3410 of FIG. 34 may be used to implement block 3306 of FIG. 33.

The example program 3306 of FIG. 34 begins when the example shared information manager 3204 of the example intermediary server 102 obtains and/or receives a request for information from the example consultant device 104 based on an interest indication communicated from the example customer device 106 to the example consultant device 104 (block 3402). For example, the shared information manager 3204 receives the request for information from the consultant device 104 via the example request for information communication 508 of FIG. 5A based on the interest indication communicated from the customer device 106 to the consultant device 104 via the example interest indication communication 506 of FIG. 5A. In response to the request for information, the example shared information manager 3204 provides and/or transmits the requested information to present on the example consultant device 104 (block 3404). For example, the shared information manager 3204 provides the requested information to present on the consultant device 104 via the example information communication 510 of FIG. 5A.

After providing the requested information to the example consultant device 104, the example shared information manager 3204 obtains and/or receives a request to share the information from the example consultant device 104 with the example customer device 106 (block 3406). For example, the example request to share information communication 512 of FIG. 5A may be received from the consultant device 104 to share information from the consultant device 104 with the customer device 106.

In response to and/or in conjunction with the request to share the information, the example shared information manager 3204 obtains and/or receives a request for access to the shared information from the example customer device 106 based on a shared information notification communicated from the example consultant device 104 to the example customer device 106 (block 3408). For example, the shared information manager 3204 receives the request for access to the shared information from the customer device 106 via the example request for shared information communication 516 of FIG. 5A based on the shared information notification communicated from the consultant device 104 to the customer device 106 via the example shared information alert communication 514 of FIG. 5A.

In response to the request for access to the shared information, the example shared information manager 3204 provides and/or transmits the shared information to present on the example customer device 106 (block 3410). For example, the shared information manager 3204 provides the shared information to present on the customer device 106 via the example shared information communication 518 of FIG. 5A.

Thus, the example shared information manager 3204 causes an item of shared information to be presented contemporaneously, concurrently and/or simultaneously on the example consultant device 104 and the example customer device 106. After the shared information manager 3204 of FIG. 32 has provided and/or transmitted the shared information to present contemporaneously, concurrently and/or simultaneously on the example consultant device 104 and the example customer device 106, the program 3306 of FIG. 34 ends and control returns to a calling function or process such as the example program 3300 of FIG. 33.

Figure 35:
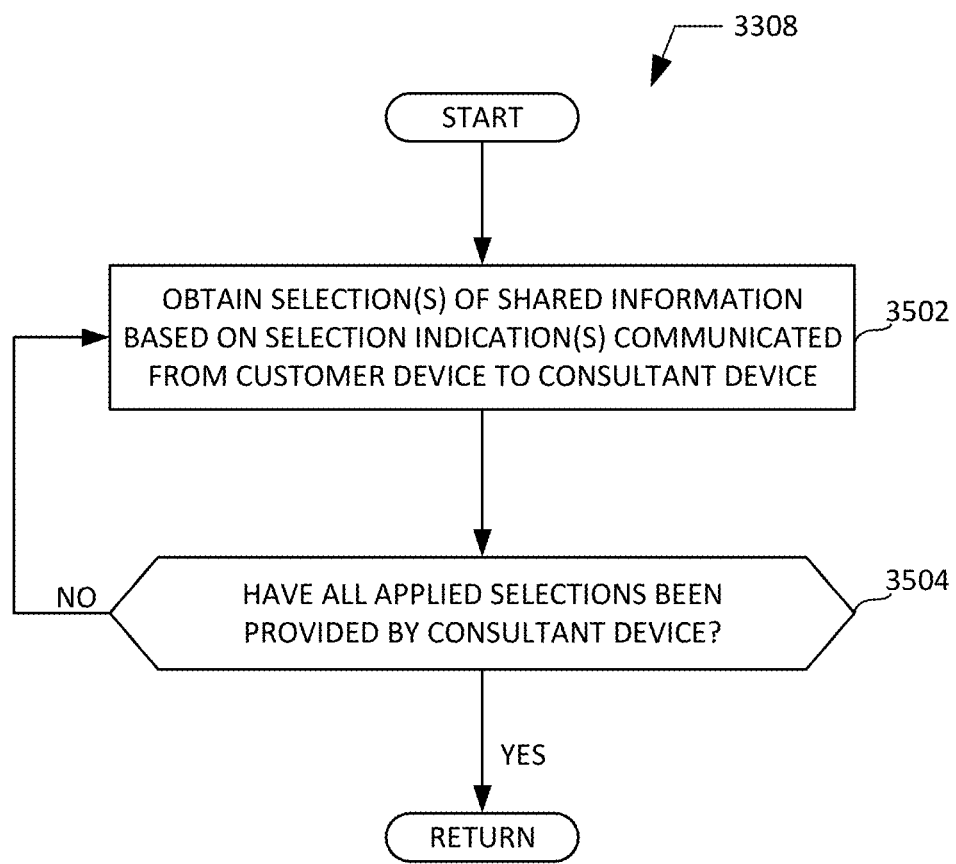
FIG. 35 is a flowchart representative of example machine-readable instructions that may be executed to implement the example intermediary server of FIGS. 1-4, 5A, 5B and 32 to obtain selections applied to shared content in the example interactive display system of FIG. 1.

FIG. 35 is a flowchart representative of example machine-readable instructions 3308 that may be executed by the example applied selection manager 3206 of FIG. 32 to obtain, receive and/or store selections applied to shared information presented contemporaneously, concurrently and/or simultaneously on the example consultant device 104 and the example customer device 106 in the example interactive display system 100 of FIGS. 1-4, 5A and 5B. Example operations of blocks 3502 and 3504 may be used to implement block 3308 illustrated in connection with FIG. 33.

The example program 3308 of FIG. 35 begins when the example applied selection manager 3206 of the example intermediary server 102 obtains, accesses, receives and/or stores one or more selection(s) applied by the example consultant device 104 to the shared information presented contemporaneously, concurrently and/or simultaneously on the example consultant device 104 and the example customer device 106 (block 3502). In some examples, the selection(s) applied by the consultant device 104 are based on one or more applied selection(s) communicated from the example customer device 106 to the example consultant device 104, which in turn is/are based on one or more selection indication(s) communicated from the example customer device 106 to the example consultant device 104. For example, the applied selection manager 3206 may receive the selection(s) applied to shared information communication 526 of FIG. 5B from the consultant device 106 identifying one or more applied selection(s) communicated from the consultant device 106 to the customer device 104 via the example selection applied to shared information communication 522 of FIG. 5A, which in turn is based on the example selection indication communication 520 of FIG. 5A communicated from the customer device 106 to the consultant device 104.

The applied selection received by the example applied selection manager 3206 may be indicative of the customer's interest in a particular product and/or product parameter pertaining to the item of shared information. An applied selection may indicate a product category, a product location, a product fact, a product channel, a range of dates over which the product is available, and/or other product parameters. For example, if the shared information is a data skeleton/outline including sales data corresponding to types of beer sold in the United States, the customer might indicate an interest in a particular brand of beer identified in the shared information. The example applied selection manager 3206 of FIG. 32 obtains, maintains and/or stores the identified applied selection, which the example applied selection manager 3206 subsequently makes available to the example virtual shopping cart populator 3208.

The applied selection manager 3206 of FIG. 32 determines whether the example consultant device 104 has provided and/or transmitted all of the applied selections to the applied selection manager 3206 (block 3504). If the example applied selection manager 3206 determines that the example consultant device 104 has provided less than all of the applied selections, control of the example program of FIG. 35 returns to block 3502 described above. If the example applied selection manager 3206 instead determines that the example consultant device 104 has provided all of the applied selections, the program 3307 of FIG. 35 ends and control returns to a calling function or process such as the example program 3300 of FIG. 33.

Figure 36:
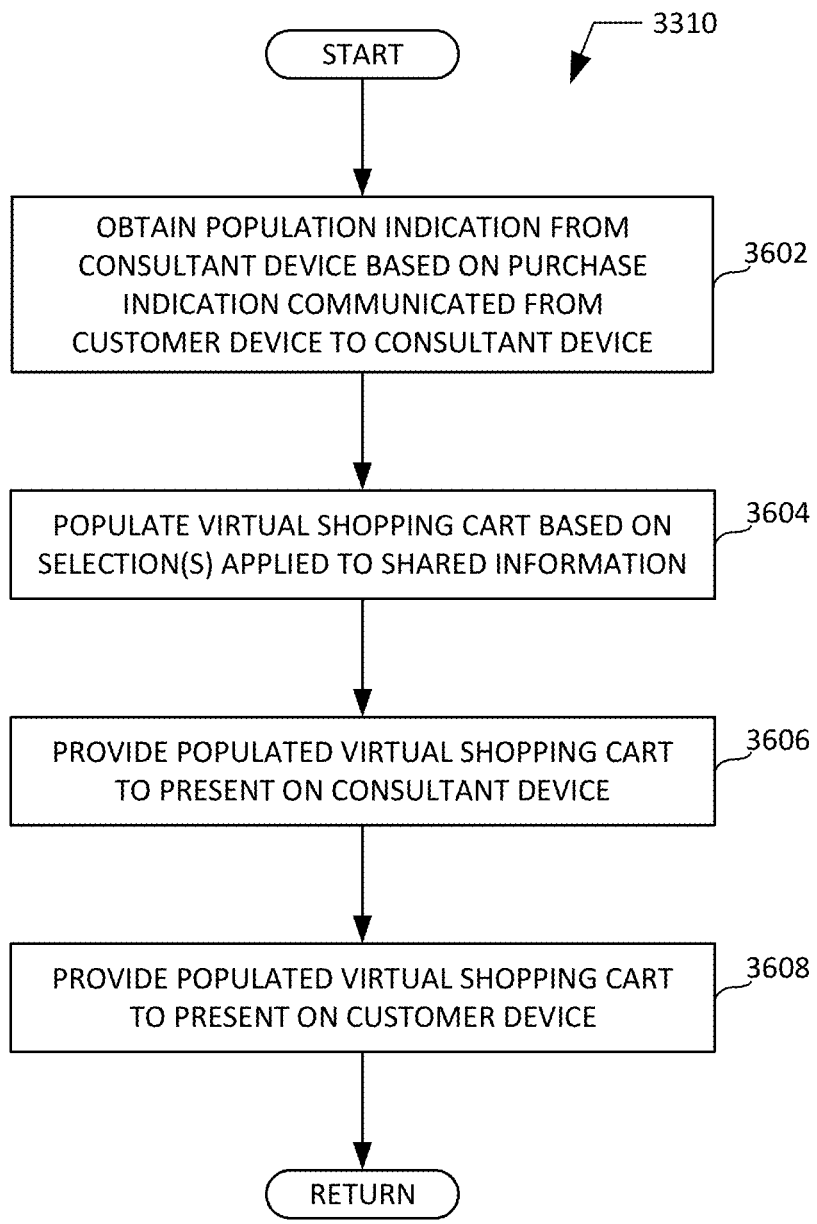
FIG. 36 is a flowchart representative of example machine-readable instructions that may be executed to implement the example intermediary server of FIGS. 1-4, 5A, 5B and 32 to populate a virtual shopping cart in the example interactive display system of FIG. 1.

FIG. 36 is a flowchart representative of example machine-readable instructions 3310 that may be executed by the example virtual shopping cart populator 3208 of FIG. 32 to provide a populated virtual shopping cart to present contemporaneously, concurrently and/or simultaneously on the example consultant device 104 and the example customer device 106 in the example interactive display system 100 of FIGS. 1-4, 5A and 5B. Example operations of blocks 3602, 3604, 3606, and 3608 of FIG. 36 may be used to implement block 3310 illustrated in connection with FIG. 33.

The example program 3310 of FIG. 36 begins when the example virtual shopping cart populator 3208 of the example intermediary server 102 obtains, accesses, receives and/or stores a population indication from the example consultant device 104 based on a purchase indication communicated from the example customer device 106 to the example consultant device 104 (block 3602). For example, the virtual shopping cart populator 3208 receives the population indication from the consultant device 104 via the example population indication communication 528 of FIG. 5B based on the purchase indication communicated from the customer device 106 to example consultant device 104 via the example purchase indication communication 524 of FIG. 5B. In response to the population indication, the example virtual shopping cart populator 3208 populates a virtual shopping cart based on the selections received by the example applied selection manager 3206 as applied to the shared information (block 3604). For example, the populated virtual shopping cart is a representation of the product (e.g., a report containing data based on the identified selections) to be purchased by the customer associated with the example customer device 106.

The example virtual shopping cart populator 3208 of FIG. 32 provides and/or transmits the populated virtual shopping cart to present on the example consultant device 104 (block 3606). For example, the virtual shopping cart populator 3208 provides the populated virtual shopping cart to present on the consultant device 104 via the example populated virtual shopping cart communication 530 of FIG. 5B. The example virtual shopping cart populator 3208 also provides and/or transmits the populated virtual shopping cart to present on the example customer device 106 (block 3608). For example, the virtual shopping cart populator 3208 provides the populated virtual shopping cart to present on the customer device 106 via the example populated virtual shopping cart communication 532 of FIG. 5B. After the virtual shopping cart populator 3208 of FIG. 32 has provided and/or transmitted the populated virtual shopping cart to present contemporaneously, concurrently and/or simultaneously on the example consultant device 104 and the example customer device 106, the program 3310 of FIG. 36 ends and control returns to a calling function or process such as the example program 3300 of FIG. 33.

Figure 37:
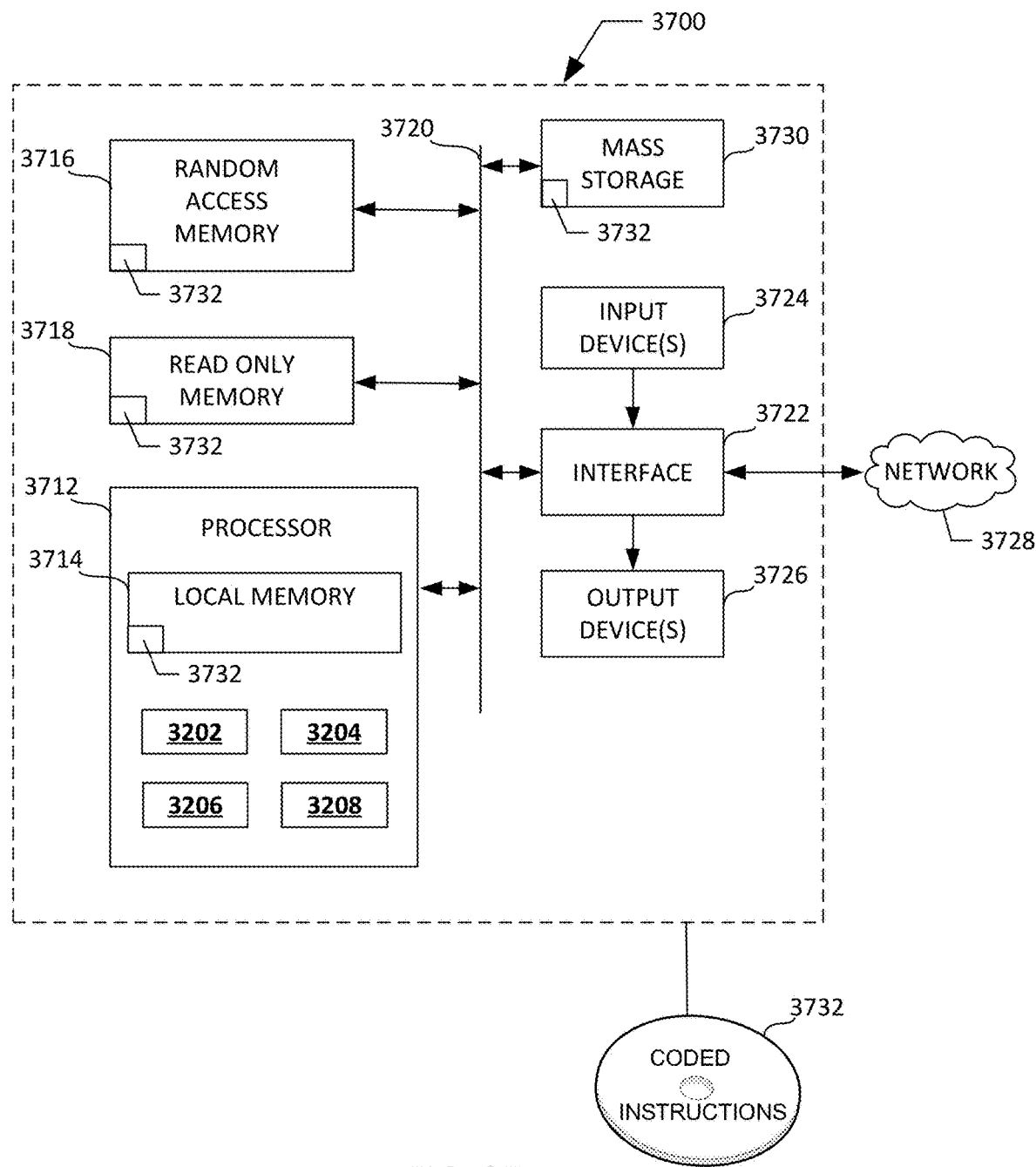
FIG. 37 is an example processing platform capable of executing the example instructions of FIGS. 2, 3, 4, 5A, 5B, 33, 34, 35 and/or 36 to implement the example interactive display system of FIG. 1 and/or the example intermediary server of FIGS. 1-4, 5A, 5B and 32.

FIG. 37 is a block diagram of an example processor platform 3700 capable of executing the instructions of FIGS. 2, 3, 4, 5A, 5B, 33, 34, 35 and/or 36 to implement the example intermediary server 102 of FIGS. 1-4, 5A, 5B and 32. The processor platform 3700 can be, for example, a server, a personal computer, or any other type of computing device.

The processor platform 3700 of the illustrated example includes a processor 3712. The processor 3712 of the illustrated example is hardware. For example, the processor 3712 can be implemented by one or more integrated circuits, logic circuits, microprocessors or controllers from any desired family or manufacturer.

In the illustrated example, the processor 3712 implements the example user interaction control capability manager 3202, the example shared information manager 3204, the example applied selection manager 3206, and the example virtual shopping cart populator 3208 described above in connection with FIG. 32. In some examples, the processor 3712 of the illustrated example executes example instructions 3300 to implement the example user interaction control capability manager 3202, the example shared information manager 3204, the example applied selection manager 3206, and the example virtual shopping cart populator 3208. The example processor 3712 also includes a local memory 3714 (e.g., a cache). The processor 3712 of the illustrated example is in communication with a main memory including a volatile memory 3716 and a non-volatile memory 3718 via a bus 3720. The volatile memory 3716 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3718 may be implemented by flash memory and/or any other desired type of memory device. Access to the main memory 3716, 3718 is controlled by a memory controller.

The processor platform 3700 of the illustrated example also includes an interface circuit 3722. The interface circuit 3722 may be implemented by any type of interface standard, such as an Ethernet interface, a universal serial bus (USB), and/or a PCI express interface.

In the illustrated example, one or more input devices 3724 are connected to the interface circuit 3722. The input device (s) 3724 permit(s) a user to enter data and commands into the processor 3712. The input device(s) can be implemented by, for example, a keyboard, a mouse, a touchscreen, a track-pad, a trackball, isopoint and/or a voice recognition system.

One or more output devices 3726 are also connected to the interface circuit 3722 of the illustrated example. The output devices 3726 can be implemented, for example, by display devices (e.g., a liquid crystal display, a cathode ray tube display (CRT), a touchscreen, a printer and/or speakers). The interface circuit 3722 of the illustrated example, thus, typically includes a graphics driver card, a graphics driver chip or a graphics driver processor.

The interface circuit 3722 of the illustrated example also includes a communication device such as a transmitter, a receiver, a transceiver, a modem and/or network interface card to facilitate exchange of data with external machines (e.g., computing devices of any kind) via a network 3728 (e.g., an Ethernet connection, a digital subscriber line (DSL), a telephone line, coaxial cable, a cellular telephone system, etc.).

The processor platform 3700 of the illustrated example also includes one or more mass storage devices 3730 for storing software and/or data. Examples of such mass storage devices 3730 include floppy disk drives, hard drive disks, compact disk drives, Blu-ray disk drives, RAID systems, and digital versatile disk (DVD) drives.

Coded instructions 3732 implementing the machine-readable instructions of FIGS. 2, 3, 4, 5A, 5B, 33, 34, 35, 36 and/or 37 may be stored in the mass storage device 3730, in the volatile memory 3716, in the non-volatile memory 3718, and/or on a removable tangible computer readable storage medium such as a CD or DVD.

From the foregoing, it will be appreciated that processing resources which otherwise might be demanded of the example consultant device 104 and/or the example customer device 106 when conducting a sales transaction in real time between the customer and consultant devices 104, 106 can advantageously be offloaded and/or diverted to the example intermediary server 102 in communication between the consultant and customer devices, 104, 106. For example, the processing resources of the intermediary server 102 may be used to provide shared information to present contemporaneously, concurrently and/or simultaneously on the consultant and customer devices 104, 106 and to receive selections applied to the shared information. In such an example, the offloading and/or diversion of processing resources to the intermediary server 102 facilitates participation of the consultant and customer devices 104, 106 in the example interactive display platform 110 without imposing a processing resources burden corresponding to the offloaded processing resources demand on the consultant and customer devices 104, 106 to manage the sharing of the shared information and information selections between the consultant and customer devices 104, 106.

From the foregoing, it will also be appreciated that the example intermediary server 102 advantageously provides the example customer device 106 with shared information to present contemporaneously, concurrently and/or simultaneously on the example consultant device 104 and the example customer device 106 based on the example customer device 106 requesting the shared information from the example intermediary server 102. In this regard, the example intermediary server 102 advantageously provides the shared information to the example customer device 106 based on a pull transmission and/or communication received from the example customer device 106, as opposed to a push transmission and/or communication received from the example consultant device 104. For example, rather than providing the shared information to the example customer device 106 based solely on the example request to share information communication 512 transmitted by the example consultant device 104, the example intermediary server 102 instead provides the shared information to the example customer device 106 in response to the example customer device 106 transmitting the example request for shared information communication 516 to the example intermediary server 102. By providing the shared information to the example customer device 106 based on such a pull transmission and/or communication received from the example customer device 106, the example intermediary server 102 advantageously avoids providing the example customer device 106 with shared information that is unwanted and/or undesirable to the example customer device 106 with respect to the timing and/or content of the shared information.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to control computer interactions between a first device and a second device involved in a real time sales transaction conducted via an interactive display platform hosted by a server in communication between the first and second devices, the apparatus comprising:

means for storing machine readable instructions; and
means for communicating to:
establish a peer-to-peer communication path between the first and second devices via a first communication transmitted from the server to at least one of the first device or the second device in response to a first request received at the server from the second device, the peer-to-peer communication path to provide a peer-to-peer connection between the first and second devices;
assign a first user interaction control capability to the first device via a second communication transmitted from the server to the first device;
assign a second user interaction control capability to the second device via a third communication transmitted from the server to the second device, the first user interaction control capability being independent of the second user interaction control capability;
communicate shared information to present contemporaneously on the first and second devices, the communicating to be performed using processing resources of the server to facilitate participation of the first and second devices in the interactive display platform without imposing a processing resources burden corresponding to an offloaded processing resources demand on the first and second devices to manage sharing of the shared information between the first and second devices, the shared information including data representing a plurality of products available for purchase, the communicating of the shared information to include:
in response to a second request received at the server from the first device, communicating, via a fourth communication transmitted from the server to the first device, information including the shared information to present on the first device, the second request being based on a fifth communication generated at the second device using the second user interaction control capability and transmitted from the second device to the first device via the peer-to-peer connection; and in response to a third request received at the server from the second device, communicating, via a sixth communication transmitted from the server to the second device, the shared information to present on the second device, the third request being based on a seventh communication generated at the first device using the first user interaction control capability and transmitted from the first device to the second device via the peer-to-peer connection; and access a selection applied to the shared information presented contemporaneously on the first and second devices, the selection based on the first device using the first user interaction control capability, the selection also based on an eighth communication transmitted from the second device to the first device via the peer-to-peer connection to select at least one of the products available for purchase.

2. The apparatus of claim 1, wherein the seventh communication is based on a fourth request transmitted from the first device to the server.

3. The apparatus of claim 1, wherein the eighth communication is based on the second device using the second user interaction control capability.

4. The apparatus of claim 1, wherein the eighth communication is communicated via at least one of a text chat communication, a video chat communication, or a voice over internet protocol communication transmitted from the second device to the first device via the peer-to-peer connection.

5. The apparatus of claim 1, wherein ones of the products available for purchase constitute data that is available for purchase.

6. The apparatus of claim 1, wherein the selection is based on a filter applied to the data representing the plurality of products available for purchase.

7. The apparatus of claim 1, wherein the selection is at least one of a category selection, a location selection, a fact selection, a channel selection, or a date range selection.

8. The apparatus of claim 1, wherein the means for communicating is further to communicate a populated virtual shopping cart to present contemporaneously on the first and second devices in response to a ninth communication received at the server from the first device using the first user interaction control capability.

9. The apparatus of claim 8, wherein the populated virtual shopping cart includes a representation of the shared information and the selection.

10. The apparatus of claim 8, wherein the ninth communication is based on a tenth communication generated at the second device using the second user interaction control capability and transmitted from the second device to the first device via the peer-to-peer connection.

11. An apparatus to control computer interactions between a first device and a second device involved in a real time sales transaction conducted via an interactive display platform hosted by a server in communication between the first and second devices, the apparatus comprising:

user interaction control capability manager circuitry to assign a first user interaction control capability to the first device via a first communication transmitted from the server to the first device, and to assign a second user interaction control capability to the second device via a second communication transmitted from the server to the second device, the first user interaction control capability being independent of the second user interaction control capability;

shared information manger circuitry to communicate shared information to present contemporaneously on the first and second devices, the communicating to be performed using processing resources of the server to facilitate participation of the first and second devices in the interactive display platform without imposing a processing resources burden corresponding to an off-loaded processing resources demand on the first and second devices to manage sharing of the shared information between the first and second devices, the shared information including data representing a plurality of products available for purchase, the communicating of the shared information to include:

in response to a first request received at the server from the first device, communicating, via a third communication transmitted from the server to the first device, information including the shared information to present on the first device, the first request being based on a fourth communication generated at the second device using the second user interaction control capability and transmitted from the second device to the first device via a peer-to-peer connection between the first and second devices, the peer-to-peer connection established by the server via a fifth communication transmitted from the server to at least one of the first device or the second device in response to a second request received at the server from the second device; and in response to a third request received at the server from the second device, communicating, via a sixth communication transmitted from the server to the second device, the shared information to present on the second device, the third request being based on a seventh communication generated at the first device using the first user interaction control capability and transmitted from the first device to the second device via the peer-to-peer connection; and applied selection manager circuitry to access a selection applied to the shared information presented contemporaneously on the first and second devices, the selection based on the first device using the first user interaction control capability, the selection also based on an eighth communication transmitted from the second device to the first device via the peer-to-peer connection to select at least one of the products available for purchase.

12. The apparatus of claim 11, wherein the seventh communication is based on a fourth request transmitted from the first device to the server.

13. The apparatus of claim 11, wherein the eighth communication is based on the second device using the second user interaction control capability.

14. The apparatus of claim 11, wherein the eighth communication is communicated via at least one of a text chat communication, a video chat communication, or a voice over internet protocol communication transmitted from the second device to the first device via the peer-to-peer connection.

15. The apparatus of claim 11, wherein ones of the products available for purchase constitute data that is available for purchase.

16. The apparatus of claim 11, wherein the selection is based on a filter applied to the data representing the plurality of products available for purchase.

17. The apparatus of claim 11, wherein the selection is at least one of a category selection, a location selection, a fact selection, a channel selection, or a date range selection.

18. The apparatus of claim 11, further including virtual shopping cart populator circuitry to communicate a populated virtual shopping cart to present contemporaneously on the first and second devices in response to a ninth communication received at the server from the first device using the first user interaction control capability.

19. The apparatus of claim 18, wherein the populated virtual shopping cart includes a representation of the shared information and the selection.

20. The apparatus of claim 18, wherein the ninth communication is based on a tenth communication generated at the second device using the second user interaction control capability and transmitted from the second device to the first device via the peer-to-peer connection.

21. An apparatus to control computer interactions between a first device and a second device involved in a real time sales transaction conducted via an interactive display platform hosted by a server in communication between the first and second devices, the apparatus comprising:
   memory; and
   at least one processor to execute instructions to at least:
      assign a first user interaction control capability to the first device via a first communication transmitted from the server to the first device;
      assign a second user interaction control capability to the second device via a second communication transmitted from the server to the second device, the first user interaction control capability to be independent of the second user interaction control capability;
      communicate shared information to present contemporaneously on the first and second devices, the shared information provided by processing resources of the server to facilitate participation of the first and second devices in the interactive display platform without imposing a processing resources burden corresponding to an offloaded processing resources demand on the first and second devices to manage sharing of the shared information between the first and second devices, the shared information including data representing a plurality of products available for purchase, the shared information to be communicated by:
         in response to a first request received at the server from the first device, communicating, via a third communication transmitted from the server to the first device, information including the shared information to present on the first device, the first request being based on a fourth indication communication generated at the second device using the second user interaction control capability and transmitted from the second device to the first device via a peer-to-peer connection between the first and second devices, the peer-to-peer connection established by the server via a fifth communication transmitted from the server to at least one of the first device or the second device in response to a second request received at the server from the second device; and
         in response to a third request received at the server from the second device, communicating, via a sixth communication transmitted from the server to the second device, the shared information to present on the second device, the third request being based on a seventh communication generated at the first device using the first user interaction control capability and transmitted from the first device to the second device via the peer-to-peer connection; and
      access a selection applied to the shared information presented contemporaneously on the first and second devices, the selection based on the first device using the first user interaction control capability, the selection also based on an eighth communication transmitted from the second device to the first device via the peer-to-peer connection to select at least one of the products available for purchase.

22. The apparatus of claim 21, wherein the seventh communication is based on a fourth request transmitted from the first device to the server.

23. The apparatus of claim 21, wherein the eighth communication is based on the second device using the second user interaction control capability.

24. The apparatus of claim 21, wherein the eighth communication is communicated via at least one of a text chat communication, a video chat communication, or a voice over internet protocol communication transmitted from the second device to the first device via the peer-to-peer connection.

25. The apparatus of claim 21, wherein the selection is based on a filter applied to the data representing the plurality of products available for purchase.

* * * * *

UNITED STATES PATENT AND TRADEMARK OFFICE
CERTIFICATE OF CORRECTION

| | | |
|---|---|---|
| PATENT NO. | : 11,568,472 B2 | Page 1 of 1 |
| APPLICATION NO. | : 17/090573 | |
| DATED | : January 31, 2023 | |
| INVENTOR(S) | : Lubeck et al. | |

It is certified that error appears in the above-identified patent and that said Letters Patent is hereby corrected as shown below:

In the Drawings

"Figure 34", delete "COMMUNCIATED", and insert -- COMMUNICATED --.

In the Claims

Column 36 in Claim 11, in Line 5, delete "manger", and insert -- manager --.

Signed and Sealed this
Twenty-seventh Day of June, 2023

Katherine Kelly Vidal
*Director of the United States Patent and Trademark Office*